(12) United States Patent
Iwago et al.

(10) Patent No.: US 7,896,343 B2
(45) Date of Patent: Mar. 1, 2011

(54) DOCUMENT OR SHEET MATERIAL FEEDER

(75) Inventors: Toshitaka Iwago, Okazaki (JP); Ryoichi Matsushima, Nagoya (JP); Yoichi Horaguchi, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 824 days.

(21) Appl. No.: 11/458,141

(22) Filed: Jul. 18, 2006

(65) Prior Publication Data

US 2007/0069451 A1 Mar. 29, 2007

(30) Foreign Application Priority Data

| Sep. 26, 2005 | (JP) | ................................. 2005-278076 |
| Sep. 26, 2005 | (JP) | ................................. 2005-278966 |
| Sep. 28, 2005 | (JP) | ................................. 2005-282392 |
| Oct. 17, 2005 | (JP) | ................................. 2005-302378 |

(51) Int. Cl.
*B65H 39/10* (2006.01)
(52) U.S. Cl. ............ 271/301; 271/291; 271/65; 271/186
(58) Field of Classification Search .................. 271/186, 271/65, 3.14, 4.08, 4.1, 301, 291; 399/364, 399/374, 75

See application file for complete search history.

(56) References Cited

U.S. PATENT DOCUMENTS

| 4,867,431 A | * | 9/1989 | Hosking et al. .................... 241/3 |
| 5,419,543 A | * | 5/1995 | Nakamura et al. ........... 271/9.01 |
| 5,782,468 A | * | 7/1998 | Wu et al. ..................... 271/10.05 |
| 5,974,283 A | * | 10/1999 | Cho ................................. 399/75 |
| 5,991,592 A | | 11/1999 | Kobayashi et al. |
| 7,451,975 B2 | * | 11/2008 | Cook et al. ..................... 271/117 |
| 2004/0021262 A1 | * | 2/2004 | Yen et al. ..................... 271/10.11 |
| 2005/0024692 A1 | | 2/2005 | Shyu |
| 2005/0157357 A1 | | 7/2005 | Yamanaka |

FOREIGN PATENT DOCUMENTS

| EP | 0 439 400 A1 | 7/1991 |
| JP | 3268568 | 11/1991 |
| JP | 8085649 | 4/1996 |
| JP | 11157756 | 6/1999 |
| JP | 2002077519 | 3/2002 |

OTHER PUBLICATIONS

European Search Report dated Nov. 23, 2006.

* cited by examiner

*Primary Examiner* — Stefanos Karmis
*Assistant Examiner* — Thomas A Morrison
(74) *Attorney, Agent, or Firm* — Banner & Witcoff, Ltd

(57) ABSTRACT

Feeding systems for documents or other sheet materials include: (a) an inlet; (b) an outlet; (c) a feed path extending between the inlet and outlet; and (d) a feed system that moves materials along the feed path. The systems further may include: (e) a bidirectional feed path extending from the feed path; (f) a supply system that moves materials to the feed path; (g) a bidirectional drive system that moves materials along the bidirectional feed path; and/or (h) a bidirectional feed path access control system. Drive systems may be provided for driving the feed system and at least one of the supply system, the bidirectional drive system, and/or the access control system such that operation of the feed system is independent of operation of the other systems and/or such that a single motor may be used to drive any or all of the systems.

21 Claims, 34 Drawing Sheets

DOCUMENT OR SHEET MATERIAL FEEDER

CROSS REFERENCE TO RELATED APPLICATIONS

This application claims priority from the following Japanese patent applications: (a) Japanese Patent Application No. 2005-278076 filed on Sep. 26, 2005, (b) Japanese Patent Application No. 2005-278966 filed on Sep. 26, 2005, (c) Japanese Patent Application No. 2005-282392 filed on Sep. 28, 2005, and (d) Japanese Patent Application No. 2005-302378 filed on Oct. 17, 2005. Each of these Japanese priority applications is entirely incorporated herein by reference.

FIELD OF THE INVENTION

The invention relates to feeders for documents or other sheet type materials and to methods for feeding such materials.

BACKGROUND

In image reading apparatuses included in copiers, scanners, and multifunction apparatuses having a copy function and a scanning function, auto document feeders ("ADF") are known that feed documents from an input tray through a feed path to an output tray. In addition, in order to read a document printed on a first surface and a second surface, document feeders that feed a document for double-side reading by reversing its leading end and trailing end are known.

FIG. 33 shows a feed path in an existing document feeder capable of double-side reading. As shown in the figure, a document P is placed on an input tray 100 with a first surface (a first page) facing upward. This document P is fed to a feed path 102 by a pickup roller 101. In the feed path 102, the document P is fed by feed rollers 103 provided as appropriate, and the first surface of the document P is read by an image reading device, such as CCD or CIS, when it passes a reading position X. When a sensor detects a trailing end of the document P, of which the first surface has been read, ejection rollers 104 are stopped with the trailing end of the document P nipped.

Then, as shown in FIG. 34, as the ejection rollers 104 are rotated backward, the document P is fed to a switchback path 105. The document P goes from the switchback path 105 toward an upstream side of the reading position X of the feed path 102. As a result, the leading end and the trailing end of the document P are reversed, and the document P is inverted. Then, the document P is fed by the feed rollers 103, and the second surface of the document P is read by the image reading device when it passes the reading position X. When a sensor detects the trailing end of the document P, of which the second surface now has been read, the ejection rollers 104 are stopped again with the trailing end of the document P nipped, and then the document P is fed back to the switchback path 105. When the document P enters the feed path 102 again from the switchback path 105, its leading end and trailing end are reversed again, that is, the first surface faces the reading position X, and the document P is again inverted. The document P then is fed on the feed path 102 and ejected to an output tray 106 with its first surface facing downward. Thus, the first and second surfaces of the document P are read, and the document P is ejected to the output tray 106 in the same sequence as the original documents P, in the original order, placed on the input tray 100.

The pickup roller 101, the feed rollers 103, and the sheet ejection rollers 104 are rotated through power transmission from a motor. The pickup roller 101 and the feed rollers 103 are always rotated in one direction, i.e., in a direction to feed the document P from the upstream side of the feed path 102 to the downstream side thereof. The sheet ejection rollers 104 are rotated in both forward and reverse directions to feed the document P back along the switchback path 105. For example, as shown in FIG. 34, when the document P is nipped between the feed rollers 103 and the sheet ejection rollers 104, a sheet feeding direction of the feed rollers 103 should match a sheet feeding direction of the sheet ejection rollers 104. In addition, when the document P is nipped between the feed rollers 103 disposed directly downstream of the reading position X and between the sheet ejection rollers 104, the sheet feeding direction of the feed rollers 103 should match the sheet feeding direction of the sheet ejection rollers 104. Thus, as an example, when separate motors are provided for driving the feed roller 103 and the sheet ejection rollers 104, the feed rollers 103 may always be rotated in one direction, and the sheet ejection roller 104 rotational direction must be changed at a predetermined timing.

SUMMARY

Aspects of the invention relate to systems and methods for moving or conveying documents or other sheet type materials, e.g., in various document or sheet handling systems, such as those included in image forming apparatuses. Feeder systems according to at least some examples of this invention may include: (a) an inlet; (b) an outlet; (c) a feed path extending between the inlet and outlet; and (d) a feed system that moves a document or other material along the feed path. Such feeder systems further may include one or more of the following: (e) a bidirectional feed path section extending from a portion of the feed path; (f) a supply system that moves a document or other material from or through the inlet to the feed path; (g) a bidirectional drive system that moves a document or other material along the bidirectional feed path section; and/or (h) a bidirectional feed path access control system for controlling access to the bidirectional feed path section. A drive system may be provided that drives the feed system and at least one of the supply system, the bidirectional drive system, and/or the bidirectional feed path access control system. The drive system may be structured, programmed, and/or adapted so as to control the feed system and at least one of the supply system, the bidirectional drive system, and/or the bidirectional feed path access control system such that, in at least some instances, operation of the feed system is independent of operation of the other systems and/or such that a single motor may be used to drive all of the systems.

Additional aspects of the invention relate to methods of feeding documents or other sheet type materials, e.g., in various document or sheet handling systems, such as image forming apparatuses. Such methods may include: (a) receiving input indicating a feeding mode, wherein the feeding modes include a single side feeding mode and a double side feeding mode; and (b) feeding the document or other material along a feed path between an inlet and an outlet based on the indicated feeding mode. In such methods, when the single side feeding mode is indicated, the document or other material may move through the feed path in a continuous manner, and when the double side feeding mode is indicated, the document or other material may move through the feed path in a discontinuous manner. When the double side feeding mode is indicated, methods according to at least some examples of the invention further may include moving the document or other material along a bidirectional feed path section, e.g., to invert the document or other material. One or more motors may be used to drive the document or other material along the feed path. In at least some examples, a single motor will rotate feed rollers used in moving the document or other material along the feed path in a first rotational direction irrespective of a rotational direction of the motor. Additionally, this same single motor may move the document or other material along the feed path and along other portions of the overall system, such as along a supply path or the bidirectional feed path section. If desired, this same single motor additionally or alternatively may be used to control access to the bidirectional feed path section.

BRIEF DESCRIPTION OF THE DRAWINGS

Aspects of the invention will be described in detail with reference to various example structures and the following figures, wherein.

DETAILED DESCRIPTION

Figure 1:
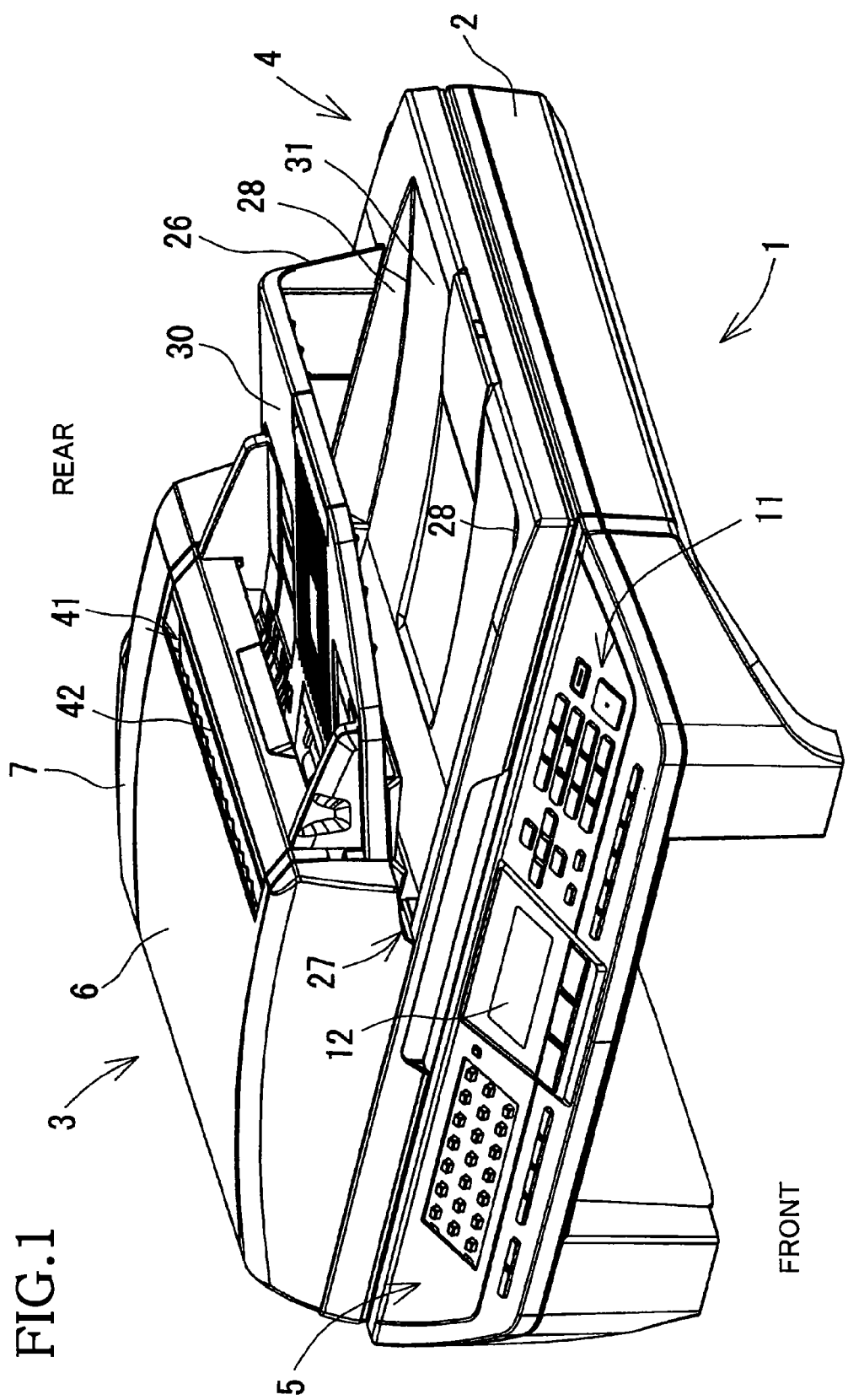
FIG. 1 is a perspective view showing an appearance of an image reading apparatus according to an example of the invention.

I. General Description of Systems and Methods According to at Least Some Examples of the Invention In the description that follows, various connections are set forth between elements in various overall structures. The reader should understand that these connections in general, and unless specified otherwise, may be direct or indirect and that this specification is not intended to be limiting in this respect.

Aspects of this invention relate to systems and methods for moving or conveying documents or other sheet materials, e.g., in various document or sheet handling systems, such as in image forming apparatuses (e.g., in copy machines, printers, facsimile machines, multi-functional machines, etc.). Feeders according to at least some examples of this invention may include: (a) an inlet; (b) an outlet; (c) a feed path extending between the inlet and outlet; and (d) a feed system that moves a document or other material along the feed path. Feeders in accordance with at least some examples of this invention further may include one or more of the following: (e) a bidirectional feed path section extending from a portion of the feed path; (f) a supply system that moves a document or other material from or through the inlet to the feed path; (g) a bidirectional drive system that moves a document or other material along the bidirectional feed path section; and/or (h) a bidirectional feed path access control system for controlling access to the bidirectional feed path section. A drive system may be provided that drives the feed system and at least one of the supply system, the bidirectional drive system, and/or the bidirectional feed path access control system. The drive system may be structured, programmed, and/or adapted so as to control the feed system and at least one of the supply system, the bidirectional drive system, and/or the bidirectional feed path access control system such that, in at least some instances, operation of the feed system is independent of operation of the other systems.

In at least some example feeder structures according to the invention, the drive system will include a motor that rotates feed rollers included in the feed system in a first rotational direction irrespective of a rotational direction of the motor. Moreover, in at least some example structures, the drive system will include a single motor for driving the feed system and at least one of (and in some instances all of) the supply system, the bidirectional drive system, and/or the bidirectional feed path access control system.

Feeder systems in accordance with at least some examples of this invention may include various different scanning modes, such as a single side scanning mode and a double side scanning mode. The feed system may move documents or other materials in a discontinuous manner through the feed path in the double side scanning mode, but it may move the documents or other materials in a continuous, non-stop manner over the feed path in the single side scanning mode.

Additional aspects of the invention relate to methods of feeding documents or other sheet type materials, e.g., in various document or sheet handling systems, such as image forming apparatuses. Such methods may include: (a) receiving input indicating a feeding mode, wherein the potentially available feeding modes include at least a single side feeding mode and a double side feeding mode; and (b) feeding the document or other material along a feed path between an inlet and an outlet based on the indicated feeding mode. In such methods, when the single side feeding mode is indicated, the document or other material may move through the feed path in a continuous manner, and when the double side feeding mode is indicated, the document or other material may move through the feed path in a discontinuous manner. When the double side feeding mode is indicated, the method further may include moving the document or other material along a bidirectional feed path section, e.g., to invert it top to bottom and/or exchange its leading and trailing ends.

One or more motors may be used to move the document or other material along the feed path. In at least some examples of methods according to this invention, a single motor will rotate plural feed rollers used in moving the document or other material along the feed path in a first rotational direction irrespective of a rotational direction of the motor. Additionally or alternatively, in accordance with at least some examples of this invention, this same single motor may move the document or other material along the feed path and along other portions of the overall feeder system, such as along the bidirectional feed path section and/or along a sheet material supply path (e.g., from a supply tray or location to the feed path inlet).

Methods according to at least some examples of this invention further may include controlling access to a bidirectional feed path section extending from the feed path based on the input indicating whether the single side feeding mode or the double side feeding mode is selected (e.g., when the double side feeding mode is indicated, access to the bidirectional feed path section is permitted, and when the single side feed mode is indicated, access to the bidirectional feed path section is not permitted). If desired, structures used in feeding the document or other material along the feed path (and optionally along the other noted areas) and structures used in controlling access to the bidirectional feed path may be driven under drive force supplied by a single motor.

Given the above general description of various examples and aspects of the invention, a more detailed description of various specific examples of feeder systems and methods according to examples of this invention will be provided below.

II. Detailed Description of Example Systems and Methods According to the Invention Various examples of apparatuses in accordance with the invention will be described below with reference to the appended drawings. While the invention is described primarily in terms of "document" or paper feeding systems or methods, those skilled in the art will appreciate, of course, that aspects and features of the invention may be used in conjunction with a wide variety of feeding systems and methods, including systems and methods for feeding other sheet type materials, such as plastics (e.g., transparencies), fiber materials, metals, flexible sheets, and the like.

Figure 2:
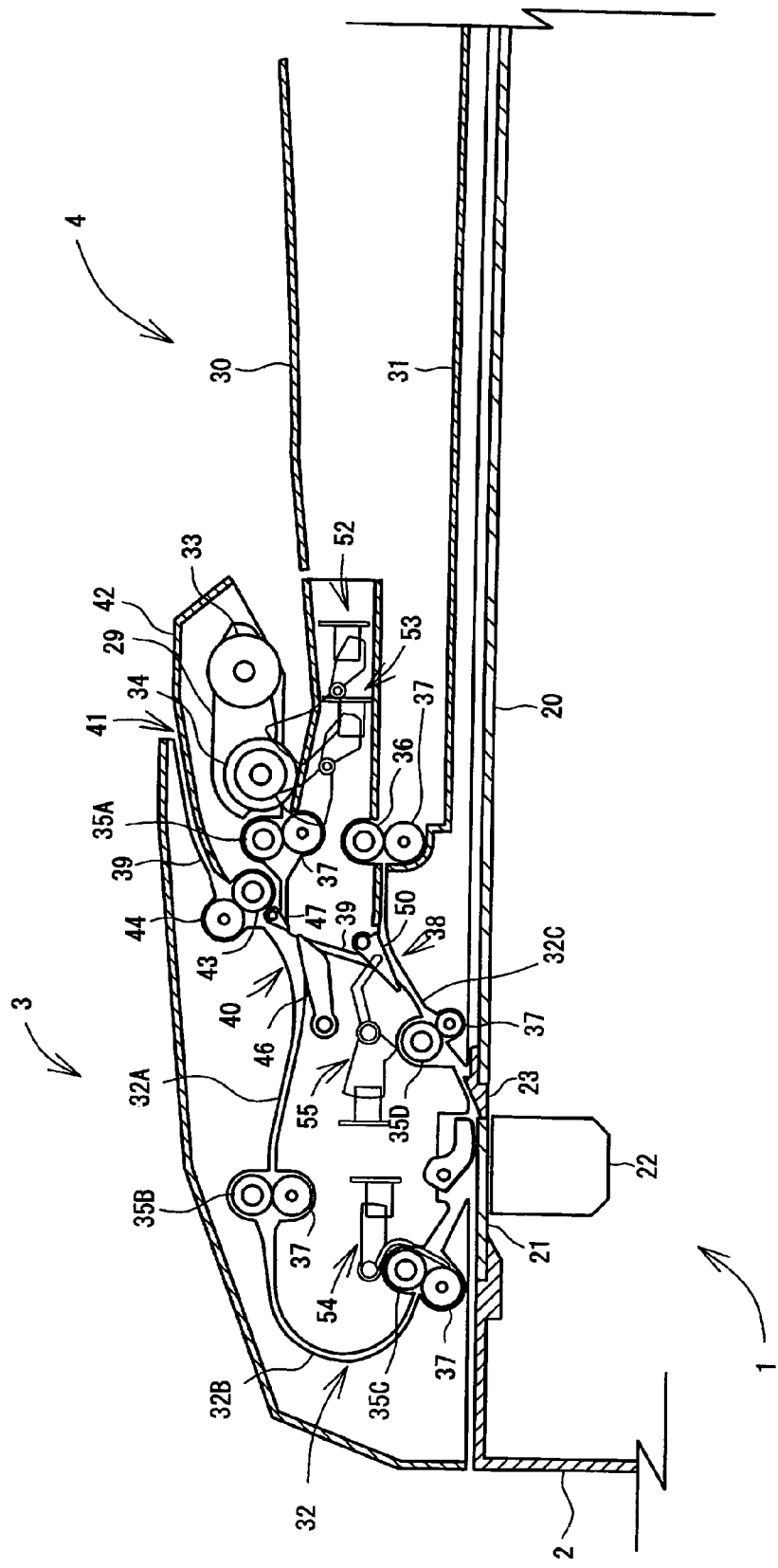
FIG. 2 is a side sectional view of an internal structure of the image reading apparatus of FIG. 1.

FIG. 1 shows an image reading apparatus 1 according to at least some examples of the invention, and FIG. 2 shows major internal structures of the image reading apparatus 1. The image reading apparatus 1 may be provided as an image reader for reading documents, for example, for a copier, a facsimile, a scanner, a multi-function device (MFD), and the like.

As shown in FIGS. 1 and 2, the image reading apparatus 1 of this example is provided with a document mounting table 2 that functions as a flatbed scanner (FBS), and a document cover 4 including an auto document feeder 3 (ADF). The document cover 4 is attached to the document mounting table 2, and it may be opened and closed via hinges at the rear.

An operation panel 5 is provided at a front of the document mounting table 2. The operation panel 5 includes various keys 11 and a liquid crystal display (LCD) 12. A user enters a desired command using the operation panel 5, for example, "start," which indicates the start of document reading and "stop," which indicates a stop of reading. These commands may be entered by pressing a key 11. The image reading apparatus 1 also may operate under commands sent from a computer via a printer or scanner driver connected thereto, in addition to commands entered via the operation panel 5.

As shown in FIG. 2, platen glasses 20, 21 are disposed on the top of the document mounting table 2 where the document cover 4 faces. When the document cover 4 is opened, the platen glasses 20, 21 are exposed as the top surface of the document mounting table 2. When the document cover 4 is closed, the top surface of the document mounting table 2 including the platen glasses 20, 21 is completely covered. An image reading unit 22 is built into or otherwise associated with the document mounting table 2 so as to face the platen glasses 20, 21.

When the image reading apparatus 1 is used as an FBS, a document is placed on the platen glass 20. The platen glass 20 is formed of, for example, a transparent glass plate. An opening is formed in a center on the top of the document mounting table 2, and the platen glass 20 is exposed through the opening. An area where the platen glass 20 is exposed from the opening is a scan area in the FBS.

The platen glass 21 is at a reading position when the ADF 3 of the image reading apparatus 1 is used. The platen glass 21 is formed of, for example, a transparent glass plate. At the reading position of the document mounting table 2, an opening is formed, and the platen glass 21 is exposed from the opening. The platen glass 21 exposed from the opening extends back or in a depth direction of the image reading apparatus 1 in response to a length of the image reading unit 22 in a main reading direction.

A positioning member 23 is interposed between the platen glasses 20 and 21. The positioning member 23 of this example is a long flat plate extending back or in the depth direction of the image reading apparatus 1, e.g., to the same extent as the platen glass 21. The positioning member 23 may be used as a reference point for a document to be placed on the platen glass 20 in the FBS. Thus, the positioning member 23 may have, on its top surface, markings that indicate a center position and both side positions of various different document sizes, such as letter size, A4, and B5. The positioning member 23 also may formed with a guide surface, at its top surface, that catches and deflects the leading edge of a document moving along the platen glass 21 to thereby return the document to the ADF 3.

The image reading unit 22 is an image sensor that emits light onto a document from a light source via the platen glasses 20 and 21, focuses the light reflected from the document into a photoreceptor and converts the reflected light into electric signals. As the image reading unit 22, contact image sensors (CIS), charge coupled device (CCD) image sensors, and/or other desired types of image sensors may be used. The image reading unit 22 is provided below the platen glasses 20, 21 so as to be reciprocally movable, e.g., by a belt drive mechanism or the like, which is a scanning mechanism. For example, a driving force from a carriage motor may be transmitted to the image reading unit 22, and the image reading unit 22 then may be reciprocally moved in parallel with the platen glasses 20, 21.

The document cover 4 of this example apparatus 1 is provided with the ADF 3 that successively feeds documents from an input tray 30 (document placing portion) to an output tray 31 (document ejection portion) via a document feed path 32. During the feeding process by the ADF 3, while a document passes over the reading position on the platen glass 21, the image reading unit 22 provided under the platen glass 22 scans images on the document.

As shown in FIGS. 1 and 2, the document cover 4 is provided with the input tray 30 and the output tray 31, which are vertically arranged in this example structure so that the input tray 30 is placed over the output tray 31. A document being read by the ADF 3 is placed on the input tray 30. If desired, a stack of documents to be read may be placed on the input tray 30 with their first sides facing upward and their leading edges inserted into the document feed path 32. A protection wall 26 is provided in this example structure by bending a side of the input tray 30, which faces the rear of the apparatus 1, downward. The protection wall 26 is connected to the top surface of the document cover 4 at its bottom. The protection wall 26 protects the documents on the output tray 31 from slipping away therefrom (and from falling behind the image reading apparatus 1) when the document cover 4 is opened with respect to the document mounting table 2. A cutout portion 27 is formed at a part of a housing of the ADF 3 at a bottom portion of the input tray 30 facing the front of the apparatus 1. Via this cutout portion 27, a user can see a document or documents ejected to the output tray 31 from the front of the apparatus 1. Documents of small size may be completely hidden by the input tray 30, and it may be difficult for users to confirm the presence of such small documents from the front of the image reading apparatus 1. However, by providing the cutout portion 27, a space between the input tray 30 and the ejection tray 31 is opened up, which results in improvement, especially, for checking and confirming the presence of documents of small size.

The output tray 31 in this example structure is disposed under the input tray 30 vertically away therefrom, and the output tray 31 is integrally formed with the top surface of the document cover 4. A document that has undergone a reading process is ejected from the ADF 3 and maintained separate from a stack of documents (if any) on the input tray 30 and is held on the output tray 31 with its first surface facing down. Side portions 28 of the output tray 31, which may be formed on the front and rear of the apparatus 1, are inclined upwardly toward both sides of the output tray 31. When an ejected document is removed from the output tray 31, the document can be pressed from above and slid along the inclined surfaces of the side portions 28. Thus, the side portions 28 facilitate document removal from the ejection tray 31.

As shown in FIG. 2, the document feed path 32, which has substantially a horizontal "U" shape in vertical sectional view, is formed inside the ADF 3 so as to connect the input tray 30 and the output tray 31 via the reading position on the platen glass 21. The document feed path 32 is continuously formed of various structural members, such as the ADF main body, guide plates, and guide ribs, and the feed path 32 has a width where a document can pass. The input tray 30 and the output tray 31 are vertically arranged and the document feed path 32 is formed to connect the trays in substantially a horizontal "U" shape in vertical sectional view. With this structure, the ADF 3 is decreased in width and consequently reduced in overall size.

The document feed path 32 has the horizontal "U" shape, which extends from the input tray 30 to one end of the document cover 4 (to the left in FIG. 2), curves downward so as to reverse its feeding direction, reaches the reading point on the platen glass 21, and extends from the reading position to the output tray 31. The document feed path 32 is mainly made up of three portions: an upper portion 32A, a curved portion 32B, and a lower portion 32C. The upper portion 32A and the lower portion 32C are upper and lower straight portions in the "U" shape, and the curved portion 32B is curved to continuously connect the upper portion 32A and the lower portion 32C. The document feed path 32 is used for both single-side reading and double-side reading of a document using the ADF 3.

The document feed path 32 includes a supplying member for supplying a document from the input tray 30 to the document feed path 32, and a feeding member for feeding the document, which is supplied to the document feed path 32, to the output tray 31. In this example structure, on the document feed path 32, the supplying member refers to a pickup roller 33 and a separation roller 34, and the feeding member refers to feeding rollers 35A, 35B, 35C, 35D and pinch rollers 37, which are pressed into contact with them, as shown in FIG. 2. Of course other supplying member and feeding member structures may be used without departing from the invention. Power is transmitted from a motor 67 (FIG. 3, a drive source) to each driving roller that constitutes part of the feeding member. A power transmission mechanism for the various rollers will be described in more detail later.

As shown in FIG. 2, the pickup roller 33 and the separation roller 34 are disposed near a most upstream side of the document feed path 32. The pickup roller 33 of this example structure is rotatably provided at an end portion of an arm 29, which is supported at its base end by a shaft 111 (FIG. 9) that supports the separation roller 34. The separation roller 34 is rotatably provided away from the pickup roller 33 in the sheet feeding direction so as to contact an opposing surface of the document feed path 32. A driving force is transmitted from the motor 67 to the pickup roller 33 and the separation roller 34, which are rotatably driven. The driving force from the motor 67 is further transmitted to the arm 29, which is vertically moved. The pickup roller 33 and the separation roller 34 in this example are identical in diameter size, and they are driven at the same peripheral velocity. A separation pad may be disposed at an opposite position of the separation roller 34 to press into contact with a roller surface of the separation roller 34 and separate documents by friction.

The feeding rollers 35A, 35B, 35C, 35D are disposed in different positions on the document feed path 32. In the embodiment, the feed roller 35A is disposed directly downstream from the separation roller 34, the feed roller 35B is disposed in the upper portion 32A of the document feed path 32, the feed roller 35C is disposed in the lower portion 32C of the document feed path 32 and directly upstream from the reading position, and the feed roller 35D is disposed in the lower portion 32C of the document feed path 32 and directly downstream from the reading position. The arrangement of the feed rollers 35A, 35B, 35C, 35D is merely exemplary and the number of feeding rollers and their arrangement can be changed as necessary.

The pinch rollers 37 are provided to face their respective feeding rollers 35A, 35B, 35C, and 35D. Each pinch roller 37 is elastically urged (e.g., by a spring) and is pressed in contact with the roller surface of its respective feeding roller 35A, 35B, 35C, 35D. When each feeding roller 35A, 35B, 35C, 35D is rotated, its respective pinch roller 37 is also rotated. In this manner, a document is pressed in contact with each feeding roller 35A, 35B, 35C, 35D, and a rotational force thereof is transmitted to convey or move the document.

An ejection roller 36 is disposed near a most downstream side of the document feed path 32. As is the case with the feed rollers 35A, 35B, 35C, 35D, a driving force from the motor is transmitted to the ejection roller 36 and the ejection roller 36 is rotated. A pinch roller 37 is also disposed to face the ejection roller 36, and this pinch roller 37 is elastically urged by a spring and pressed in contact with the ejection roller 36.

A bidirectional feed path 39 (also called a "switchback" path) is connected at a connection position 38 in the lower portion 32C on the document feed path 32. The bidirectional feed path 39 is used for double-side reading, and it is designed to reverse the leading end and the trailing end of a document whose first surface has been scanned and to resend the document from a downstream side of the reading position to an upstream side of the reading position. The bidirectional feed path 39 extends diagonally upward from the connection position 38 to an upper side of the input tray 30, and it intersects an upper portion 32A of the document feed path 32. The document, which is fed from an intersection position 40 of the upper portion 32A and the bidirectional feed path 39, is returned to the document feed path 32.

A termination 41 of the bidirectional feed path 39 in this example structure is opened toward the top surface of the ADF 3. A document supporting portion 42 is formed continuously from the termination 41 of the bidirectional feed path 39 to the input tray 30. The document supporting portion 42 is designed to support the document ejected from the termination 41 of the bidirectional feed path 39, and it forms an upper cover 6 (FIG. 1) of the ADF 3 above the pickup roller 33 and the separation roller 34 in this example structure. The upper cover 6 is formed to cover the entire ADF 3 including the pickup roller 33 and the separation roller 34, and it is capable of opening and closing. The document supporting portion 42, which is constituted as the upper cover 6 in this example structure, extends from the termination 41 over the pickup roller 33 toward the input tray 30. Thus, in double-side reading, a document, which enters the bidirectional feed path 39 and projects outside of the ADF 3 from the termination 41, is supported on the document supporting portion 42, and it will not trail down to the downstream side of the pickup position of the documents placed on the input tray 30. In addition, by opening the upper cover 6, the document feed path 32 and the bidirectional feed path 39 in the ADF 3 are partially exposed, and maintenance jobs, such as clearance of a paper jam, can be performed.

A bidirectional feed roller 43 is disposed directly downstream from the intersection position 40 of the bidirectional feed path 39 toward the termination 41 in this example structure. As a driving force is transmitted from a motor 67 to the bidirectional feed roller 43, the bidirectional feed roller 43 is rotated in both the forward and reverse directions. Facing the bidirectional feed roller 43, a pinch roller 44 is disposed. The pinch roller 44 is elastically urged, e.g., by a spring at its shaft, to be pressed in contact with a roller surface of the bidirectional feed roller 43, and is rotated following the rotation of the bidirectional feed roller 43. The document is pressed against the bidirectional feed roller 43 by the pinch roller 44, and rotation of the bidirectional feed roller 43 is transmitted to the document. The bidirectional feed roller 43 and the pinch roller 44 function as a bidirectional feeding member that feeds a document in two directions.

In this example structure, the bidirectional feed path 39, which is connected to a connection position 38 on a downstream side of the reading position of the document feed path 32, is intersected with the upper portion 32A of the document feed path 32, and the bidirectional feed roller 43 is provided at the intersection position 40 toward the termination 41. However, the feeding route of the bidirectional feed path 39 may be changed if necessary or desired, e.g., as long as the bidirectional feed path 39 is connected to a specified position on the document feed path 32 to reverse the leading end and trailing end of a document being fed from the downstream side of the reading position and to return the document to the upstream side of the reading position.

As shown in FIG. 2, guide flaps 46 and 47 for guiding the document to an appropriate feed path are disposed at the intersection position 40. The guide flap 46 is pivotable on its axis. The guide flap 46 has substantially a triangular shape, and its end projects to the intersection position 40. Although only one guide flap 46 is shown in FIG. 2, several guide flaps 46 may be provided at intervals along a width of the document feed path 32 if desired (a depth of the apparatus 1), and these multiple guide flaps 46 may be pivotable together with each other.

The guide flap 46 of this example structure is capable of pivoting upward from a position shown in FIG. 2. The guide flap 46 is regulated so that it should not be pivoted downward from the position shown in FIG. 2, for example, when it comes in contact with a guide member of the document feed path 32 or the bidirectional feed path 39. When the guide flap 46 is placed in the position shown in FIG. 2, at the intersection position 40, the document feed path 32 continues from the input tray 30 (right side in the figure) to the reading position (left side in the figure), whereas a feed path from the document feed path 32 to the connection position 38 of the bidirectional feed path 39 (down side in the figure) is closed. With this structure, a document that reaches the intersection position 40 from the input tray 30 of the document feed path 32 is allowed to go to the reading position of the document feed path 32, and it is regulated to go to the connection position 38 of the bidirectional feed path 39. In addition, a document that reaches the intersection position 40 from the termination 41 (up side in the figure) of the bidirectional feed path 39 is allowed to go to the reading position of the document feed path 32, and it is regulated to go to the connection position 38 of the bidirectional feed path 39.

When the guide flap 46 is pivoted upward in the figure, the feed path from the connection position 38 of the bidirectional feed path 39 to the termination 41 continues, while the feed path from the connection position 38 of the bidirectional feed path 39 to the reading position of the document feed path 32 is closed. With this structure, a document that reaches the intersection position 40 from the connection position 38 of the bidirectional feed path 39 is allowed to go to the termination 41 of the bidirectional feed path 39, and from there it is regulated to go to the reading position of the document feed path 32.

Switching the feed path by the guide flap 46 takes place when the document contacts the guide flap 46. The guide flap 46 is biased in this example structure to be located at the position shown in FIG. 2 (e.g., under its own weight or as a result of undergoing an urging force, such as from an elastic member such as a spring). When a document being fed on the bidirectional feed path 39 from the connection position 38 to the intersection position 40 comes in contact with the guide flap 46, the guide flap 46 is pivoted upward in the figure. On the contrary, when a document is fed from the termination 41 to the intersection position 40 on the bidirectional feed path 39, it comes in contact with the guide flap 46. However, as the guide flap 46 is regulated so that it does not move downward from the position shown in FIG. 2, the document is guided by the guide flap 46 to the upper portion 32A of the document feed path 32, and it again goes to the reading position. The guide flap 46 may be formed in a shape that allows the guide flap 46 to easily change its position by contact with a document being fed from the connection position 38 to the intersection position 40 on the bidirectional feed path 39, and to guide the document being fed from the termination 41 to the intersection position 40 on the bidirectional feed path 39 toward the reading position of the document feed path 32. As long as the guide flap 46 is designed to change its position by contact with the document, there is no need to apply power from the motor 67 (or other power source) to the guide flap 46 for changing its position, and thus the guide flap 46 can be provided with simple structure. Of course, if desired, the guide flap 46 may be selectively moved via a powered connection without departing from the invention.

The guide flap 47 is pivotable on its axis. The guide flap 47 has substantially a triangular shape, and its end projects to the intersection position 40. Although only one guide flap 47 is shown in FIG. 2, if desired several guide flaps 47 may be provided at intervals along a width of the document feed path 32 (a depth of the apparatus 1), and these multiple guide flaps 47 may be pivotable together with one another.

The guide flap 47 is capable of pivoting upward from the position shown in FIG. 2. The guide flap 47 is regulated so that it does not move rightward from the position shown in FIG. 2, for example, when it comes in contact with a guide member of the document feed path 32 or the bidirectional feed path 39. When the guide flap 47 is placed in the position shown in FIG. 2, a feed path from the termination 41 of the bidirectional feed path 39 to the reading position of the document feed path 32 continues, whereas a feed path from the connection position 38 of the bidirectional feed path 39 to the input tray 30 of the document feed path 32 is closed. As a result, a document that has reached the intersection position 40 from the termination 41 of the bidirectional feed path 39 is allowed to go to the reading position of the document feed path 32, and it is regulated to not go to the input tray 30. In addition, a document that has reached the intersection position 40 from the connection position 38 of the bidirectional feed path 39 is allowed to go to the termination 41 of the bidirectional feed path 39, and it is regulated to not go to the input tray 30 of the document feed path 32.

When the guide flap 47 is pivoted upward from the position shown in the figure, the document feed path 32 continues from the input tray 30 to the reading position, and the feed path from the input tray 30 of the document feed path 32 to the termination 41 of the bidirectional feed path 39 is closed. As a result, a document that has reached the intersection position 40 from the input tray 30 of the document feed path 32 is allowed to go to the reading position of the document feed path 32, and it is regulated to not go to the termination 41 of the bidirectional feed path 39.

Switching the feed path by the guide flap 47 takes place when a document contacts the guide flap 47. The guide flap 47 is biased so as to be located at the position shown in FIG. 2, e.g., under its own weight or as a result of undergoing an urging force of an elastic member such as a spring. A document being fed from the input tray 30 of the document feed path 32 comes in contact with the guide flap 47, so that the guide flap 47 is pivoted upward in the figure. When a document reaches the intersection position 40 from the connection position 38 of the bidirectional feed path 39 comes in contact with the guide flap 47, the document is guided by the guide flap 47 and goes to the termination 41 of the bidirectional feed path 39, because the guide flap 47 is regulated so that it does not move rightward from the position shown in FIG. 2. The guide flap 47 may be formed in a shape that allows the guide flap 47 to easily change its position in response to contact with documents being fed from the input tray 30 to the intersection position 40, and to guide documents being fed from the connection position 38 to the intersection position 40 on the bidirectional feed path 39 toward the termination 41 of the bidirectional feed path 39. As long as the guide flap 47 is designed to change its position in response to contact with documents from the input tray 30, there is no need to apply power from the motor 67 (or other source) to the guide flap 47 for changing its position, and thus the guide flap 47 can be provided with simple structure. Of course, if desired, the guide flap 47 may be moved through a powered connection without departing from this invention.

As shown in FIG. 2, a guide flap 50 is disposed at the connection position 38. The guide flap 50 is disposed so that it can pivot at a position where the document feed path 32 and the bidirectional feed path 39 intersect. When power is transmitted from a motor 67 to the guide flap 50, the guide flap 50 moves downward from the position shown in FIG. 2. The guide flap 50 is regulated so that, when it comes in contact with a guide member of the document feed path 32 or the bidirectional feed path 39, it pivots upward from the position shown in FIG. 2, pivots downward to guide the document to the bidirectional feed path 39 and then further downward, for example. When the guide flap 50 is placed in the position shown in FIG. 2, the document feed path 32 continues from the reading position (left side in the figure) to the output tray 31 (right side in the figure) at the connection position 38. Thus, a document passing the reading position is guided through the lower portion 32C of the document feed path 32 toward the output tray 31. When the guide flap 50 is pivoted downward from the position shown in FIG. 2, a feed path from a downstream side of the reading position of the lower portion 32C of the document feed path 32 to the bidirectional feed path 39 continues. By this path, the document that has passed the reading position is guided to enter the bidirectional feed path 39. In this way, the guide flap 50 is disposed to guide the document to the output tray 31 or the bidirectional feed path 39 at the connection position 38. Although only one guide flap 50 is shown in FIG. 2, if desired several guide flaps 50 may be provided at intervals along a width of the document feed path 32, and these multiple guide flaps 50 may be rotated together with each other.

As shown in FIG. 2, a plurality of sensors for detecting conveyance of a document may be provided along the document feed path 32 and the bidirectional feed path 39. In the illustrated example structure, the document feed path 32 includes a first front sensor 52 and a second front sensor 53 on upstream and downstream sides of the separation roller 34, respectively, and a rear sensor 54 on a directly upstream side of the reading position. The bidirectional feed path 39 includes a bidirectional feed sensor 55 between the connection position 38 and the intersection position 40. While in the illustrated example these sensors are so called "optical sensors" that detect a motion of a sensing element that appears on the document feed path 32 or the bidirectional feed path 39 as an on/off of a photo interrupter, other types of sensors or combinations of different types of sensors may be used without departing from this invention.

When a document is placed in the input tray 30, the first front sensor 52 is turned on. By on/off of the first front sensor 52, it is detected whether documents are present in the input tray 30. The second front sensor 53 disposed directly downstream from the separation roller 34 and is configured to detect the leading or trailing end of the document fed in the document feed path 32 by on/off. For example, the position of the leading or trailing end of the document on the document feed path 32 may be determined by monitoring the number of rotations of the feed rollers 35A, 35B, 35C, and 35D, after the second front sensor 53 detects the trailing end of the document, e.g., with an encoder or the number of steps of the motor 67.

The rear sensor 54 is disposed directly upstream of the reading position and is configured to detect the leading or trailing end of a document fed in the document feed path 32 by on/off. A determination whether the leading or trailing end of the document has reached the reading position is made by monitoring the number of rotations of the feed rollers 35A, 35B, 35C, and 35D, after the rear sensor 54 detects the leading or trailing end of the document, e.g., with an encoder or the number of steps of the motor 67. Image reading by the image reading unit 22 is controlled based on a signal of the rear sensor 54. Image reading is started when the leading end of the document has reached the reading position, and it ends when the trailing end has reached the reading position.

The bidirectional feed sensor 55 is disposed between the connection position 38 and the intersection position 40 of the bidirectional feed path 39 and is configured to detect the leading or trailing end of the document fed in the bidirectional feed path 39. For example, a determination whether the trailing end of a document has passed the intersection position 40 may be determined by monitoring the number of rotations of the feed rollers 35A, 35B, 35C, and 35D and the bidirectional feed roller 43, after the bidirectional feed sensor 55 detects the trailing end of the document, e.g., with an encoder or the number of steps of the motor 67. The bidirectional feed sensor 55 is disposed at a position comparatively close to the bidirectional feed roller 43 at an upstream side with respect to a feeding direction thereof. Thus, the accuracy to detect the trailing end of the document can be improved.

Figure 3:
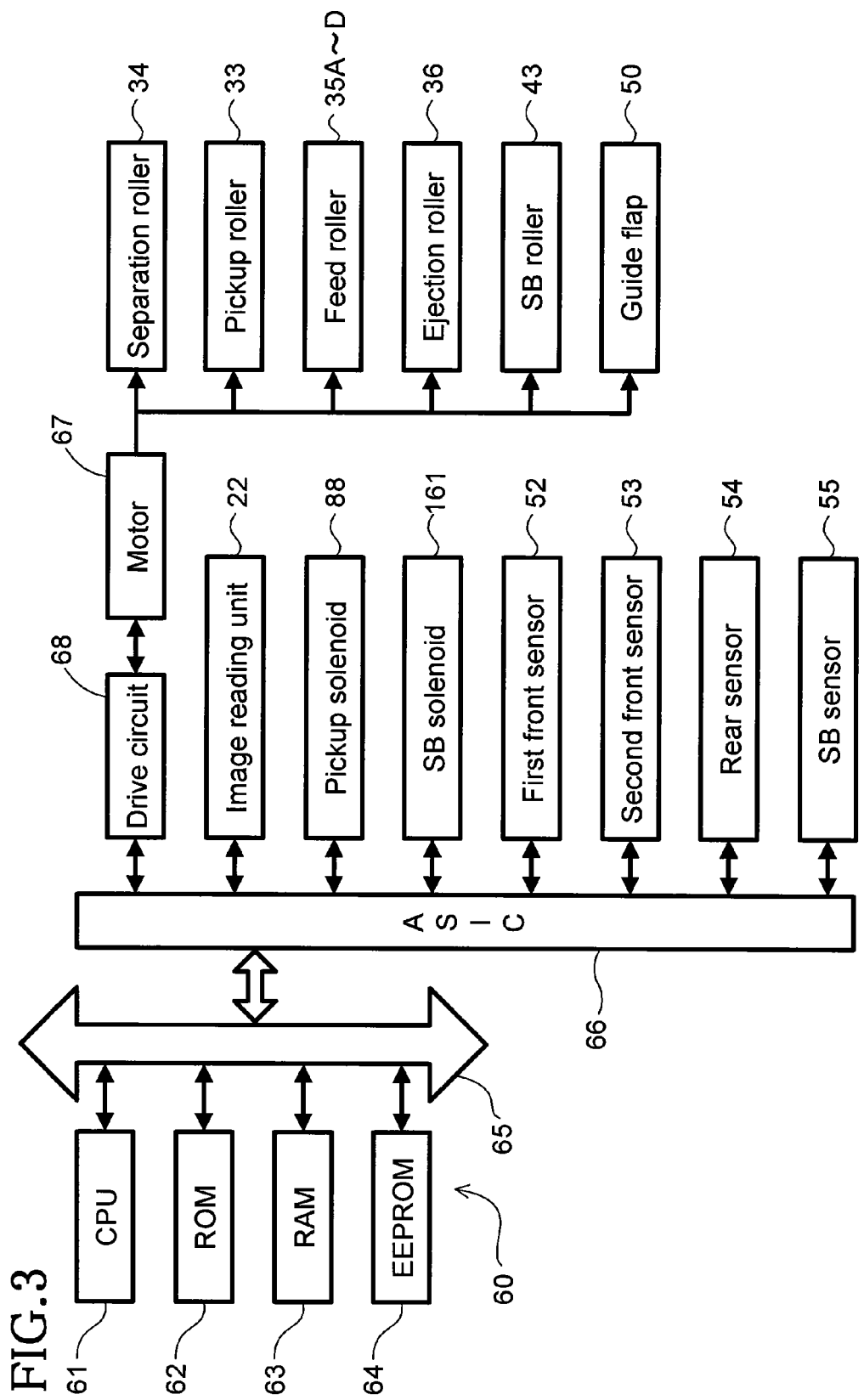
FIG. 3 is a block diagram showing an example structure of a controller that may be used with devices according to at least some examples of the invention.

FIG. 3 shows an example structure of a controller 60 that may be used with the image reading apparatus 1. The controller 60 of this example controls operations of not only the ADF 3, but also the entire image reading apparatus 1. The controller 60 is constituted as a microcomputer mainly having CPU 61, ROM 62, RAM 63, and EEPROM (electrically erasable and programmable ROM) 64, and it is connected to ASIC (Application Specific Integrated Circuit) 66 via a bus 65.

The ROM 62 stores various kinds of programs for controlling each operation of the image reading apparatus 1 and the ADF 3. The RAM 63 is used as a memory area or work area to temporarily store data the CPU 61 uses to execute the programs. The EEPROM 64 is a memory area used to store various settings and flags that should be retained even when the power is turned off.

The ASIC 66 complies with commands from the CPU 61, generates a phase excitation signal to energize the motor 67, gives the signal to a drive circuit 68 of the motor 67, energizes the motor 67 via the drive circuit 68, and controls rotation of the motor 67. The motor 67 of this example may be rotated in both forward and reverse directions, which gives a driving force to the pickup roller 33, the separation roller 34, the feed rollers 35A, 35B, 35C, and 35D, the ejection roller 36, the bidirectional feed roller 43, and the guide flap 50. The motor 67 in this example structure is the single drive force in the ADF 3.

The drive circuit 68 is used to drive the motor 67. The drive circuit 68 receives an output signal from the ASIC 66, and generates an electrical signal to rotate the motor 67. Receiving the electrical signal, the motor 67 rotates in a direction, and the rotational force of the motor 67 is transmitted to the pickup roller 33, the separation roller 34, the feed rollers 35A, 35B, 35C, and 35D, the ejection roller 36, the bidirectional feed roller 43, and the guide flap 50 via power transmission mechanisms 70, 110, 120, 150, 170, which will be described in more detail later.

The ASIC 66 is connected to the image reading unit 22 that performs image reading of a document fed to the reading position by the ADF 3. The image reading unit 22 reads the image of the document based on the control program stored in the ROM 62. A drive mechanism (not shown) that moves the image reading unit 22 reciprocally in some modes of operation is also operated under an output signal from the ASIC 66.

The first front sensor 52, the second front sensor 53, the rear sensor 54, and the bidirectional feed sensor 55 are connected to the ASIC 66. The CPU 61 receives on/off signals from these sensors, and it instructs the ASIC 66 to output a specified output signal and actuate the motor 67 and the image reading unit 22 based on the control program stored in the ROM 62.

The ASIC 66 is also connected to a pick-up solenoid 88 and a bidirectional (or "switchback") solenoid ("SB solenoid") 161. The CPU 61 instructs the ASIC 66 to output an output signal at a specified timing and to actuate the pick-up solenoid 88 and the SB solenoid 161.

The following describes power transmission mechanisms from the motor 67 to the pickup roller 33, the separation roller 34, the feed rollers 35A, 35B, 35C, and 35D, the ejection roller 36, the bidirectional feed roller 43, and the guide flap 50. Each shaft of the separation roller 34, the feed rollers 35A, 35B, 35C, and 35D, the ejection roller 36, the bidirectional feed roller 43, and the guide flap 50 extends along a width of the document feed path 32. The separation roller 34, the feed rollers 35A, 35B, 35C, and 35D, the ejection roller 36, the bidirectional feed roller 43, and the guide flap 50 are individually disposed on their respective shafts within the width of the document feed path 32. The various rollers may be provided along an entire length of its shaft in an axial direction thereof, and/or the various shafts may be provided with plural rollers along the width of the document feed path 32 at intervals and coaxially. Any number and combinations of shafts and rollers may be provided without departing from this invention.

As shown in FIG. 1, the ADF 3 of this example structure, which is provided on the top surface of the document cover 4, includes the document feed path 32 and each roller. The motor 67 and the power transmission mechanisms, which give power to each roller, are also accommodated in the housing of the ADF 3. The motor 67 and the power transmission mechanisms are provided at one end of the ADF 3 with respect to the width of the document feed path 32. Each shaft of the separation roller 34, the feed rollers 35A, 35B, 35C, and 35D, the ejection roller 36, the bidirectional feed roller 43, and the guide flap 50 is provided with a driven gear at one end. When a driving force is transmitted from the motor 67 to each driven gear via its respective power transmission mechanism, each roller is driven. In this example structure, the motor 67, each power transmission mechanism, and each driven gear provided at one end of each shaft for the separation roller 34, the feed rollers 35A, 35B, 35C, and 35D, the ejection roller 36, the bidirectional feed roller 43, and the guide flap 50 are accommodated in a space 7 at the rear of the ADF 3 housing (see FIG. 1). Each gear described below is a spur gear having teeth parallel to its axis on its circumference, unless otherwise specified (although other gear assemblies and transmission mechanisms also may be used without departing from the invention).

FIGS. 4 through 8 show an example power transmission mechanism 70 that transmits power from the motor 67 to the separation roller 34. The power transmission mechanism 70 also is referred to as a "first power transmission mechanism" in this specification. The power transmission mechanism 70 is configured to transmit power in a sheet feeding direction to the separation roller 34 when the motor 67 rotates in a clockwise (CW) direction and to interrupt the power transmission to the separation roller 34 when rotation of the motor 67 is changed from the CW direction to a counterclockwise (CCW) direction. The CW direction and the CCW direction refer to opposing rotation directions of the motor 67, which are a forward direction and a reverse direction.

Figure 4:
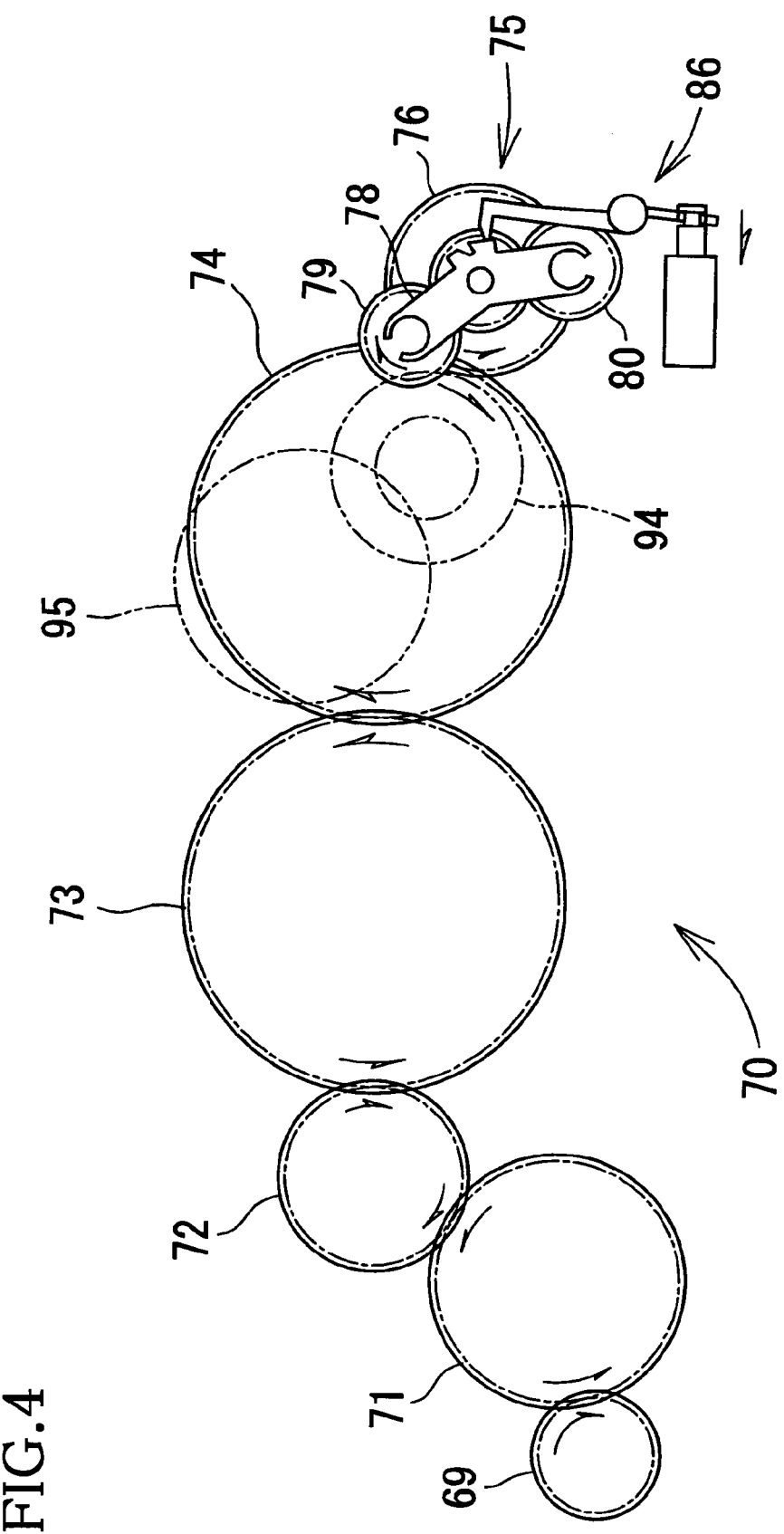
FIGS. 4, 5, 7, and 8 illustrate a structure of a first power transmission mechanism that may be used in accordance with some examples of this invention.

As shown in FIG. 4, a drive gear 69, which is provided on a driving shaft of the motor 67, and four transmission gears 71, 72, 73, and 74 are successively engaged, so that power is transmitted to a planetary gear device 75. The transmission gear 71 functions as a transmission gear shared among the first power transmission mechanism, a second power transmission mechanism, and a third power transmission mechanism in this structure. In this example structure, the transmission gear 71 is shared among a power transmission mechanism 70 that transmits power to the separation roller 34, a power transmission mechanism 120 that transmits power to the feed rollers 35A, 35B, 35C, and 35D, a power transmission mechanism 150 that transmits power to the bidirectional feed roller 43, and a power transmission mechanism 170 that transmits power to the guide flap 50. The transmission gear 72 in the power transmission mechanism 70 is shared as a sun gear 72 in the power transmission mechanism 150 that transmits power to the bidirectional feed roller 43 and a transmission gear in the power transmission mechanism 170 that transmits power to the guide flap 50. The transmission gear 73 in the power transmission mechanism 70 is shared as a transmission gear in the power transmission mechanism 170 that transmits power to the guide flap 50. Thus, the third power transmission mechanism described in more detail herein branches from the second power transmission mechanism. Upon the rotation of the motor 67 in the CW or CCW direction, the transmission gears 71, 72, 73, which are successively engaged, rotate in a specified direction, and power is transmitted to the transmission gear 74 so that the gear 74 rotates in the CCW or CW direction.

Figure 6:
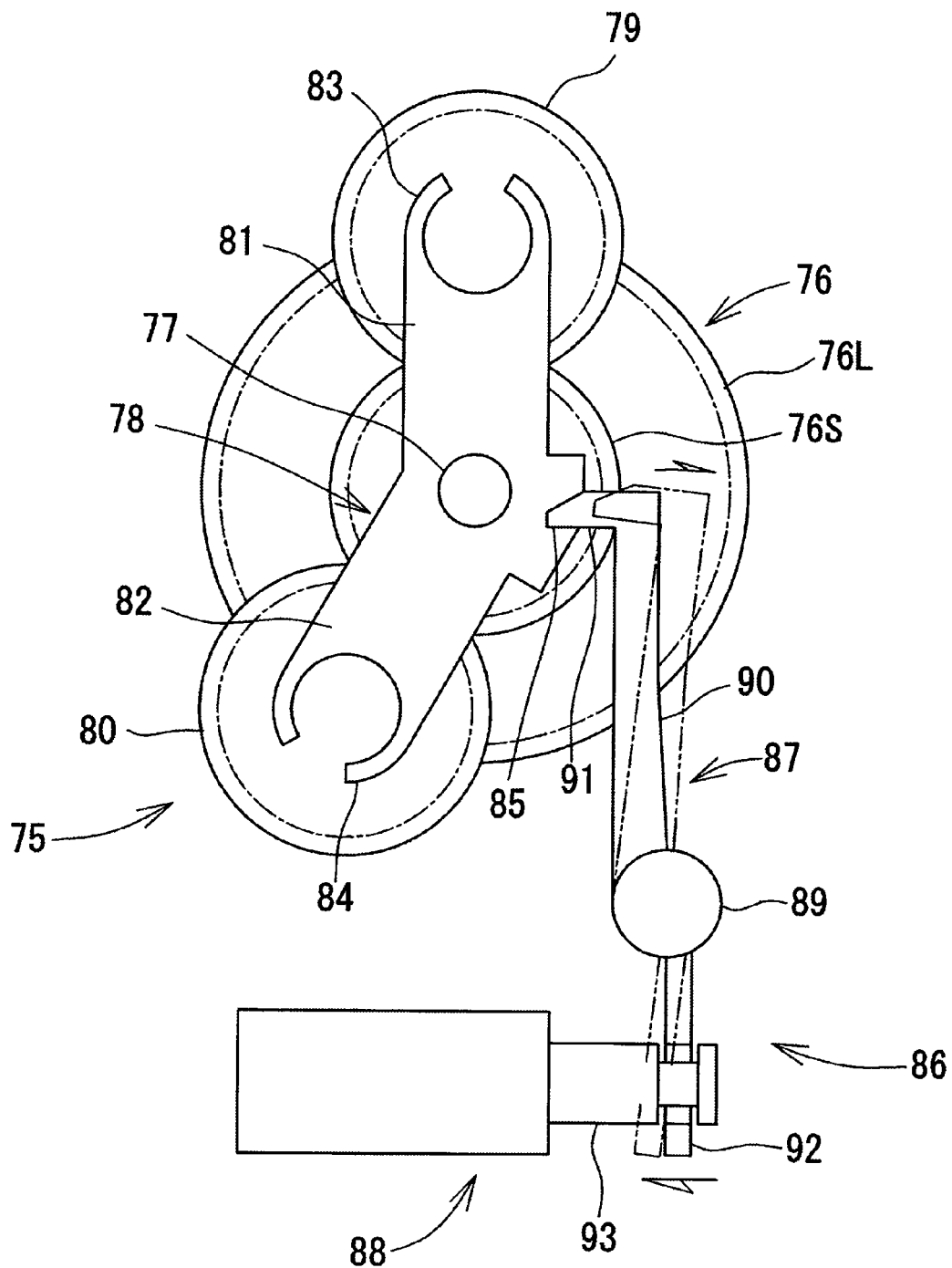
FIG. 6 illustrates a planetary gear device and an engagement mechanism that may be used in accordance with some examples of this invention.

FIG. 6 shows a structure of an example planetary gear device 75 in more detail. In this example planetary gear device 75, a support arm 78 is rotatably provided coaxially with a shaft 77 of a sun gear 76, and two planet gears 79 and 80, which engage with the sun gear 76 independently, are supported by the support arm 78.

The sun gear 76 is a double gear in which a large-diameter gear 76L and a small-diameter gear 76S are formed coaxially and integrally. The support arm 78 includes arm portions 81, 82 independently extending from the shaft 77, and bearing portions 83, 84 formed at outer ends of the arm portions 81, 82 to support the planet gears 79, 80. The planet gears 79, 80 supported by the support arm 78 are in engagement with the gear 76S of the sun gear 76, individually. When the sun gear 76 rotates, the planet gears 79, 80, which are individually engaged with the gear 76S, also rotate. In addition, upon the rotation of the sun gear 76, the support arm 78 also rotates in the same direction. Namely, when the sun gear 76 rotates, the planet gears 79, 80 rotate on their respective axis and rotate around the sun gear 76.

A recessed portion 85 is formed near the shaft 77 of the support arm 78. The recessed portion 85 is engaged with an engagement mechanism 86, so that the support arm 78 is restrained in position irrespective of rotation of the sun gear 76.

The engagement mechanism 86 of this example structure is made up of an engaging member 87 and the pick-up solenoid 88. The engaging member 87 includes an arm portion 90 that extends from the shaft 89 to the support arm 78; a stopper 91 that is formed at an end of the arm portion 90 and in a hook shape; and a passive portion 92 that extends from the shaft 89. The stopper 91 is capable of engaging with the recessed portion 85 of the support arm 78, and it may be engaged with or disengaged from the recessed portion 85 when the arm portion 90 is rotated on the shaft 89. The passive portion 92 is connected to a shaft 93 of the pick-up solenoid 88. The pick-up solenoid 88 is designed so that when the pick-up solenoid 88 is energized (e.g., the solenoid 88 is on), the pick-up solenoid 88 will produce electromagnetic power to drive the shaft 93 straightly in a direction to insert the shaft 93 into the solenoid main body, and when the pick-up solenoid 88 is not energized (e.g., the solenoid 88 is off), the electromagnetic power disappears and the shaft 93 is caused to elastically return to its previous position in a direction to project the shaft 93 from the solenoid main body. The movement of the shaft 93 is transmitted to the passive portion 92, the engaging member 87 is rotated on the shaft 89, and held in position. When the pick-up solenoid 88 is off, the engaging member 87 is positioned so that the stopper 91 is engaged in the recessed portion 85 as indicated with a solid line of FIG. 6. When the pick-up solenoid 88 is on, the engaging member 87 is positioned so that the stopper 91 is disengaged from the recessed portion 85 as indicated with a double-dashed chain line of FIG. 6. Of course, other mechanisms or structures may be used for this purpose and function without departing from this invention.

As shown in FIG. 4, the transmission gear 74 is in engagement with the gear 76L of the sun gear 76 of the planet gear device 75. When power is transmitted from the motor 67 to the transmission gear 74 and the transmission gear 74 rotates in one direction, the sun gear 76 is rotated in the other direction. For example, as shown in FIG. 4, when the drive gear 69 rotates in the CW direction, the transmission gear 74 rotates in the CW direction, and the sun gear 76 rotates in the CCW direction. When the pick-up solenoid 88 is on, the support arm 78 is rotatable, so that the planet gears 79, 80 rotate around the sun gear 76 in the CW direction. Preferably, the pick-up solenoid 88 is turned on only when the stopper 91 is disengaged from the engagement/disengagement mechanism 85. Even if the pick-up solenoid 88 is turned off after the support arm 78 rotates from the disengagement position, the stopper 91 is not engaged in the recessed portion 85.

Figure 5:
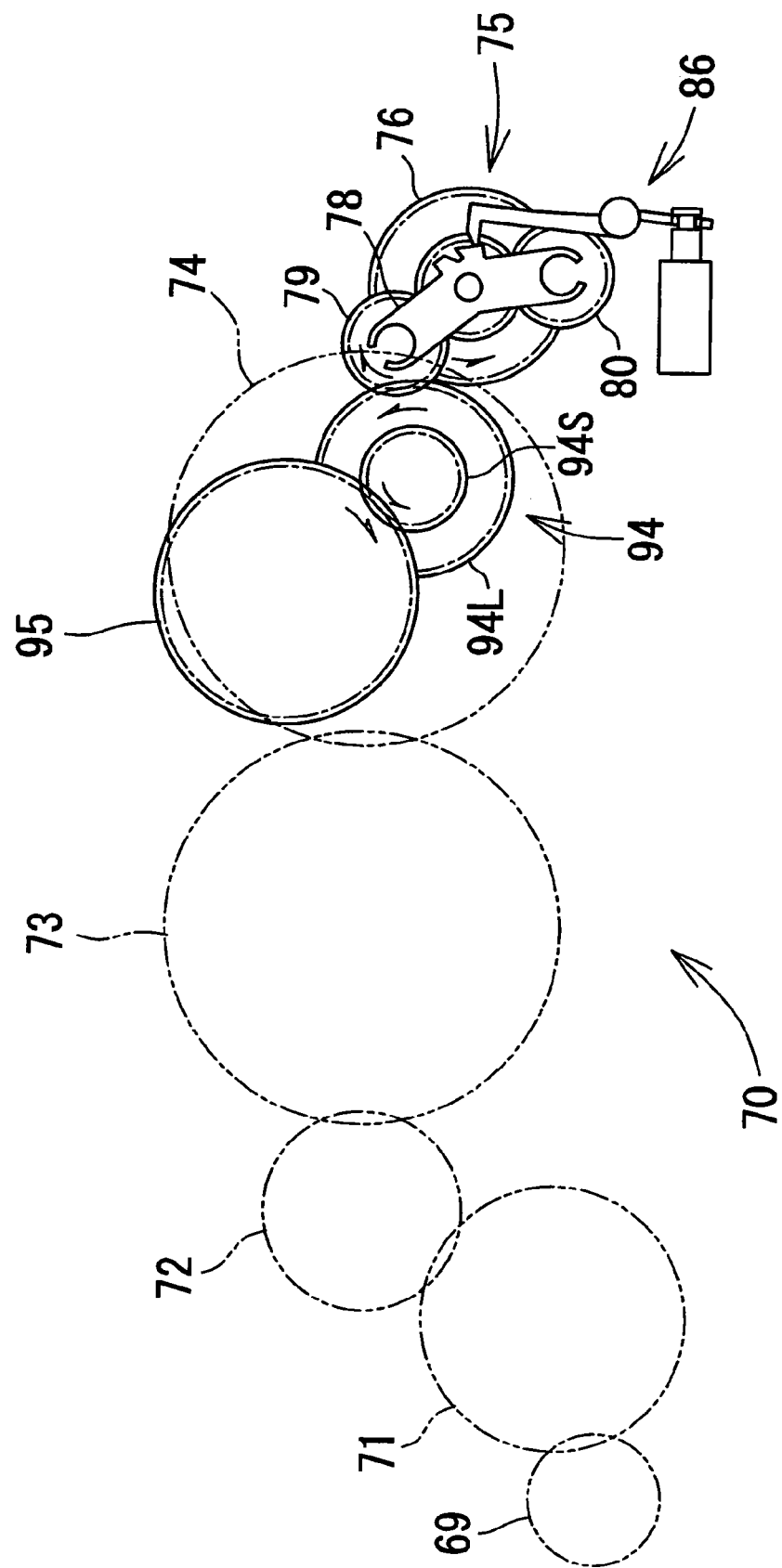

As shown in FIG. 5, the transmission gear 94 is disposed adjacent to the planet gear device 75. The transmission gear 94 is capable of engaging with and disengaging from the planet gears 79, 80 of the planet gear device 75. As the planet gears 79, 80 rotate around the sun gear 76 in the CCW direction, the planet gear 79 engages with the transmission gear 94, whereas the planet gear 80 disengages from the transmission gear 94. The transmission gear 94 is a double gear in which a large-diameter gear 94L and a small-diameter gear 94S are formed coaxially and integrally. The planet gears 79, 80 are capable of engaging with the large-diameter gear 94L. The small-diameter gear 94S is in engagement with a driven gear 95 provided at a shaft 111 (FIG. 9) that supports the separation roller 34. The specific gear structure or arrangement from the transmission gear 94 to the driven gear 95 is not limited, and many variations may be used without departing from the invention. Also, the number of transmission gears and their diameter size can be changed as necessary, e.g., according to the length from the transmission gear 94 to the driven gear 95, etc.

When the planet gear 79, which rotates around the sun gear 76 in the CCW direction, engages with the transmission gear 94, the planet gear 79 is restrained from rotating around the sun gear 76. Then, as the planet gear 79 receives power transmitted from the sun gear 76, the planet gear 79 rotates on its axis. After that, the transmission gear 94 rotates in the CCW direction, and the driven gear 95 rotates in the CW direction. As the driven gear 95 rotates in the CW direction, the shaft 111 that supports the separation roller 34 is rotated in the sheet supply direction.

Figure 7:
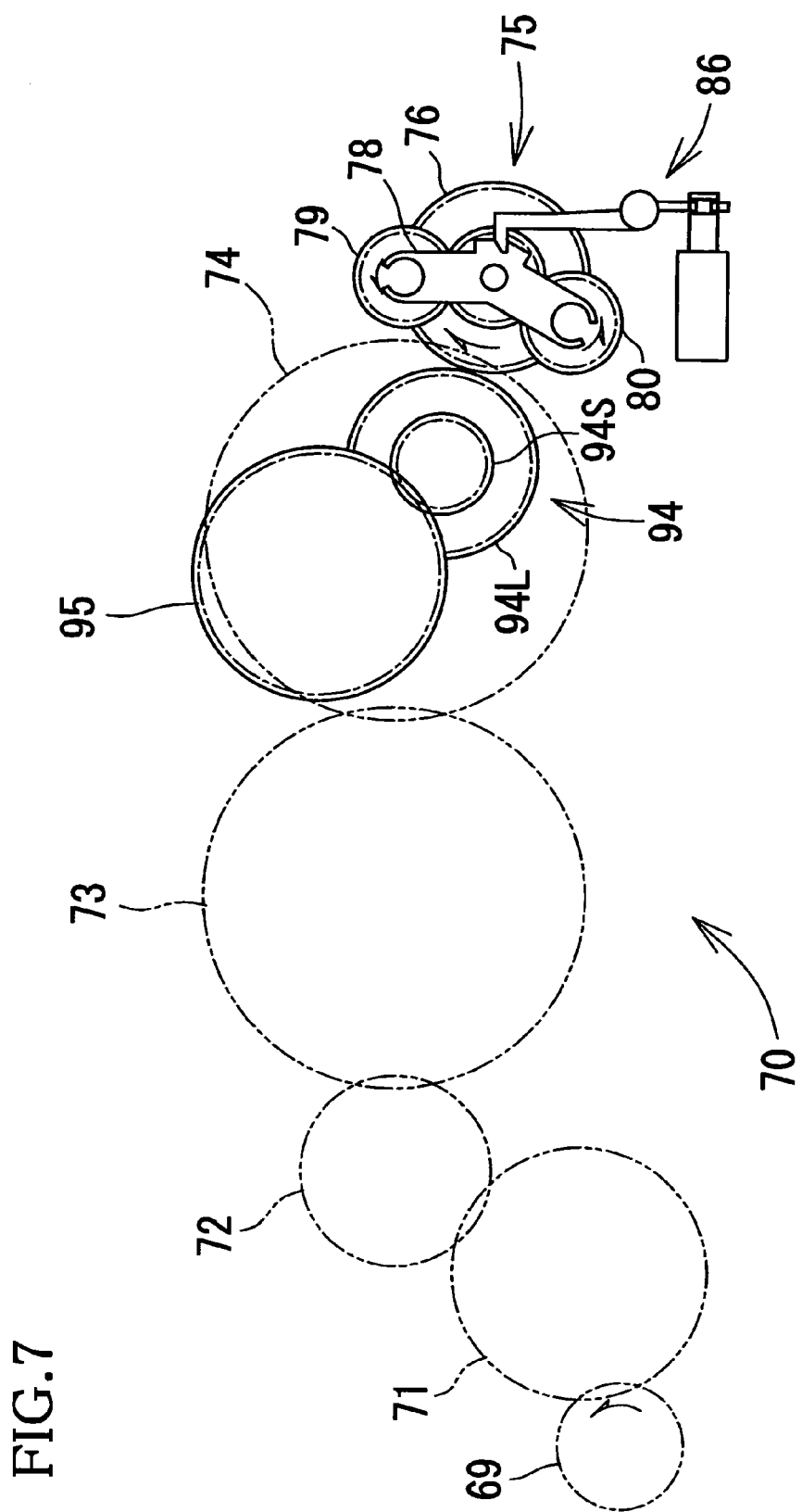

As shown in FIG. 7, when the rotation of the drive gear 69 is switched from the CW direction to the CCW direction, the transmission gear 74 rotates in the CCW direction, and the sun gear 76 rotates in the CW direction. As shown in FIG. 5, while the planet gear 79 is engaged with the transmission gear 94, the stopper 91 is not engaged with the recessed portion 85 even if the pick-up solenoid 88 is off. Thus, the support arm 78 is rotatable and the planet gears 79, 80 rotate around the sun gear 76 in the CW direction. The support arm 78 rotates along with the rotation of the planet gears 79, 80, and the recessed portion 85 of the support arm 78 is brought in a position where it is engageable with the stopper 91. At this time, if the pick-up solenoid 88 is off, the stopper 91 engages in the recessed portion 85 as shown in FIG. 7, and further rotation of the support arm 78 is restrained. With this condition, the planet gears 79, 80 are not in engagement with the transmission gear 94. The position of the support arm 78 where the planet gears 79, 80 are disengaged from the transmission gear 94 is referred to as a "disengagement position" in this specification. When the stopper 91 is engaged in the recessed portion 85, the support arm 78 is locked so as not to rotate and held in the disengagement position until the pick-up solenoid 88 is turned on the next time.

Figure 8:
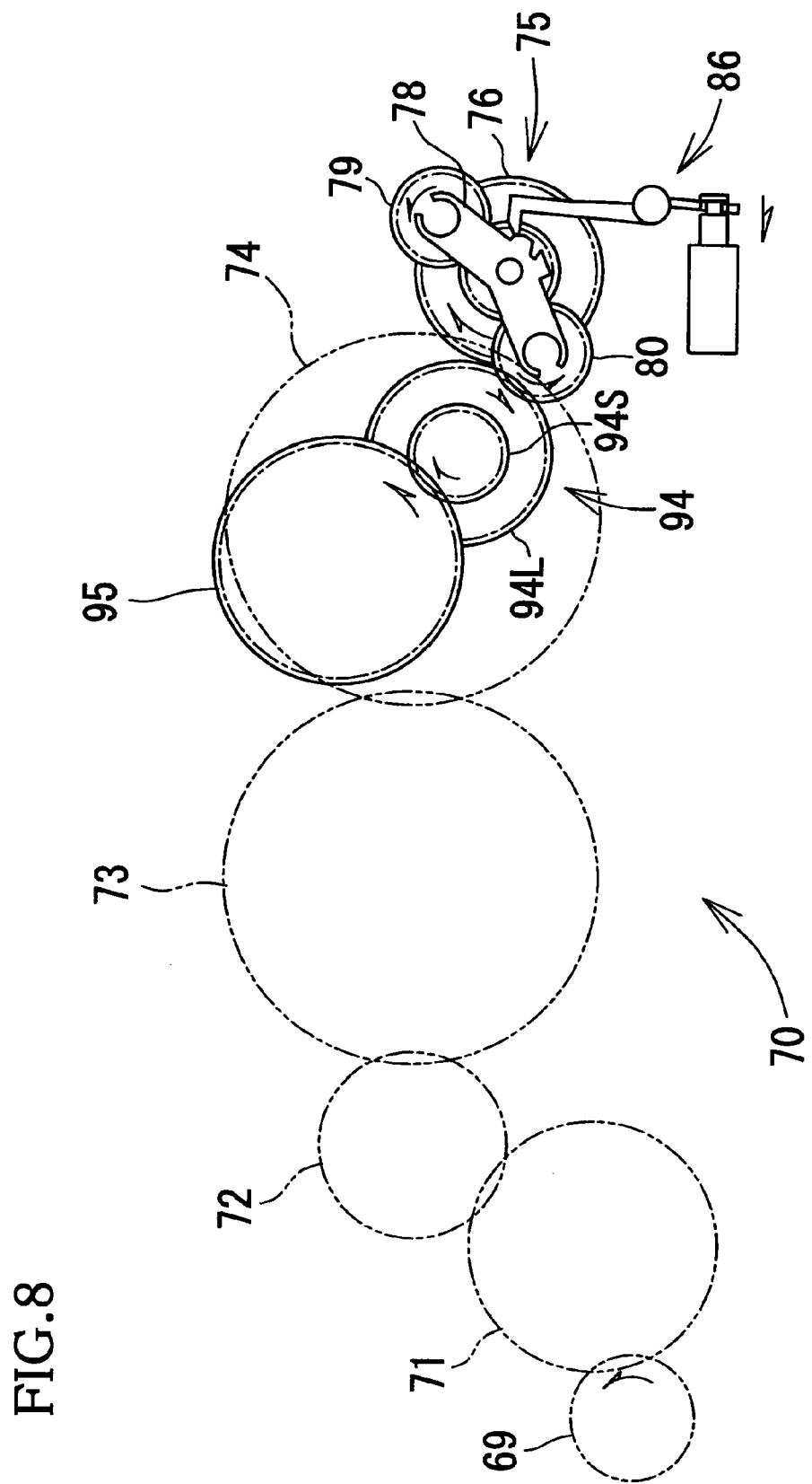

As shown in FIG. 8, when the pick-up solenoid 88 is turned on, the planet gears 79, 80 rotate around the sun gear 76 in the CW direction based on the rotation of the sun gear 76 in the CW direction. When the planet gear 80 rotating around the sun gear 76 in the CW direction then engages with the transmission gear 94, the planet gear 80 is restrained from further rotating around the sun gear 76. The planet gear 80 receives power transmitted from the sun gear 76, and it rotates on its axis in the CCW direction. This causes the transmission gear 94 to rotate in the CW direction, and the driven gear 95 then rotates in the CCW direction. When the driven gear 95 rotates in the CCW direction, the shaft 111 that supports the separation roller 34 is rotated in a direction opposite to the sheet feeding direction. In this manner, the transmission gears 72, 73, 74, 94, and the planet gear device 75 function as a gear train of the first power transmission mechanism.

The following describes an example power transmission mechanism 110 from the shaft 111 that supports the separation roller 34 to the pickup roller 33. As shown in FIG. 2, the pickup roller 33 in this example structure is supported at the end of the arm 29 and is disposed away from the separation roller 34 in the direction opposite to the sheet feeding direction. As described above, power of the motor 67 is transmitted to the shaft 111 and from the shaft 111 to the arm 29, the pickup roller 33 and the separation roller 34.

Figure 9:
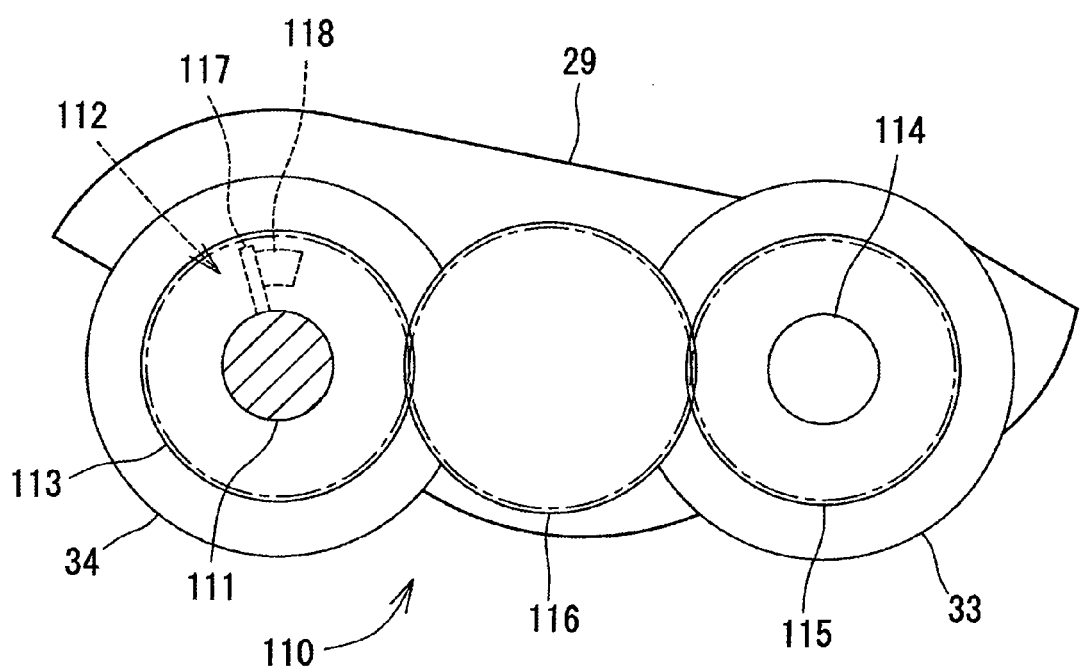
FIG. 9 illustrates a structure of a second power transmission mechanism that may be used in accordance with some examples of this invention.

FIG. 9 shows an example power transmission mechanism 110 from the shaft 111 to the pickup roller 33. The power transmission mechanism 110 includes a one-way clutch 112 provided at the shaft 111, a gear 113 integrally formed with the separation roller 34, a gear 115 fixed to a shaft 114 of the pickup roller 33, and a transmission gear 116 that transmits power from the gear 113 to the gear 115. The separation roller 34 is rotatably supported by the shaft 111. The one-way clutch 112 and the gear 113 are provided at one end of the separation roller 34 with respect to its axial direction. In FIG. 9, the one-way clutch 112 is provided at the rear side of the separation roller 34, and the gear 113 is provided at the front side of the separation roller 34. Thus, the one-way clutch 112 provided at the rear side of the separation roller 34 is indicated by a dotted line. Of course other structures and structural arrangements are possible without departing from this invention.

The one-way clutch 112 of this example structure is made up of a collar 117 attached to the shaft 111 via the gear 113 and the one-way clutch 112, and an engagement tab 118 projecting from the separation roller 34 in an axial direction. The collar 117 is provided at a side of the separation roller 34, and it rotates along with the shaft 111. The engagement tab 118 projects from a circumferential surface of the separation roller 34 in the axial direction. As shown in the figure, when the collar 117 is engaged with the engagement tab 118, the rotation of the shaft 111 is transmitted to the separation roller 34 via the collar 117 and the engagement tab 118, and the separation roller 34 is rotated in the same direction as the shaft 111.

As the separation roller 34 is rotatable on the shaft 111, it is rotatable in a direction where the engagement tab 118 separates from the collar 117. When the separation roller 34 makes substantially one rotation on the shaft 111, the engagement tab 118 reaches the collar 117 in engagement therewith. This enables the separation roller 34 to idle only for one rotation irrespective of the power transmission from the shaft 111.

The transmission gear 116 is interposed between the gear 113 provided at the separation roller 34 and the gear 115 fixed at the shaft 114 of the pickup roller 33. The transmission gear 116 is in engagement with the gears 113 and 115. The transmission gear 116 is rotated upon the rotation of the gear 113, and then the gear 115 is rotated. As the gear 115 is fixed to the shaft 114 of the pickup roller 33, the pickup roller 33 is rotated along with the rotation of the gear 115. That is, the separation roller 34 and the pickup roller 33 are always rotated in the same direction. With such a power transmission mechanism 110, power is transmitted from the shaft 111 that rotatably supports the separation roller 34 to the separation roller 34 and the sheet supply roller 33.

As shown in the example structure of FIG. 9, the arm 29 is rotatably supported by the shaft 111 at its proximal end, receives power transmitted from the shaft 111, and moves vertically. A sliding clutch (not shown) is provided between the shaft 111 and the proximal end of the arm 29. By the sliding clutch, the rotation of the shaft 111 is transmitted to the arm 29. The sliding clutch is designed so as to interrupt power transmission by sliding a clutch plate when it undergoes a load of more than a specified torque. When the shaft 111 rotates in the CW direction, the rotational force is transmitted to the arm 29 via the sliding clutch, and the arm 29 rotates in a direction to lower the pickup roller 33. On the contrary, when the shaft 111 rotates in the CCW direction, the arm 29 rotates in a direction to raise the pickup roller 33. As shown in FIG. 2, if the arm 29 rotates in the direction to lower the pickup roller 33, the pickup roller 33 comes in contact with the guide surface of the document feed path 32 or a document on the input tray 30. Accordingly, a load takes place in response to the rotation of the arm 29, the sliding clutch is slid, and the shaft 111 can be further rotated with the arm 29 standing still. If the arm 29 rotates in the direction to raise the pickup roller 33, it comes in contact with the housing of the ADF 3. Accordingly, a load takes place in response to the rotation of the arm 29, the sliding clutch is slid, and the shaft 111 can be further rotated with the arm 29 standing still. Thus, power is transmitted from the shaft 111 via the sliding clutch to the arm 29, and the arm 29 is moved to lower or raise the pickup roller 33 with respect to the guide surface of the document feed path 32. Of course, other ways of and/or structures for feeding and/or separating the sheets may be used without departing from this invention.

Figure 10:
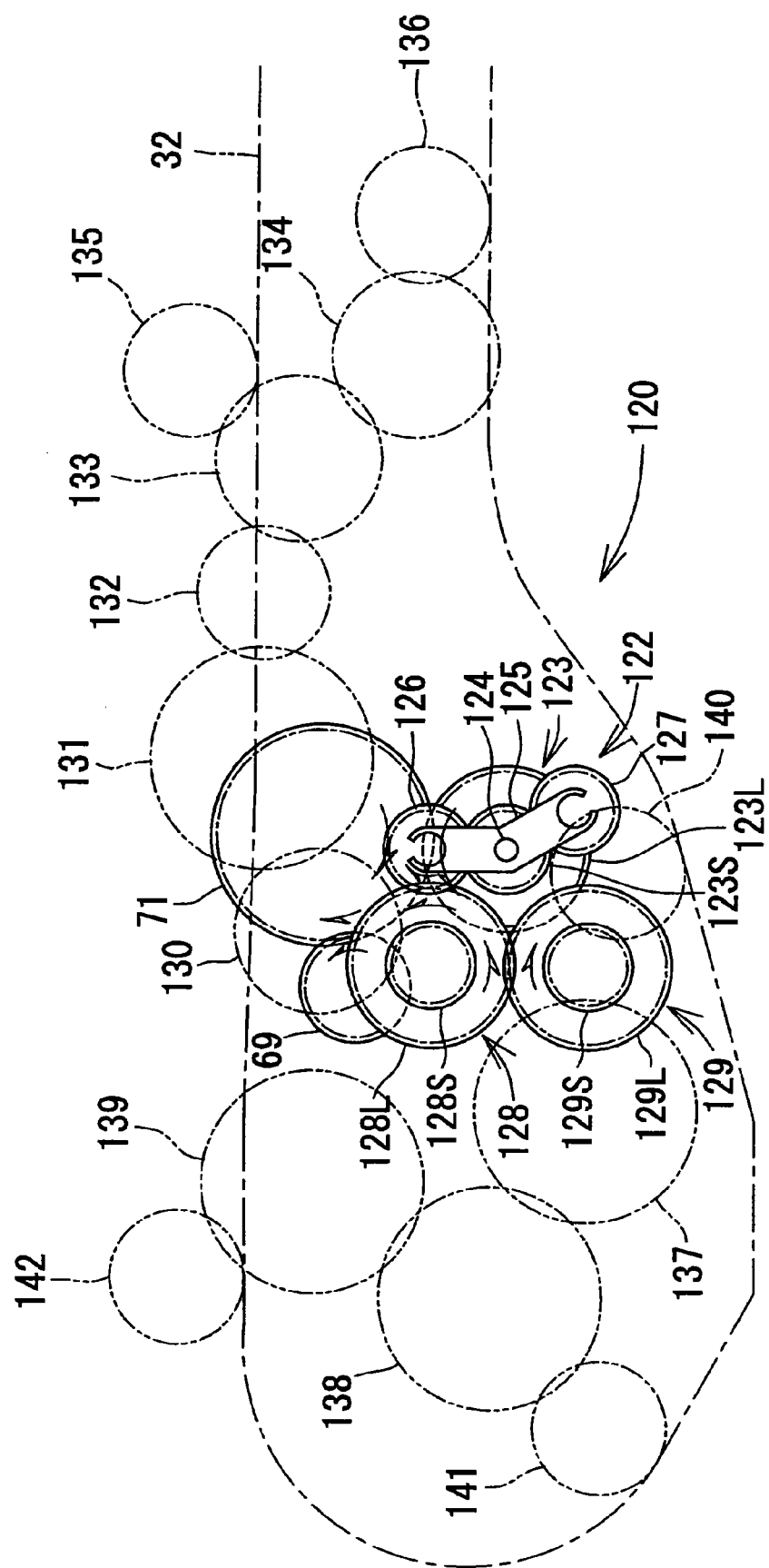
FIGS. 10 through 12 illustrate a structure of a third power transmission mechanism that may be used in accordance with some examples of this invention.
Figure 11:
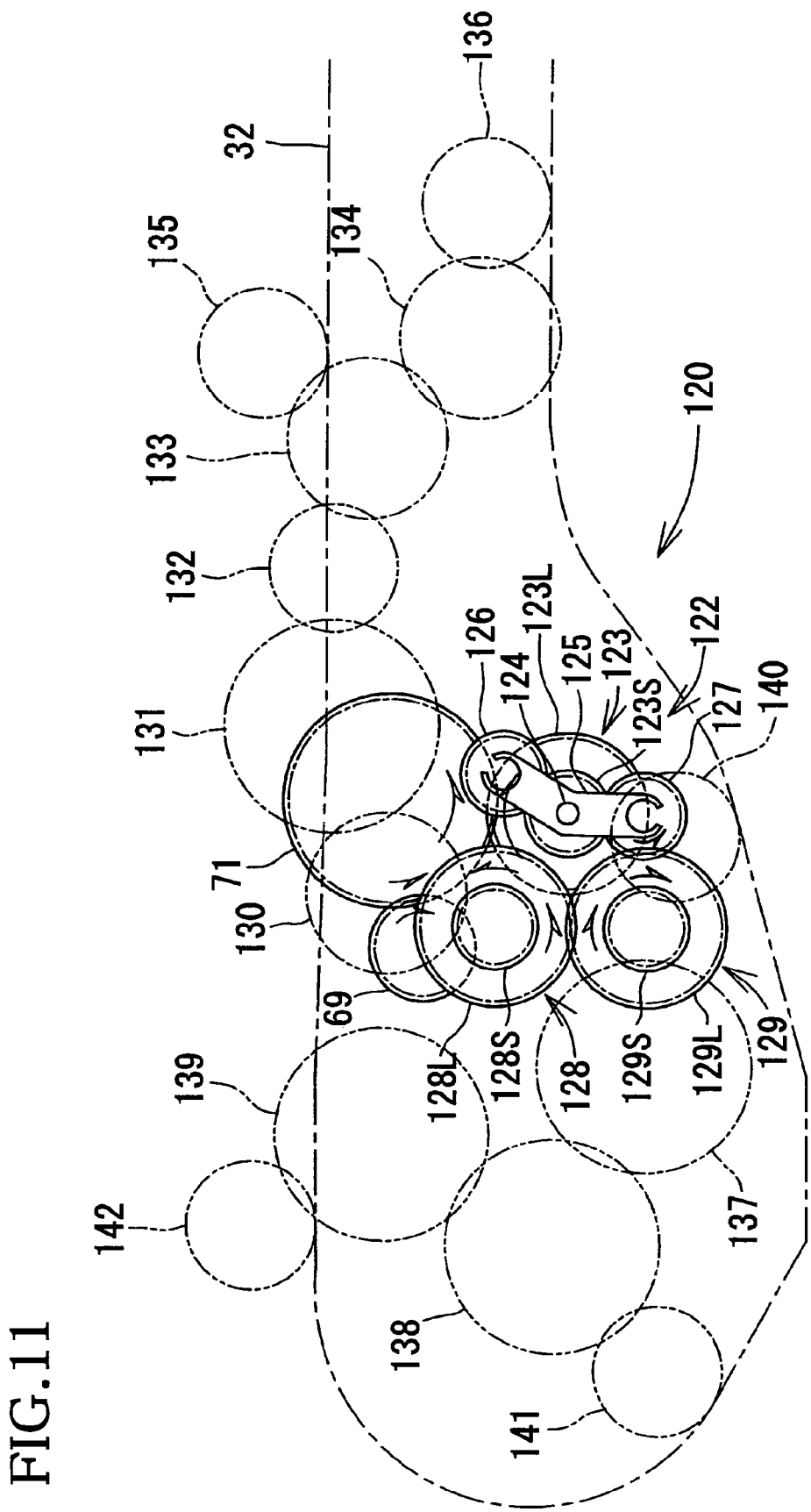
Figure 12:
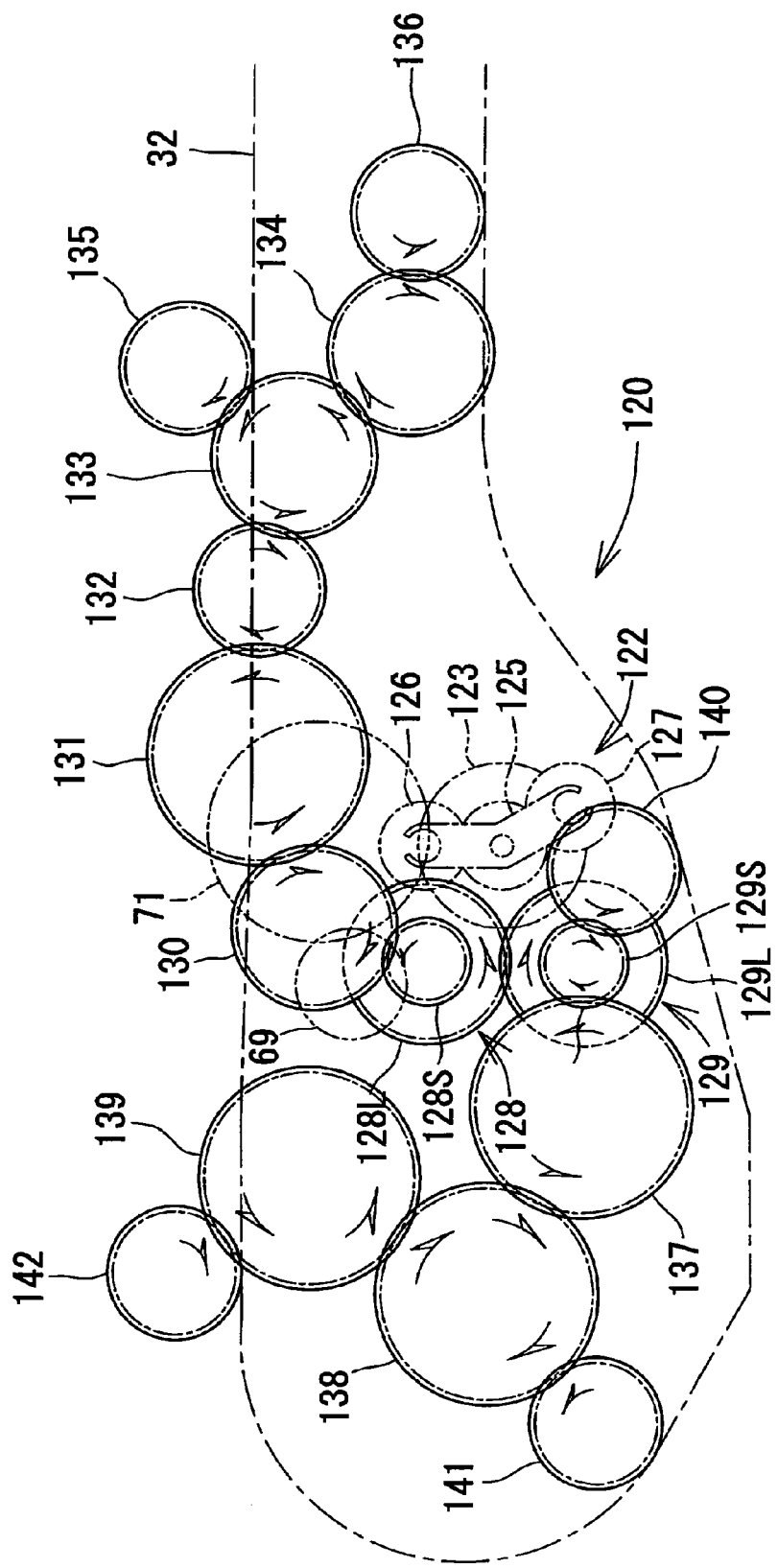

FIGS. 10 through 12 show an example power transmission mechanism 120 from the motor 67 to the feed rollers 35A, 35B, 35C, and 35D. The power transmission mechanism 120 transmits power to the feed rollers 35A, 35B, 35C, and 35D in the sheet feeding direction, or from the upstream side of the document feed path 32 to the downstream side thereof, irrespective of the rotational direction of the motor 67. The power transmission mechanism 120 also is referred to as a "second power transmission mechanism" in this specification.

As shown in FIG. 10, the transmission gear 71 is engaged with the drive gear 69 provided at the drive shaft of the motor 67, and power is transmitted to a planet gear device 122. As described above, the transmission gear 71 is shared among, in addition to the power transmission mechanism 120, the power transmission mechanism 70 that transmits power to the separation roller 34, the power transmission mechanism 150 that transmits power to the bidirectional feed roller 43, and the power transmission mechanism 170 that transmits power to the guide flap 50. Upon rotation of the motor 67 in the CW or CCW direction, power is transmitted to the transmission gear 71 so that it can rotate in the CW or CCW direction.

The planet gear device 122 is configured so that a support arm 125 is rotatably supported and provided coaxially with a shaft 124 of a sun gear 123, and the sun gear 123 and two planet gears 126, 127, which are engaged with the sun gear 123, are supported by the support arm 125. Of course, other structures are possible without departing from the invention. For example, if desired, planet gear 126 may be omitted and the support arm 125 may support a single planet gear 127 that moves to the various desired positions. Other variations also are possible.

The sun gear 123 in this example structure is a double gear in which a large-diameter gear 123L and a small-diameter gear 123S are formed coaxially and integrally. The planet gears 126, 127, which are supported by the support arm 125, are independently engaged with the gear 123S of the sun gear 123. When the sun gear 123 rotates, the planet gears 126, 127 also rotate. Upon rotation of the sun gear 123, the support arm 125 also rotates in the same direction. Namely, when the sun gear 123 rotates, the planet gears 126, 127 rotate on their respective axis and rotate around the sun gear 123.

The transmission gear 71 is in engagement with the gear 123L of the sun gear 123 of the planet gear device 122. When power is transmitted from the motor 67 to the transmission gear 71, the transmission gear 71 rotates in one direction, and the sun gear 123 is rotated in the other direction. For example, as shown in FIG. 10, when the drive gear 69 rotates in the CCW direction, the transmission gear 71 rotates in the CW direction, the sun gear 123 rotates in the CCW direction, and the planet gears 126, 127 rotate around the sun gear 123 in the CCW direction.

As shown in FIG. 10, transmission gears 128, 129 are disposed adjacent to the planet gear device 122. Transmission gear 128 is a double gear in which a large-diameter gear 128L and a small-diameter gear 128S are formed coaxially and integrally. Similarly, transmission gear 129 is a double gear in which a large-diameter gear 129L and a small-diameter gear 129S are formed coaxially and integrally. The planet gear 126 of the planet gear device 122 is capable of engaging with and disengaging from the gear 128L of the transmission gear 128. The planet gear 127 of the planet gear device 122 is capable of engaging with and disengaging from the gear 129L of the transmission gear 129. In addition, the gears 128L and 129L are engaged with each other. Optionally, if desired, planet gear 127 may be arranged on the support arm 125 and capable of engaging both gears 128L and 129L.

As shown in FIG. 10, as the planet gears 126, 127 rotate around the sun gear 123 in the CCW direction, the planet gear 126 engages with the gear 128L of the transmission gear 128, whereas the planet gear 127 disengages from the transmission gear 129. When the planet gear 126 rotating around the sun gear 123 in the CCW direction engages with the transmission gear 128, the planet gears 126, 127 are restrained from rotating around the sun gear 123. The planet gear 126 receives power transmitted from the sun gear 123 and rotates on its axis in the CW direction. Then, the transmission gear 128 rotates in the CCW direction. The transmission gear 129, which is in engagement with the transmission gear 128, rotates in the CW direction.

As shown in FIG. 11, when the drive gear 69 rotates in the CW direction, the transmission gear 71 rotates in the CCW direction, the sun gear 123 rotates in the CW direction, and the planet gears 126, 127 rotate around the sun gear 123 in the CW direction. As the planet gears 126, 127 rotate around the sun gear 123 in the CW direction, the planet gear 127 engages with the gear 129L of the transmission gear 127, and the planet gear 126 disengages from the transmission gear 128. When the planet gear 127 rotating around the sun gear 123 in the CW direction engages with the transmission gear 129, the planet gears 126, 127 are restrained from rotating around the sun gear 123. Then, the planet gear 127 receives power transmitted from the sun gear 123 and rotates on its axis in the CCW direction. In response to this, the transmission gear 129 rotates in the CW direction. The transmission gear 128, which is in engagement with the transmission gear 129, rotates in the CCW direction. Thus, irrespective of the rotation direction of the drive gear 69, the transmission gear 128 receives the power in the CCW direction, and the transmission gear 129 receives the power in the CW direction.

FIG. 12 shows power transmission from the transmission gears 128, 129 to the feed rollers 35A, 35B, 35C, 35D and the ejection roller 36. The gear 128S of the transmission gear 128, and five transmission gears 130, 131, 132, 133, 134 are successively engaged. The transmission gear 133 is engaged with a driven gear 135 provided at the shaft of the feed roller 35A, the transmission gear 134 is engaged with a driven gear 136 provided at the shaft of the ejection roller 36. As described above, the transmission gear 128 rotates in the CCW direction irrespective of the rotation direction of the drive gear 69, power is transmitted from the transmission gear 128 to the five transmission gears 130, 131, 132, 133, 134, successively, the driven gear 135 rotates in the CW direction, and the driven gear 136 rotates in the CCW direction. When the driven gear 135 rotates in the CW direction, the feed roller 35A is rotated in the sheet feeding direction. When the driven gear 136 rotates in the CCW direction, the ejection roller 36 is rotated in the sheet feeding direction.

The gear 129S of the transmission gear 129 and three transmission gears 137, 138, 139 are successively engaged. The gear 129S is engaged with a driven gear 140 provided at the shaft of the feed roller 35D, the transmission gear 138 is engaged with a driven gear 141 provided at the shaft of the feed roller 35C, and the transmission gear 139 is engaged with a driven gear 142 provided at the shaft of the feed roller 35B. As described above, the transmission gear 129 rotates in the CW direction irrespective of the rotation direction of the driven gear 69, and power is transmitted from the transmission gear 129 to the three transmission gears 137, 138, 139, successively. In response to this, the driven gears 140, 141 rotate in the CCW direction, and the driven gear 142 rotates in the CW direction. When the driven gears 140, 141 rotate in the CCW direction, the feed rollers 35D, 35C are rotated in the sheet feeding direction. As the driven gear 142 rotates in the CW direction, the feed roller 35B is rotated in the sheet feeding direction. Thus, irrespective of the rotational direction of the drive gear 69, power in the sheet feeding direction is transmitted to each feeding roller 35A, 35B, 35C, 35D and the ejection roller 36.

The planet gear device 122 and the transmission gears 128 to 134, 137 to 139 function as a gear train of the second power transmission mechanism. As shown in FIG. 12, in a gear train comprised of the transmission gears 128, 129, and 137 to 139, power is transmitted from the feed roller 35D, which is disposed directly downstream of the reading position, toward the upstream side of the document feed path 32 with respect to the sheet feeding direction, to the feed rollers 35C and 35B in this order. To the feed roller 35A, which is disposed on the most upstream side of the document feed path 32 with respect to the sheet feeding direction, power is transmitted by a gear train comprised of the transmission gears 128, 130 to 133. In addition, power is transmitted to the feed roller 34A from the transmission gears 128, 129 via the four transmission gears 130 to 133. Thus, of the feed rollers 35A, 35B, 35C, and 35D, power is transmitted to the feed roller 35A via a gear train having the greatest number of gears. Namely, the feed roller 35A is the last in the sequence of the power transmission.

A document being fed on the document feed path 32 is pinched between the feed roller 35A and the pinch roller 37 on the upstream side with respect to the sheet feeding direction, between the feed roller 35B and the pinch roller 37, between the feed roller 35C and the pinch roller 37, and between the feed roller 35D and the pinch roller 37 on the downstream side, in this order. The document pinched between the feed roller 35A and the pinch roller 37 is pinched between the feed roller 35B and the pinch roller 37 before it is separated from between the feed roller 35A and the pinch roller 37. Similarly, before the document is separated from between the feed roller 35B and the pinch roller 37, it is pinched between the feed roller 35C and the pinch roller 37. Similarly, before the document is separated from between the feed roller 35C and the pinch roller 37, it is pinched between the feed roller 35D and the pinch roller 37.

As described above, in this example power transmission mechanism 120, power is transmitted from the feed roller 35D on the downstream side with respect to the sheet feeding direction, to the upstream side, to the feed rollers 35C, 35B, 35A, in this order, successively. Thus, for example, the feed roller 35D on the downstream side has less effect due to backlash of a gear train than the feed roller 35C on the upstream side. Similarly, the feed roller 35C has less effect due to backlash of the gear train than the feed roller 35B. Similarly, the feed roller 35B has less effect due to backlash of the gear train than the feed roller 35A. Thus, the document, which is to be pinched and fed by the feed rollers 35A, 35B, 35C, and 35D and their respective pinch rollers 37 successively, is always pinched by the feed roller that stably rotates under less influence due to backlash.

For example, from the feed roller 35C disposed directly upstream of the reading position on the document feed path 32 to the feed roller 35D disposed directly downstream of the reading position, after the leading end of the document pinched between the feed roller 35C and the pinch roller 37 passes through the reading position, it is pinched between the feed roller 35D and the pinch roller 37. As the feed roller 35D has less effect due to backlash than the feed roller 35C, its rotation is stable. In addition, when the leading end of the document is pinched between the feed roller 35D and the pinch roller 37, document feeding does not become unstable. Thus, document feeding at the reading position on the document feed path 32 can become stable.

Figure 13:
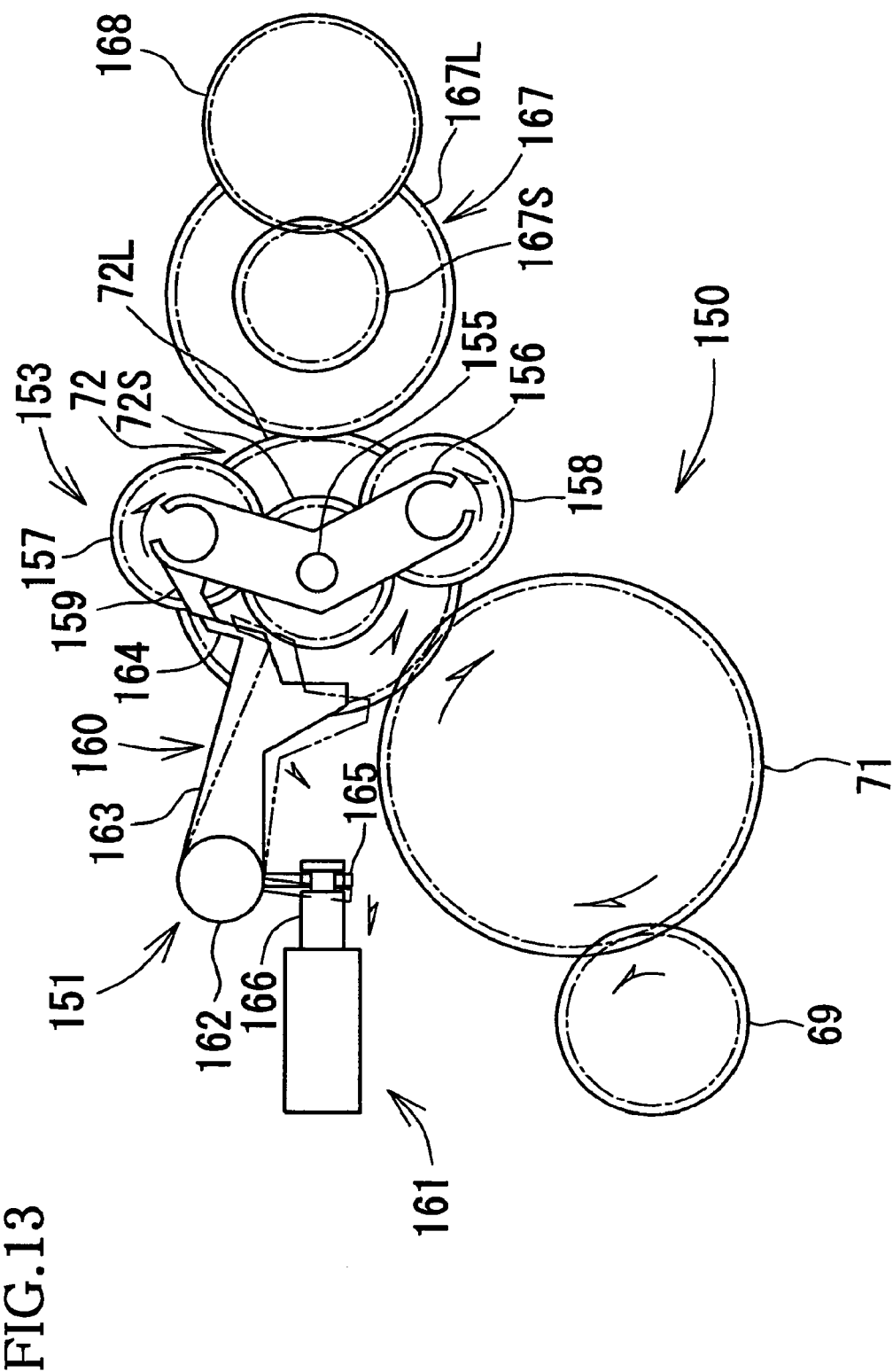
FIGS. 13 through 15 illustrate a structure of a fourth power transmission mechanism that may be used in accordance with some examples of this invention.
Figure 14:
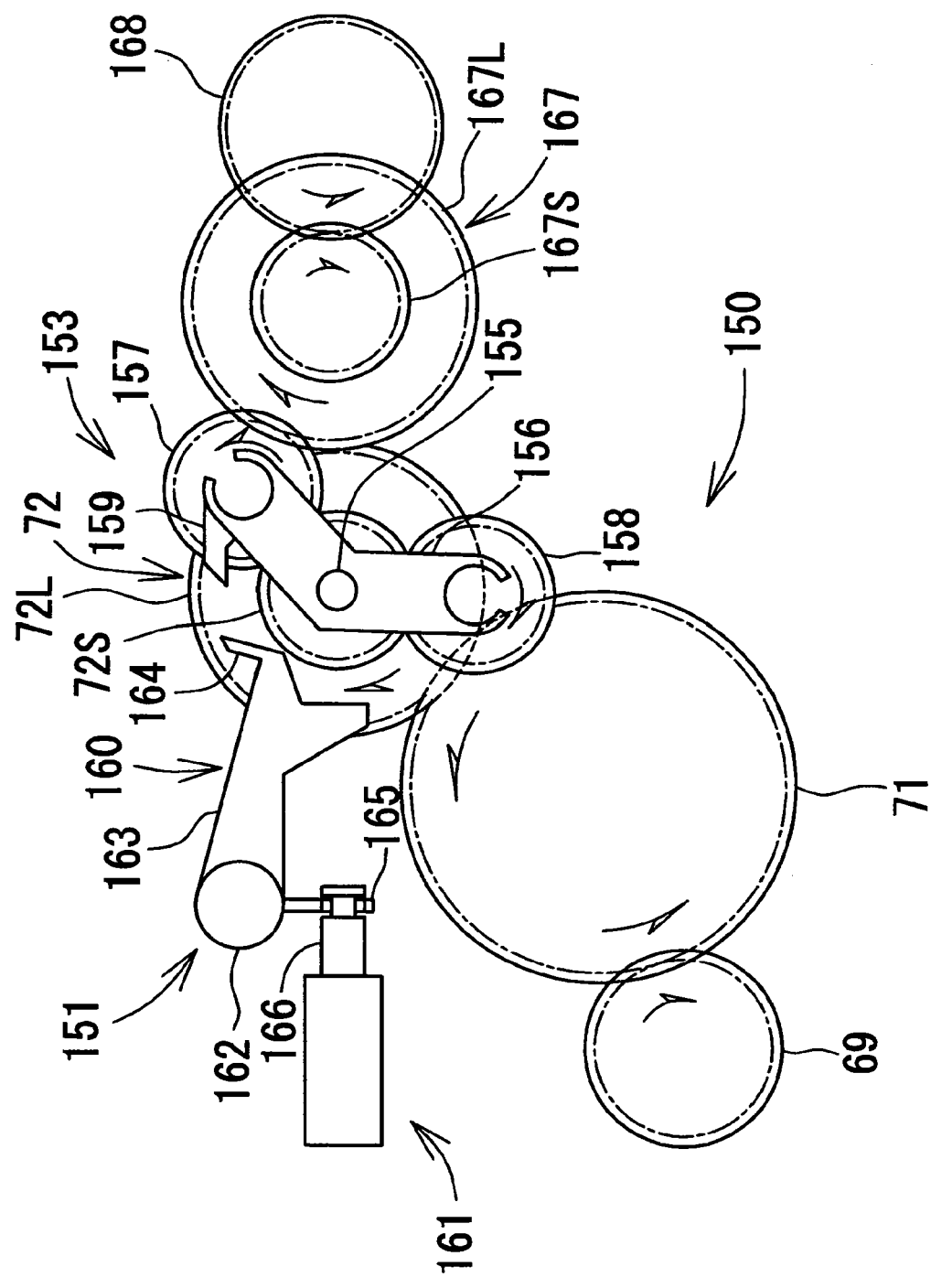
Figure 15:
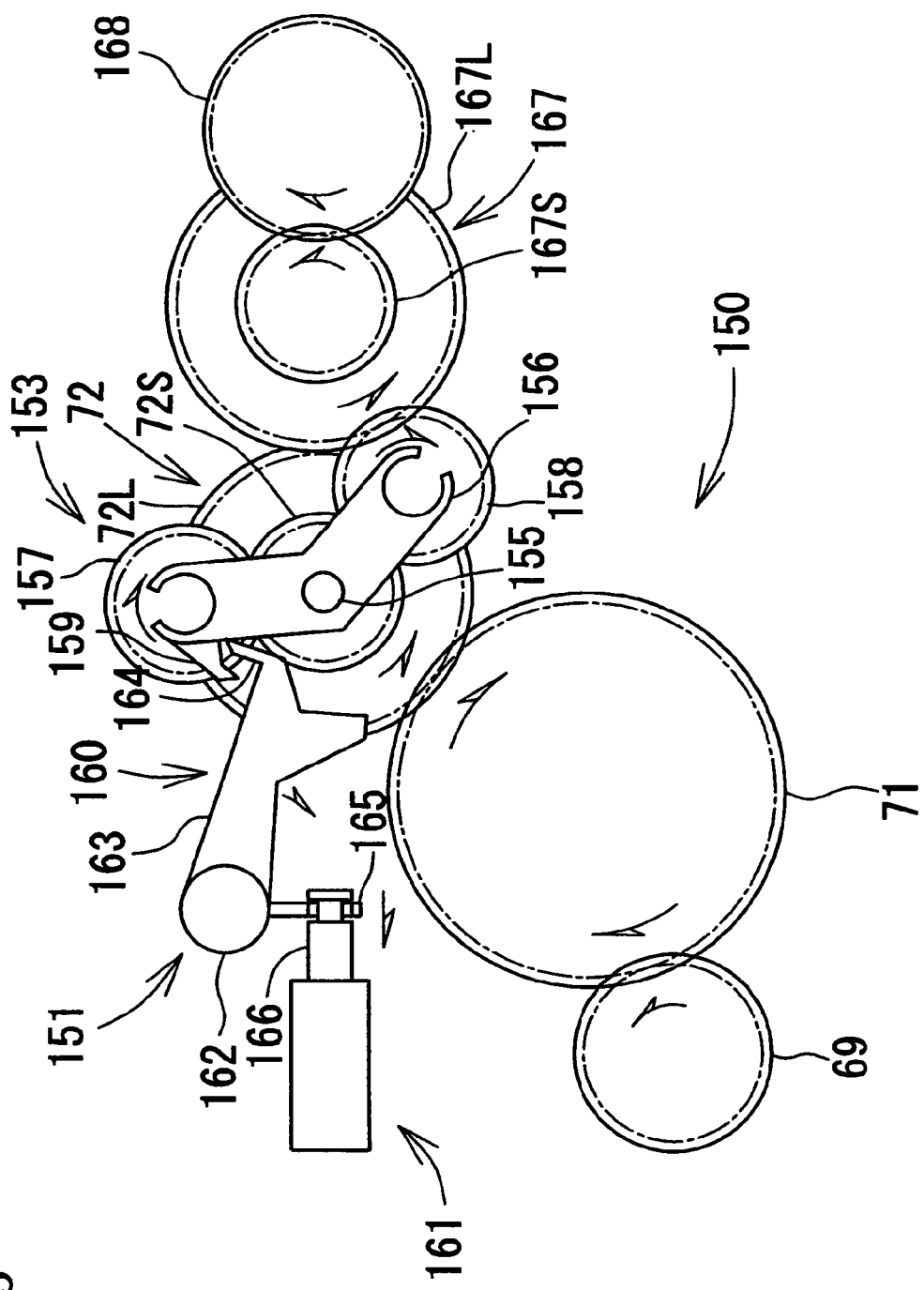

FIGS. 13 through 15 show an example power transmission mechanism 150 and an example power interruption mechanism 151 from the motor 67 to the bidirectional feed roller 43. The power transmission mechanism 150 transmits power to the bidirectional feed roller 43 in a draw direction or a return direction based on the rotational direction of the motor 67. The power interruption mechanism 151 interrupts the transmission of power from the motor 67 to the bidirectional feed roller 43 when the rotation direction of the motor 67 changes from the return direction to the draw direction. The draw direction is a direction where the document being fed is drawn from the document feed path 32 to the bidirectional feed path 39, and the return direction is a direction where the document being fed is returned from the bidirectional feed path 39 to the document feed path 32. The power transmission mechanism 150 functions as a third power transmission mechanism in this example structure.

As shown in FIG. 13, the transmission gear 71 in this example structure is engaged with the drive gear 69 provided on the drive shaft of the motor 67, and power is transmitted to a planet gear device 153. As described above, the transmission gear 71 is shared among the power transmission mechanism 150, the power transmission mechanism 70 that transmits power to the separation roller 34, the power transmission mechanism 120 that transmits power to the feed rollers 35A, 35B, 35C, and 35D, and a power transmission mechanism 170 that transmits power to the guide flap 50. Upon rotation of the motor 67 in the CW or CCW direction, power is transmitted to rotate the transmission gear 71 so that the transmission gear 71 rotates in the CCW or CW direction.

The planet gear device 153 is configured so that a support arm 156 is rotatably supported at and provided coaxially with a shaft 155 of a sun gear 72, and the sun gear 72 and two planet gears 157, 158, which are engaged with the sun gear 72, are supported by the support arm 156.

The sun gear 72 is a double gear in which a large-diameter gear 72L and a small-diameter gear 72S are formed coaxially and integrally. The sun gear 72 is the transmission gear 72 in the power transmission mechanism 70, and the large-diameter gear 72L functions as the transmission gear 72. The arm gear 156 is rotatably provided at the shaft 155 and supports each of the planet gears 157, 158. The planet gear 157, 158 are in engagement with the small-diameter gear 72S. When the sun gear 72 rotates, the planet gear 157, 158 individually engaging with the small-diameter gear 72S rotate. In addition, upon the rotation of the sun gear 72, the support arm 156 also rotates in the same direction. That is, when the sun gear 72 rotates, the planet gears 157, 158 rotate on their respective axis and rotate around the sun gear 72.

The support arm 156 of this example structure is formed with a protrusion 159 at an end where the planet gear 157 is supported. As the protrusion 159 is engaged with the power interruption mechanism 151, the support arm 156 that rotates on the shaft 155 of the sun gear 72 in the CCW direction is restrained in position.

The power interruption mechanism 151 of this example structure is made up of an engaging member 160 and the switchback solenoid 161. The engaging member 160 includes an arm portion 163 that extends radially from a shaft 162 to the support arm 156; a stopper 164 that is formed at an end of the arm portion 163 and is in a hook shape; and a passive portion 165 that extends radially from the shaft 162. The stopper 164 is capable of engaging with the protrusion 159 of the support arm 156, and it is engaged with or disengaged from the protrusion 159 when the arm portion 163 is rotated on the shaft 162. The passive portion 165 is connected to a shaft 166 of the switchback solenoid 161. The switchback solenoid 161 is designed so that when the switchback solenoid 161 is energized (e.g., the solenoid 161 is on), it produces electromagnetic power to drive the shaft 166 straightly in a direction to insert the shaft 166 into the solenoid main body, and when the switchback solenoid 161 is not energized (e.g., the solenoid 161 is off), the electromagnetic power disappears and the shaft 166 is caused to elastically return to its previous position straightly in a direction to project the shaft 166 from the solenoid main body. The movement of the shaft 166 is transmitted to the passive portion 165, and the engaging member 160 is rotated on the shaft 162 and held in position.

When the switchback solenoid 161 is off, the engaging member 160 is positioned so that the stopper 164 is engaged with the protrusion 159 as indicated with a solid line of FIG. 13. The stopper 164 is capable of rotating in the CW direction from this engagement position, and it holds at the engagement position unless it is not urged in that direction, e.g., using a spring. Although the protrusion 159 rotates along with the rotation of the support arm 156, its rotation direction is substantially a radial direction of the engaging member 160 in the engagement position. Thus, even if the rotational force of the support arm 156 is transmitted to the engaging member 160 via the protrusion 159, the engaging member 160 does not rotate from the engagement position against an urging force, such as a spring. When the switchback solenoid 161 is on, the engaging member 160 is positioned so that the stopper 164 is disengaged from the protrusion 159 as indicated with a double-dashed chain line of FIG. 13.

As shown in FIG. 13, the transmission gear 71 is in engagement with the gear 72L of the sun gear 72 of the planet gear device 153. When power is transmitted from the motor 67 to the transmission gear 71 and the transmission gear 71 rotates in one direction, the sun gear 72 is rotated in the other direction. For example, as shown in FIG. 13, when the drive gear 69 rotates in the CCW direction, the transmission gear 71 rotates in the CW direction, and the sun gear 72 rotates in the CCW direction. In response to this, the planet gears 157, 158 rotate around the sun gear 72 in the CCW direction. Along with the rotation of the planet gears 157, 158 around the sun gear 72, the support arm 156 rotates, and the protrusion 159 of the support arm 156 is positioned so that it is engageable with the stopper 164. At this time, if the switchback solenoid 161 is off, the stopper 164 engages with the protrusion 159, and the rotation of the support arm 156 is restrained. Under this condition, both the planet gears 157 and 158 are not engaged with the transmission gear 167. A position of the support arm 156 where the planet gears 157, 158 are disengaged from the transmission gear 167 is referred to as a "disengagement position" in this specification. When the stopper 164 is engaged with the protrusion 159, the rotation of the support arm 156 in the CCW direction is restrained and the support arm 156 is held in the disengagement position until the switchback solenoid 161 is turned on.

As shown in FIG. 13, the transmission gear 167 is disposed adjacent to the planet gear device 153. The transmission gear 167 is capable of engaging with and disengaging from the planet gears 157, 158 of the planet gear device 153. The transmission gear 167 is a double gear in which a large-diameter gear 167L and a small-diameter gear 167S are formed coaxially and integrally. The planet gears 157, 158 are capable of engaging with and disengaging from the large-diameter gear 167L. The small-diameter gear 167S is in engagement with a driven gear 168 provided at a shaft of the bidirectional feed roller 43. Those skilled in the art will recognize that the gear structure from the transmission gear 167 to the driven gear 168 is not limited. For example, the number of transmission gears and/or their diameter sizes may be changed, e.g., based on the length from the transmission gear 167 to the driven gear 168 or other relevant factors.

As shown in FIG. 14, when the drive gear 69 rotates in the CW direction, the transmission gear 71 rotates in the CCW direction and the sun gear 72 rotates in the CW direction. In response to this, the planet gears 157, 158 rotate around the sun gear 72 in the CW direction. Along with the rotation of the planet gears 157, 158 around the sun gear 72 in the CW direction, the support arm 156 rotates in the CW direction. When the support arm 156 rotates in the CW direction, the protrusion 159 disengages from the stopper 164. Thus, even when the switchback solenoid 161 is off, the support arm 159 is capable of rotating in the CW direction. As the planet gears 157, 158 rotate around the sun gear 72 in the CW direction, the planet gear 157 engages with the transmission gear 167.

When the planet gear 157, which rotates around the sun gear 72 in the CW direction, engages with the transmission gear 167, the planet gear 157 is restrained from rotating around the sun gear 72. Then, the planet gear 157 receives power transmitted from the sun gear 72, and it rotates on its axis in the CCW direction. In response to this, the transmission gear 167 rotates in the CW direction, and the driven gear 168 rotates in the CCW direction. As the driven gear 168 rotates in the CCW direction, the bidirectional feed roller 43 is rotated in the return direction.

When the switchback solenoid 161 turned on from the condition shown in FIG. 13, the engaging member 160 is rotated and the stopper 164 disengages from the protrusion 159. Thus, the support arm 156 is capable of rotating in the CCW direction, and the planet gears 157, 158 rotate around the sun gear 72 in the CCW direction. As shown in FIG. 15, when the planet gear 158, which rotates around the sun gear 72 in the CCW direction, engages with the transmission gear 167, the planet gear 158 is restrained from rotating around the sun gear 72. The planet gear 158 then receives power transmitted from the sun gear 72, and it rotates on its axis in the CW direction. In response to this, the transmission gear 167 rotates in the CCW direction, and the driven gear 168 rotates in the CW direction. As the driven gear 168 rotates in the CW direction, the bidirectional feed roller 43 is rotated in the return direction. Preferably, in at least some example structures and arrangements, the switchback solenoid 161 is turned on only when the stopper 164 is disengaged from the protrusion 159. Even when the switchback solenoid 161 is turned off after the support arm 156 rotates in the CCW direction from the disengagement position, the stopper 164 is not engaged with the protrusion 159.

When the rotation of the drive gear 67 is changed from the CCW direction to the CW direction, the support arm 156 is capable of rotating in the CW direction from the condition shown in FIG. 15 where the planet gear 158 engages with the transmission gear 167. When the support arm 156 rotates in the CW direction, the planet gear 157 and the transmission gear 167 are engaged as shown in FIG. 14. As the rotation of the drive gear 67 is changed from the CW direction to the CCW direction, the support arm 156 rotates in the CCW direction from the condition shown in FIG. 14, and the stopper 164 is engaged with the protrusion 159 as shown in FIG. 13. In this manner, the planet gear device 153 and the transmission gear 167 function as a gear train of a power interruption mechanism according to this example structure.

Figure 16:
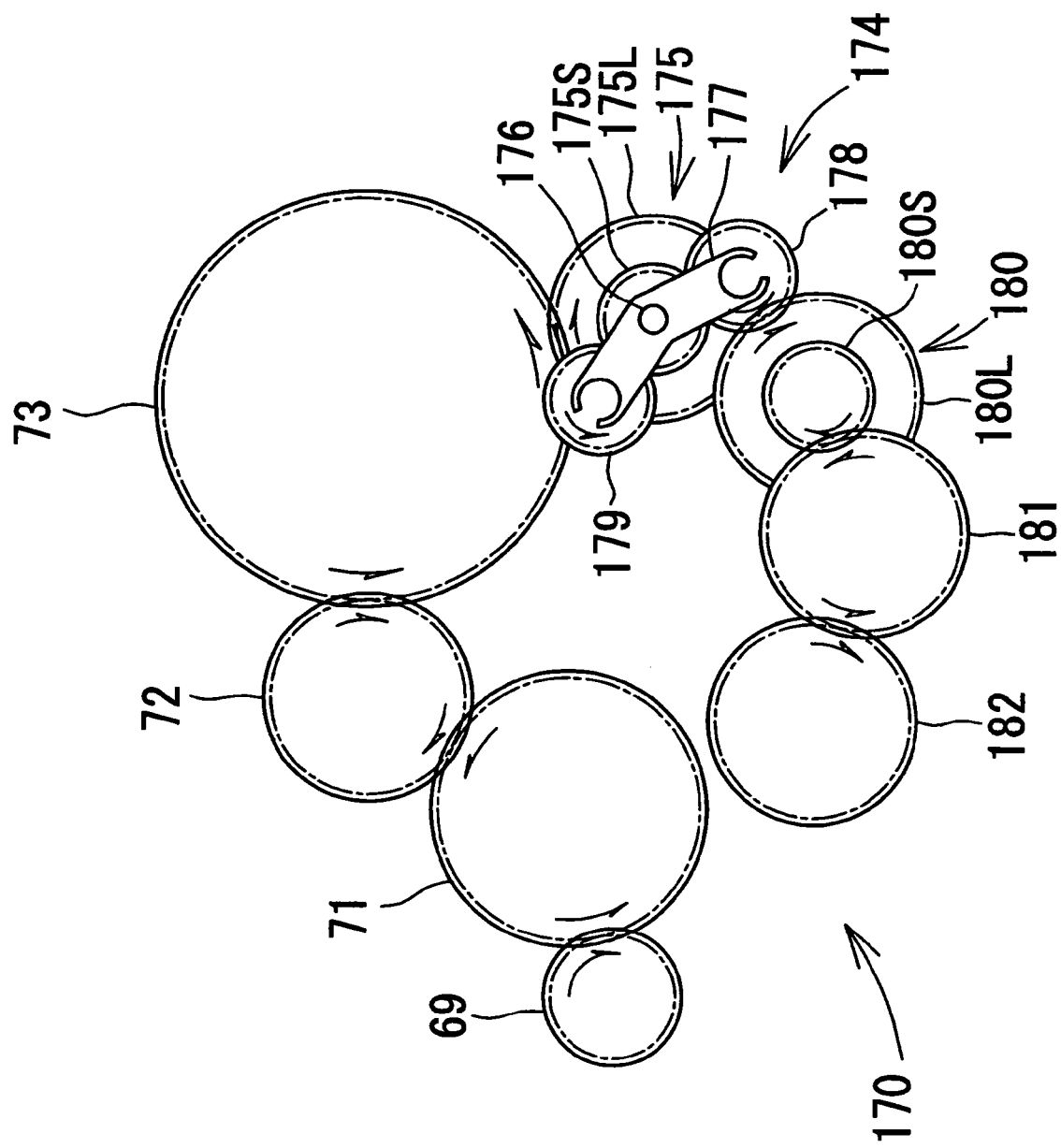
FIGS. 16 through 17 illustrate a structure of a fifth power transmission mechanism that may be used in accordance with some examples of this invention.
Figure 17:
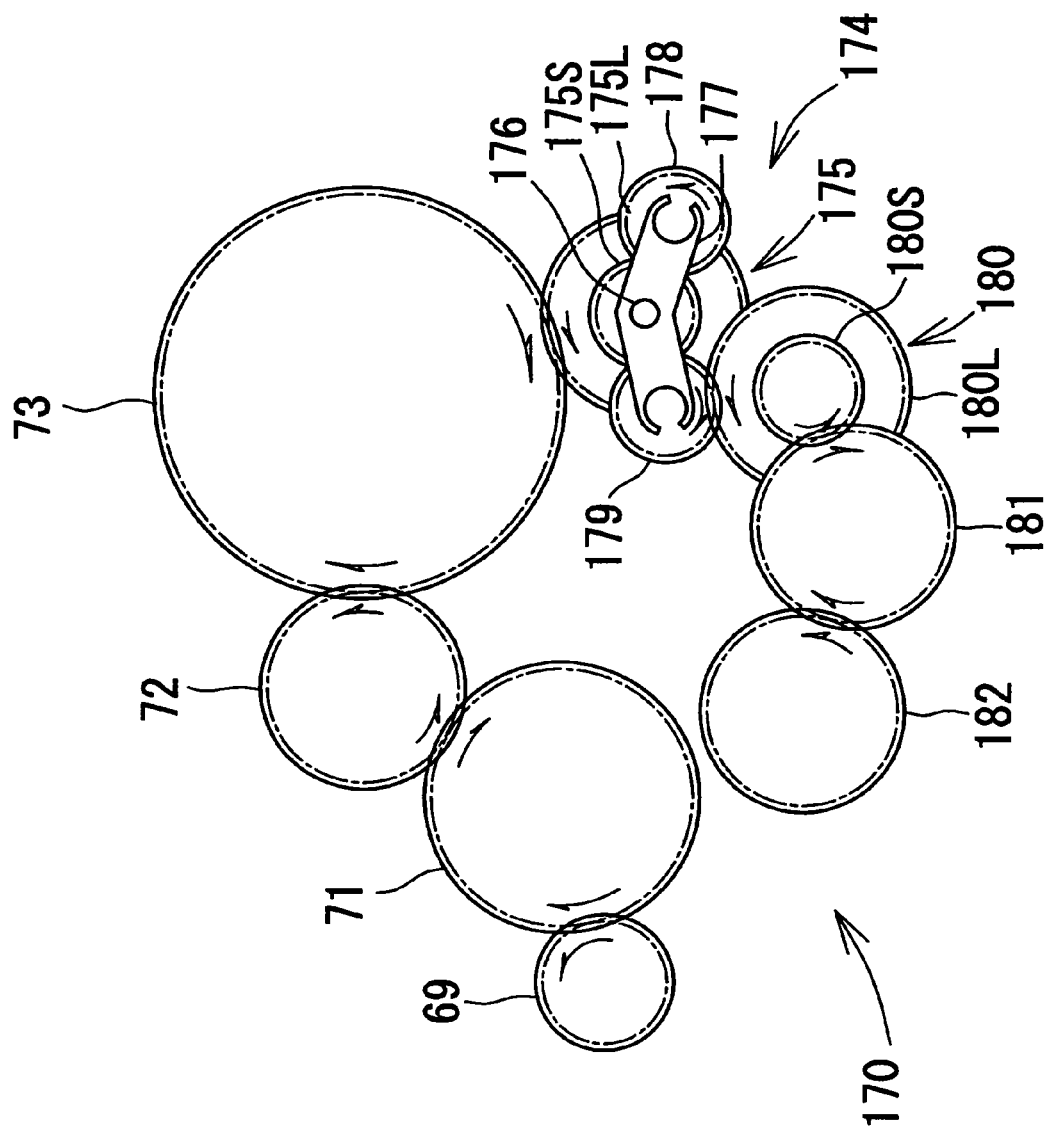

FIGS. 16 and 17 show an example power transmission mechanism 170 from the motor 67 to the guide flap 50. This example power transmission mechanism 170 is configured to change the position of the guide flap 50 based on the rotational direction of the motor 67. The transmission mechanism 170 functions as a fourth transmission mechanism in the example structure described in this specification.

As shown in FIG. 16, the drive gear 69 provided on the driving shaft of the motor 67 and the transmission gears 71, 72, 73 are successively engaged, and power is transmitted from the transmission gear 73 to a planet gear device 174. As described above, the transmission gear 71 is shared among the power transmission mechanism 170, the power transmission mechanism 70 that transmits power to the separation roller 34, the power transmission mechanism 120 that transmits power to the feed rollers 35A, 35B, 35C, and 35D, and the power transmission mechanism 150 that transmits power to the bidirectional feed roller 43. The transmission gear 72 is shared as the transmission gear of the power transmission mechanism 70 that transmits power to the separation roller 34, and also shared as the sun gear 72 of the power transmission mechanism 150 that transmits power to the bidirectional feed roller 43. The transmission gear 73 is shared as the transmission gear of the power transmission mechanism 70 that transmits power to the separation roller 34. Upon rotation of the motor 67 in the CW or CCW direction, power is transmitted to the transmission gear 73 so that the transmission gear 73 rotates in the CCW or CW direction.

The planet gear device 174 is configured so that a support arm 177 is rotatably supported and provided coaxially with a shaft 176 of a sun gear 175, and the sun gear 175 and two planet gears 178, 179, which are engaged with the sun gear 175, are supported by the support arm 177.

The sun gear 175 is a double gear in which a large-diameter gear 175L and a small-diameter gear 175S are formed coaxially and integrally. The planet gears 178, 179 are in engagement with the small-diameter gear 175S of the sun gear 175.

When the sun gear 175 rotates, the planet gears 178, 179, which are engaged with the gear 175S, rotate. Upon the rotation of the sun gear 175, the support arm 177 also rotates in the same direction. That is, when the sun gear 175 rotates, the planet gears 178, 179 rotate on their respective axis and rotate around the sun gear 175.

The transmission gear 73 is in engagement with the sun gear 175 of the planet gear device 174. When power is transmitted from the motor 67 to the transmission gear 73, the transmission gear 73 rotates in one direction, and the sun gear 175 rotates in the other direction. For example, as shown in FIG. 16, when the drive gear 69 rotates in the CW direction, the transmission gear 73 rotates in the CCW direction, the sun gear 175 rotates in the CW direction, and the planet gears 178, 179 rotate around the sun gear 175 in the CW direction.

As shown in FIG. 16, transmission gears 180 and 181 are disposed adjacent to the planet gear device 174. The transmission gear 180 is a double gear in which a large-diameter gear 180L and a small-diameter gear 180S are formed coaxially and integrally. The planet gears 178, 179 are capable of engaging with and disengaging from the gear 180L of the transmission gear 180. The gear 180S of the transmission gear 180 engages with the transmission gear 181, and the transmission gear 181 engages with a driven gear 182 provided on the shaft of the flap guide 50.

As shown in FIG. 16, when the planet gears 178, 179 rotate around the sun gear 175 in the CW direction, the planet gear 178 engages with the gear 180L of the transmission gear 180, whereas the planet gear 179 disengages from the transmission gear 180. When the planet gear 178, which rotates around the sun gear 175 in the CW direction, engages with the transmission gear 180, the planet gears 178, 179 are restrained from rotating around the sun gear 175. The planet gear 178 receives power transmitted from the sun gear 175 and rotates on its axis in the CCW direction. In response to this, the transmission gear 180 rotates in the CW direction. The transmission gear 181, which is engaged with the gear 180S of the transmission gear 180, rotates in the CCW direction, and the driven gear 182, which is engaged with the transmission gear 181, rotates in the CW direction. When the driven gear 182 rotates in the CW direction, the guide flap 50 is pivoted upward and positioned so that the document is guided at the connection position 38 from the reading position of the document feed path 32 to the ejection tray 31, as shown in FIG. 2.

As shown in FIG. 17, when the drive gear 69 rotates in the CCW direction, the transmission gear 73 rotates in the CW direction, the sun gear 175 rotates in the CCW direction, and the planet gears 178, 179 rotate around the sun gear 175 in the CCW direction. As the planet gears 178, 179 rotate around the sun gear 175 in the CCW direction, the planet gear 179 engages with the gear 180L of the transmission gear 180, whereas the planet gear 178 disengages from the transmission gear 180. When the planet gear 179 rotating around the sun gear 175 in the CCW direction engages with the transmission gear 180, the planet gears 178, 179 are restrained from rotating around the sun gear 175. The planet gear 179 receives power transmitted from the sun gear 175 and rotates on its axis in the CW direction. In response to this, the transmission gear 180 rotates in the CCW direction. The transmission gear 181, which is engaged with the gear 180S of the transmission gear 180, rotates in the CW direction, and the driven gear 182, which is engaged with the transmission gear 181, rotates in the CCW direction. As the driven gear 182 rotates in the CCW direction, the guide flap 50 is rotated downward from the position shown in FIG. 2, and it is positioned so that the document is guided at the connection position 38 from the reading position of the document feed path 32 to the bidirectional feed path 39. The transmission gears 72, 73, the planet gear device 174, and the transmission gears 180, 181 function as a gear train of the fourth power transmission mechanism in this illustrated example structure.

A sliding clutch (not shown) is provided in this example structure between the shaft on which the driven gear 182 is provided and the guide flap 50. Via the sliding clutch, the rotation of the shaft is transmitted to the guide flap 50. The sliding clutch is configured so as to interrupt power transmission by sliding a clutch plate when it undergoes a load of more than a specified torque. The guide flap 50 is configured so as to swing to a position where the document is guided to each feed path and not to be rotated beyond a position in contact with a guide member or the like. Thus, after the guide flap 50 is swung into position, it is restrained from rotating, the sliding clutch is slid, and the shaft on which the driven gear 182 is provided can be further rotated with the guide flap 50 standing still. Of course, the gear structure from the transmission gear 180 to the driven gear 182 is not limited. For example, the number of transmission gears and/or their diameter sizes can be changed, e.g., based on the length from the transmission gear 180 to the driven gear 182 or other appropriate factors.

Via each of the power transmission mechanisms 70, 110, 120, 150, and 170 described above, power transmission takes place from the single motor 67 to the separation roller 34, the pickup roller 33, the feed rollers 35A to 35D, the bidirectional feed roller 43, and the guide flap 50, independently. The drive gear 69, which is provided on the driving output shaft of the motor 67, and the transmission gear 71, which is engaged with the drive gear 69, are shared among the power transmission mechanisms 70, 110, 120, 150, and 170. The power transmission mechanism 120 transmits power to the feed rollers 35A to 35D via a gear train that is branched from the transmission gear 71. The power transmission mechanism 150 transmits power to the bidirectional feed roller 43 via a gear train that is branched from the transmission gear 71. The power transmission mechanisms 70, 170 transmit power to the separation roller 34 and the flap guide 50, respectively, via gear trains that are branched from the transmission gears 72, 73, which are located downstream from the transmission gear 71 with respect to the sheet feeding direction.

Backlash between the drive gear 69 and the transmission 71, which are in engagement with each other, is created on the transmission gear 71. On the contrary, there is cumulative backlash on the downstream side from the transmission gear 71 with respect to the power transmission direction because the transmission gears 72, 73 are further engaged. The power transmission mechanism 120 is used as a gear train branched from the transmission gear 71 to transmit power to the feed rollers 35A to 35D, so that power transmission with little backlash can be achieved. Similarly, the power transmission mechanism 150 is used as a gear train branched from the transmission gear 71 to transmit power to the bidirectional feed roller 43, so that power transmission with little backlash can be achieved. In addition, as there is little backlash in the transmission gear 71, fluctuations in load generated when the separation roller 34 rotates in contact with the separation pad after it completely picks up the document, and fluctuations in load generated when the sliding clutch is slid after the guide flap 50 is positioned to guide the document, are controlled so as not to influence on the rotation of the feed rollers 35A to 35D and the bidirectional feed roller 43 via the transmission gear 71.

The power transmission mechanisms 70, 170 are branched from the power transmission mechanism 150, and other power transmission mechanisms are not branched from the power transmission mechanism 120. Thus, fluctuations in load in the separation roller 34 and the guide flap 50 are controlled so as not to influence on, specially, the feed rollers 35A to 35D. In addition, the power transmission path to be branched from the transmission gear 71 is narrowed down to two directions, that is, the power transmission mechanism 120 and the power transmission mechanism 150, which simplifies the gear train structure.

The guide flap 50, to which power from the motor 67 is transmitted by the power transmission mechanism 170, is configured to switch the feed path at the connection position 38 on the document feed path, and suffice if only switching to a desired feed path is completed until the leading end, with respect to the sheet feeding direction, of the document reaches the connection position 38. Slight changes in operating speed of the guide flap 50 do not adversely affect an operation in which the guide flap 50 guides the document on a specified feed path. Thus, it would appear that there is no or only a very small detrimental effect due to the fact that the power transmission mechanisms 70, 170 are more susceptible to backlash than the power transmission mechanisms 120, 150.

The following will describe an example image reading operation of the example image reading apparatus 1 according to the figures described above.

Although the image reading apparatus 1 can be used both as a FBS and with the ADF 3, detailed description of the FBS usage will be omitted because the FBS is not particularly related to this invention. Conventional operation of the system as a FBS may be used without departing from this invention. If the ADF 3 is used, the document cover 4 should be closed against the document mounting table 2. Opening and closing of the document cover 4 may be detected by a sensor provided on or with the document mounting table 2, and the document cover 4 may be controlled so that, when it is closed, the ADF 3 is available. A document Gn to be read is placed on the input tray 30. The document Gn is placed on the input tray 30 with a surface to be read (also called a "first surface") thereof face up. The document Gn may be one sheet or a stack of sheets. For example, when documents Gn of a given size are read, they may be stacked neatly on the input tray 30 with the first surface of a first document G1 face up.

When a reading "start" is inputted in the image reading apparatus 1 (e.g., by a user pressing a "start" button on operation panel 5), the motor 67 is driven, and the pickup roller 33, the separation roller 34, the feed rollers 35A, 35B, 35C, 35D, the ejection roller 36, and the bidirectional feed roller 43 are rotated at their respective timings. When the arm 29 is lowered, the pickup roller 33 is pressed in contact with the document G1 on the input tray 30. Starting from the document G1, which is placed in an uppermost position and is directly subjected to the rotation of the pickup roller 33 and the separation roller 34, the documents Gn are singly separated from the stack and fed into the document feed path 32. The picked up document Gn is guided to the reading position by the document feed path 32, and read by the image reading unit 22 waiting under the reading position. The read document Gn is ejected to the ejection tray 31. In this image reading operation, the feed path of the documents Gn is different between single-side reading and double-side reading operations. Reading one side or both sides of the document Gn is determined by activating a single-side reading mode or a double-side reading mode, which has been preset before the reading start is inputted (e.g., based on user input via operation panel 5).

Figure 18:
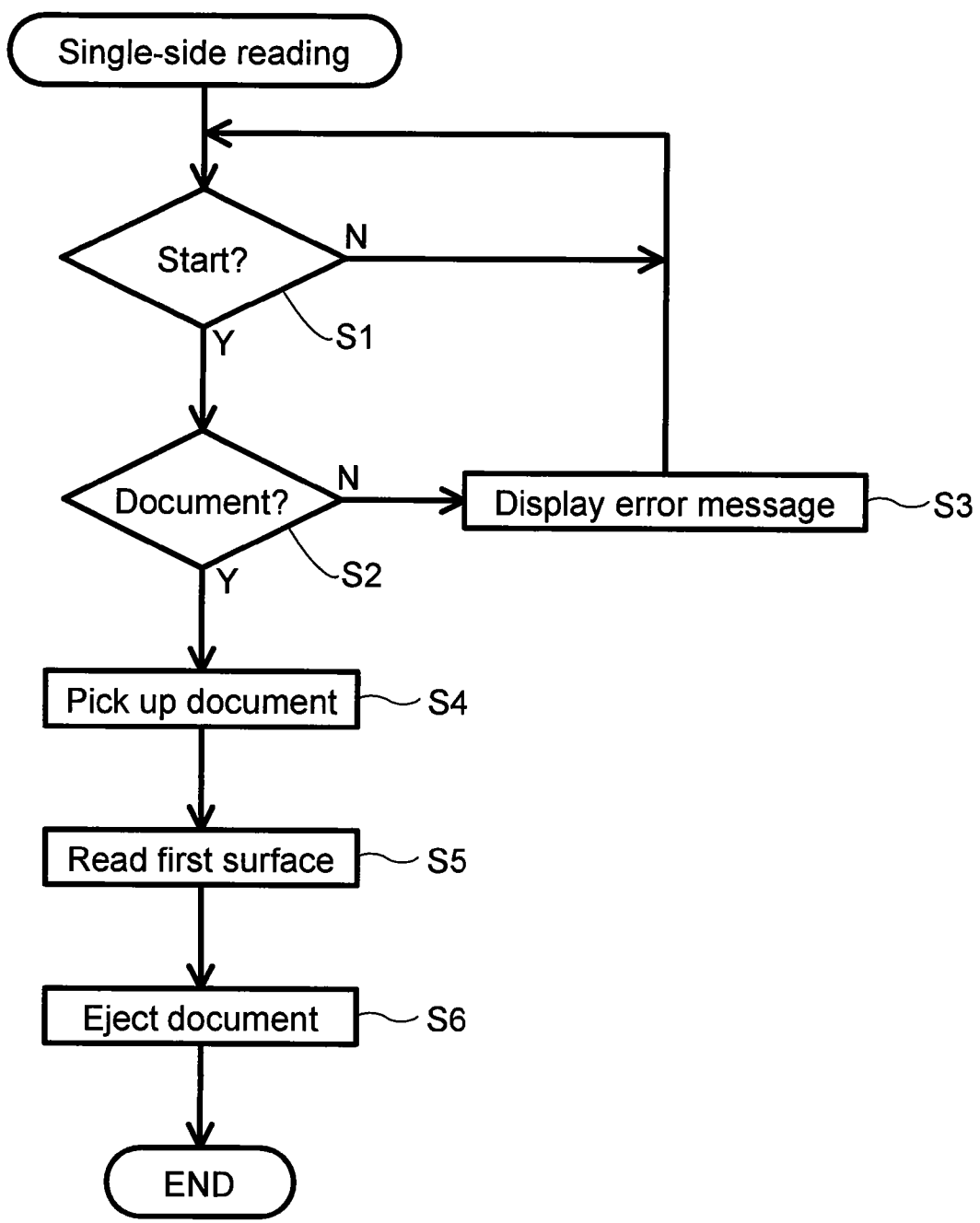
FIG. 18 is a flowchart showing steps executed in a single-side reading mode according to one example of this invention.
Figure 19:
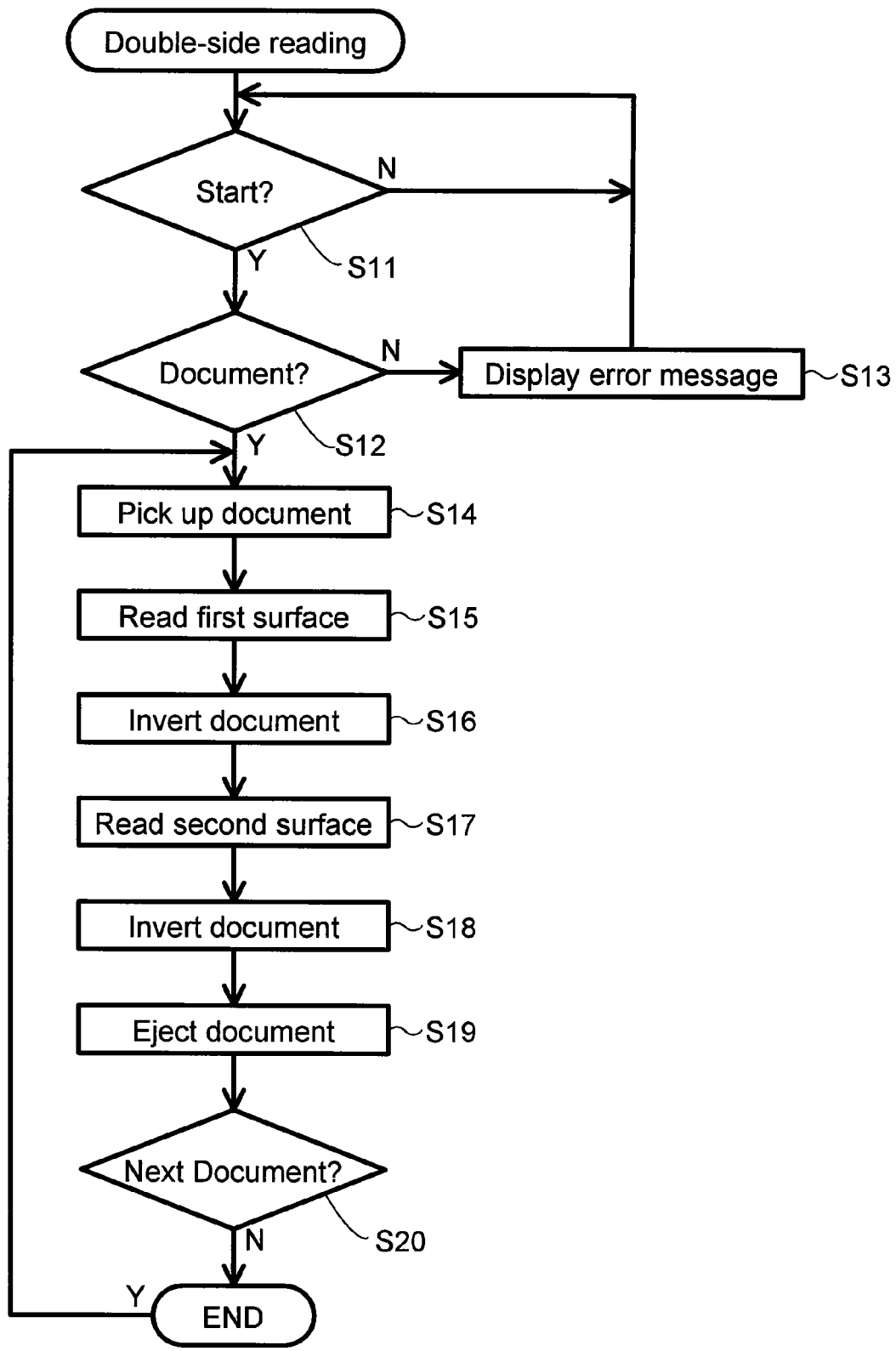
FIG. 19 is a flowchart showing steps executed in a double-side reading mode according to one example of this invention.
Figure 20:
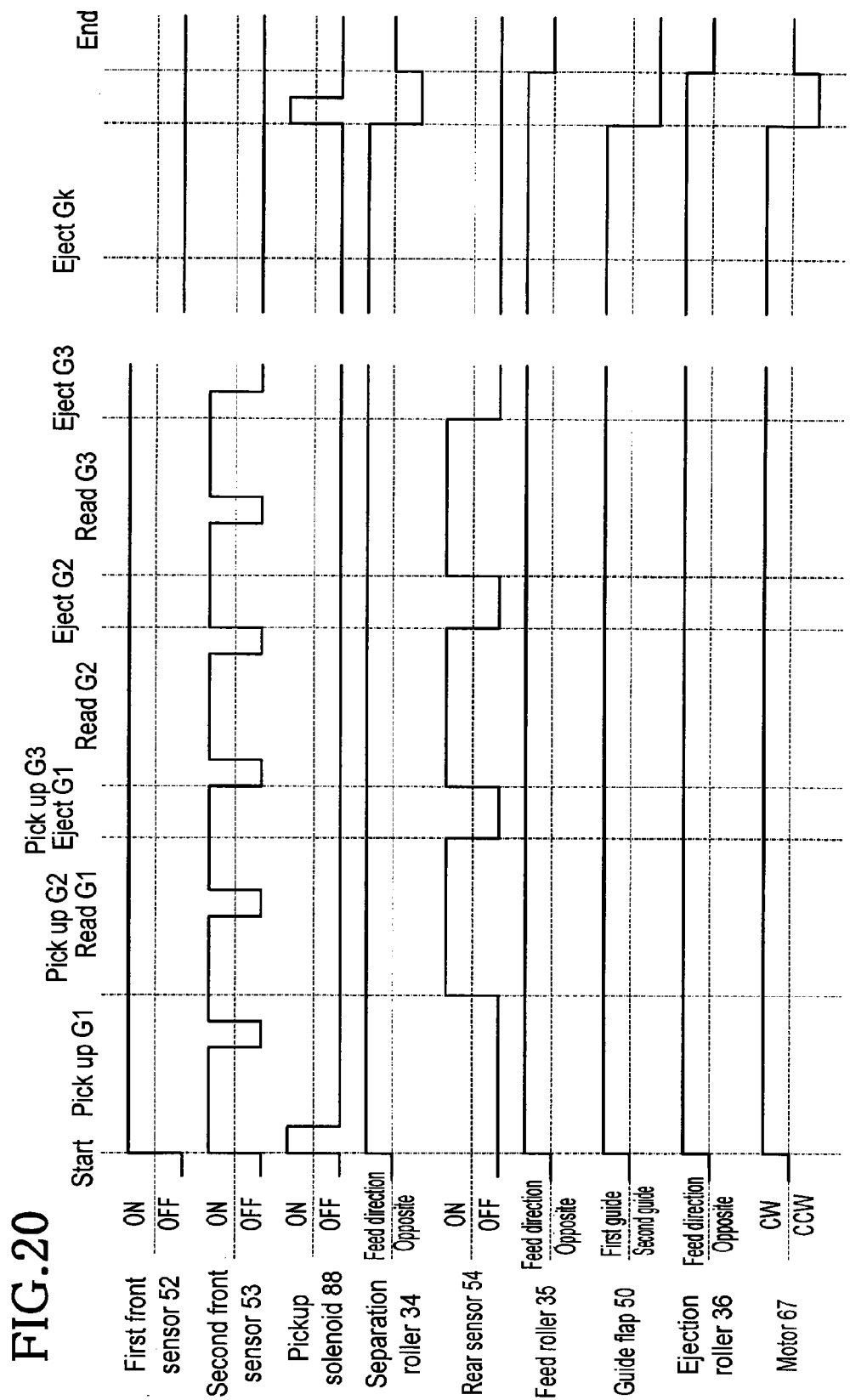
FIG. 20 is a timing chart for one example single-side reading mode.
Figure 21:
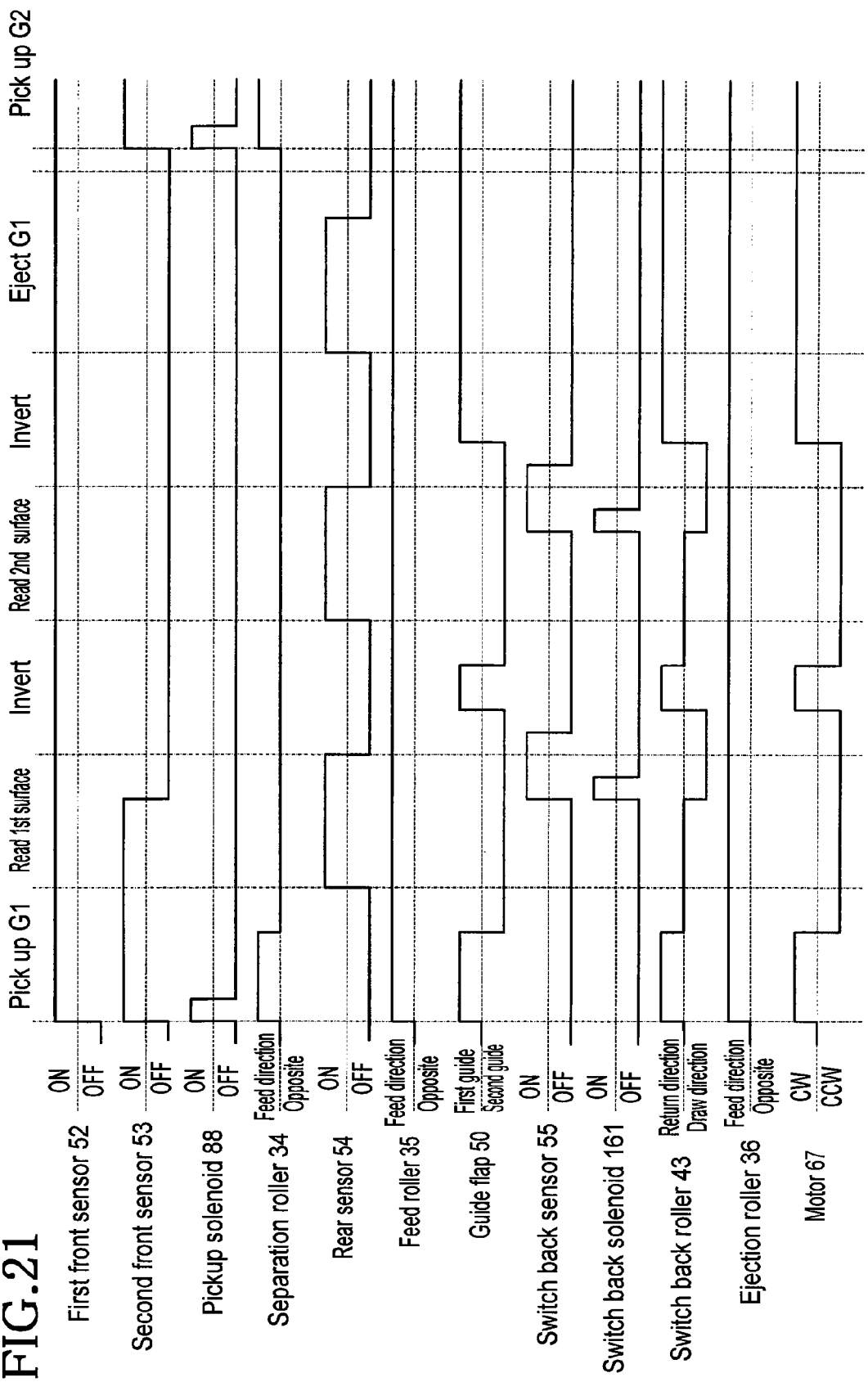
FIG. 21 is a timing chart for one example double-side reading mode.

FIG. 18 is a flowchart showing an example operation of the image reading apparatus 1 in a single-side reading mode. FIG. 19 is a flowchart showing an example operation of the image reading apparatus 1 in a double-side reading mode. FIG. 20 is a timing chart showing an example operation of the image reading apparatus 1 in the single-side reading mode. FIG. 21 is a timing chart showing an example operation of the image reading apparatus 1 in the double-side reading mode. FIGS. 22 through 26 schematically illustrate how the documents Gn may be fed in this example single-side reading mode. FIGS. 27 through 32 schematically illustrate how the documents Gn may be fed in this example double-side reading mode. In the figures, a surface of a document Gn indicated with the number "1" refers to the first surface of the document Gn, which is to be read first in the double-side reading mode, and a surface indicated with the number "2" refers to the second surface of the document Gn, which is to be read next in the double-side reading mode. The first surface and the second surface are the front side and back side, respectively, of the document Gn.

Figure 22:
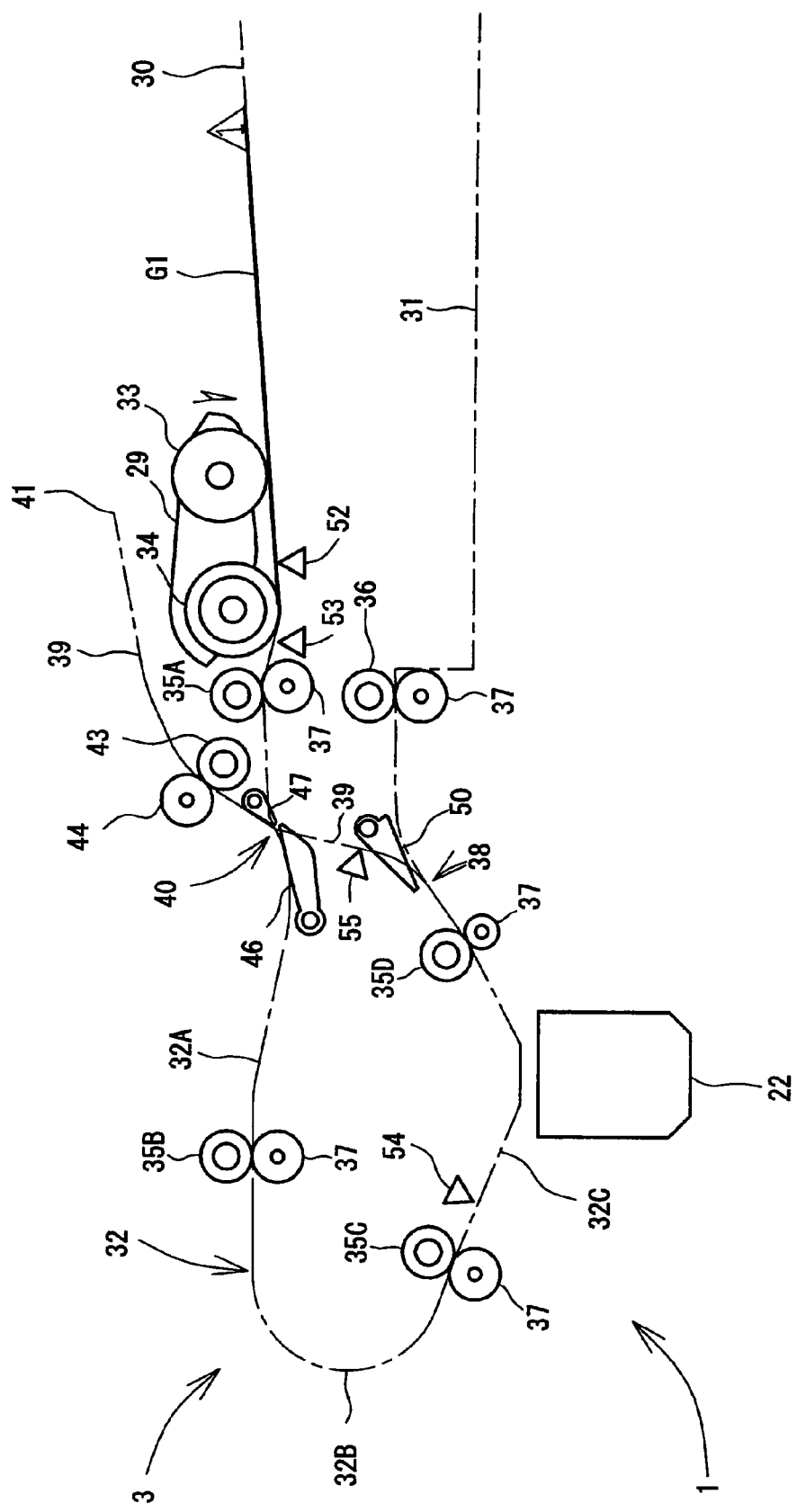
FIGS. 22, 23, and 25 through 27 schematically illustrate various image reading operations in one example single-side reading mode operation according to the invention.

Before the single-side reading is started, as shown in FIG. 22, the guide flap 50 is positioned so that the document feed path 32 continues from the reading position to the ejection tray 31 at the connection position 38. The guide flap 46 is positioned so that the document feed path 32 continues from the input tray 30 to the reading position at the intersection position 40. The guide flap 47 is positioned so that the feed path at the intersection position 40 continues from the termination 41 of the bidirectional feed path 39 to the reading position of the document feed path 32.

When the reading "start" is inputted into the image reading apparatus 1 (S1: Y), a determination is made as to whether a document Gn is placed on the input tray 30 (S2). When the controller 60 determines that no document Gn is placed on the input tray 30 (S2: N), an error message "no document" appears on the LCD 12 (S3). When a document Gn is placed on the input tray 30 (S2: Y), the controller 60 drives the motor 67 in the CW direction. In this example structure and method, description will be made on the assumption that the motor 67 is rotated in the CW direction at the start of image reading. However, at the start of image reading, the motor 67 may be rotated in the CW or CCW direction. The rotational direction of the motor 67 is a relative conception.

The controller 60 drives the motor 67 in the CW direction and actuates the pick-up solenoid 88. Thus, as shown in FIGS. 4 and 5, the planet gear device 75 in the power transmission mechanism 70 is disengaged from the engagement mechanism 86, the planet gears 79, 80 are allowed to rotate around the sun gear 76 in the CCW direction, and power is transmitted to the transmission gear 94. As a result, the driven gear 95 rotates in the CW direction. When the driven gear 95 rotates in the CW direction, power is transmitted to the arm 29, and the arm 29 moves downward. Thus, the pickup roller 33 is pressed in contact with the document Gn on the input tray 30. In addition, the rotation of the driven gear 95 in the CW direction is transmitted to the pickup roller 33 and the separation roller 34 via the power transmission mechanism 110, the pickup roller 33 and the separation roller 34 rotate in the sheet feeding direction, and the document G1 is fed to the document feed path 32. When a stack of documents Gn is placed on the input tray 30, a document G2, which is placed directly under the uppermost document G1, may be fed together therewith. However, as the document G2 is restrained by the separation pad provided opposing the separation roller 34, the document G1 can be singly picked up from the stack (S4).

In the document feed path 32, power is transmitted from the motor 67 to the feed rollers 35A, 35B, 35C, 35D, and the ejection roller 36 via the power transmission mechanism 120, and each roller rotates in the sheet feeding direction to feed the document Gn from the upstream side of the document feed path 32 to the downstream side. The document G1 picked up from the input tray 30 and fed to the document feed path 32 is nipped between the feed roller 35A and the pinch roller 37 in which the rotational force is transmitted to the document G1, and is fed to the intersection position 40 of the document feed path 32. When the document G1 is picked up and fed in the document feed path 32, the second front sensor 53 is turned on.

Figure 23:
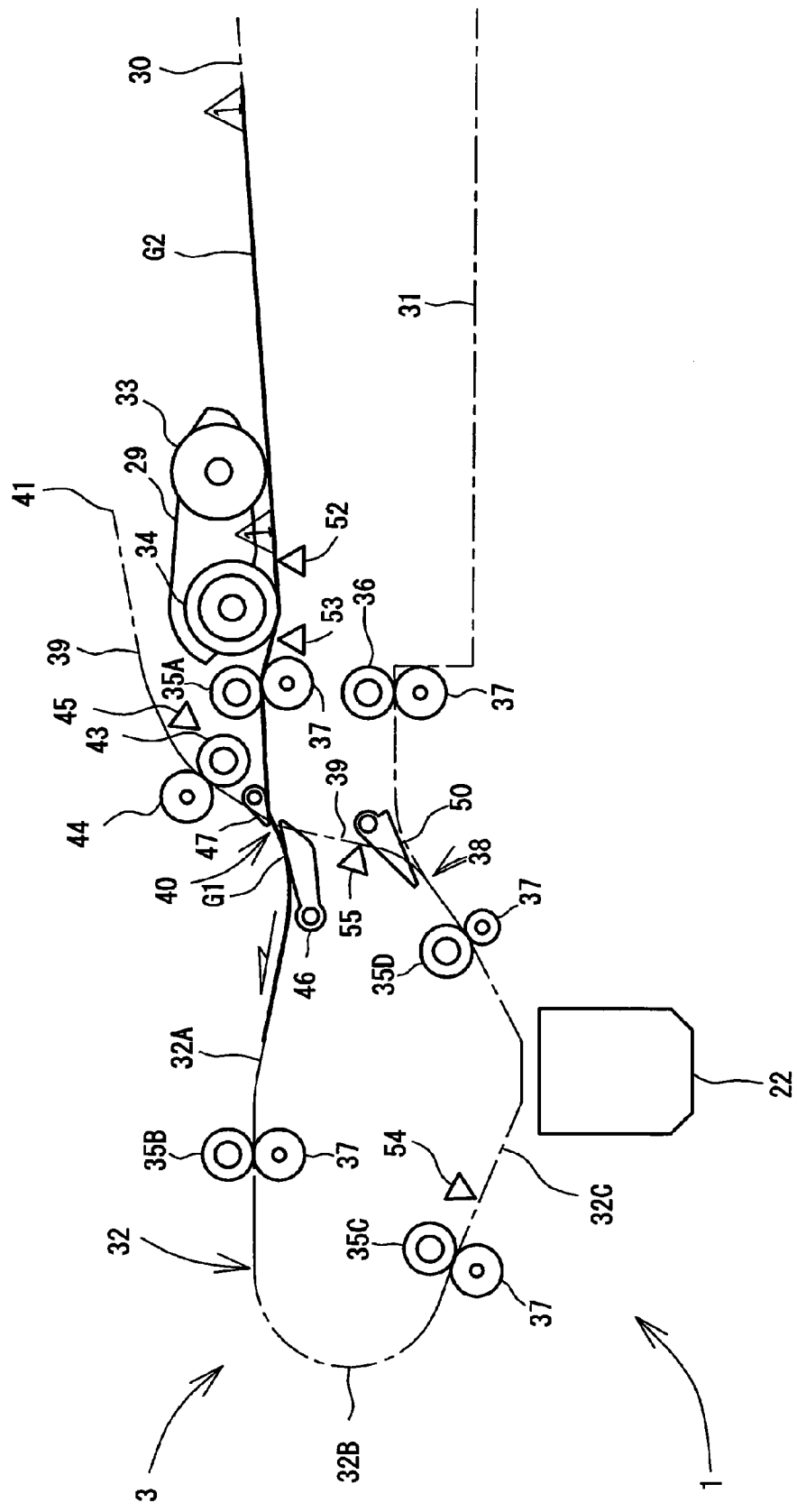

As the guide flap 47 closes the feed path from the input tray 30 to the intersection position 40 on the document feed path 32, the document G1 being fed to the intersection position 40 comes in contact with the guide flap 47. As shown in FIG. 23, the guide flap 47 is pushed by the document G1 being fed in the document feed path 32 and pivoted upward in the figure. As a result, the document feed path 32 continues from the input tray 30 to the reading position, whereas the path to the termination 41 of the bidirectional feed path 39 is closed. In addition, the feed path to the connection position 38 of the bidirectional feed path 39 is closed by the guide flap 46. As a result, the document G1 that has reached the intersection position 40 from the input tray 30 of the document feed path 32 is guided by the guide flaps 46, 47, and fed to the reading position of the document feed path 32.

Figure 24:
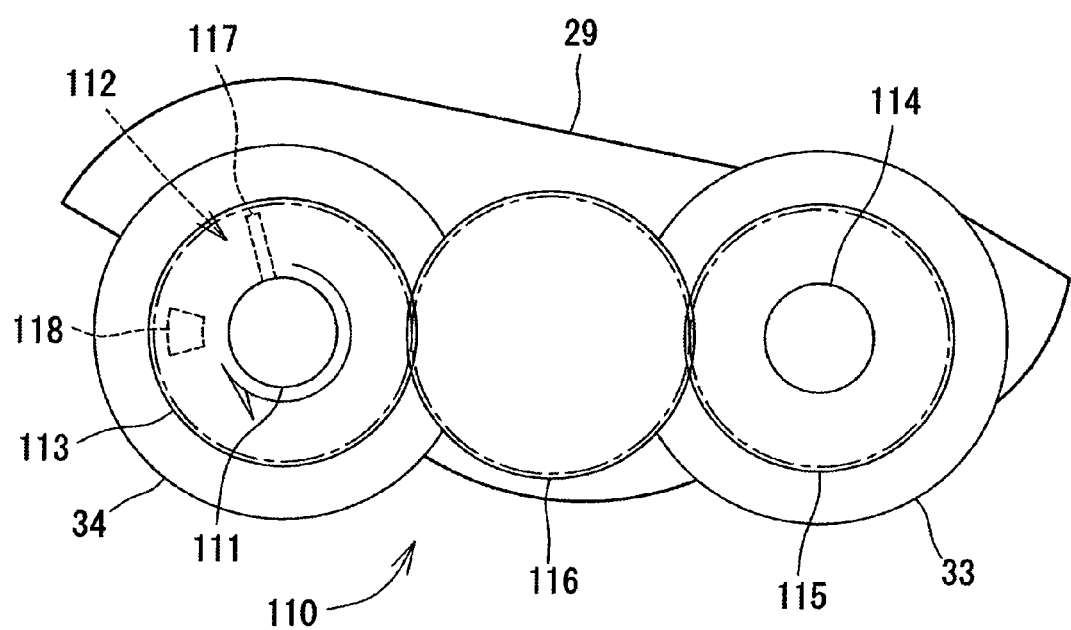
FIG. 24 illustrates an example separation roller at idle.

The peripheral velocities of the feed rollers 35A, 35B, 35C, 35D, and the ejection roller 36, which rotate by receiving power transmitted from the motor 67 via the power transmission mechanism 120, are set higher than the peripheral velocity of the separation roller 34, which rotates by receiving power transmitted from the motor 67 via the power transmission mechanism 110. As shown in FIG. 23, the document G1, which is picked up from the input tray 30 and fed in the document feed path 32, is pressed in contact with the separation roller 34 and nipped between the feed roller 35A and the pinch roller 37. As shown in FIG. 9, the separation roller 34 is allowed to idle for substantially one rotation in the sheet feeding direction by the one-way clutch 112. Thus, as shown in FIG. 24, the separation roller 34 that presses in contact with the document G1 rotates along with the document G being fed by the feed roller 35A at a peripheral velocity, and consequently the separation roller 34 idles to advance in the sheet feeding direction as compared with the shaft 111.

Figure 25:
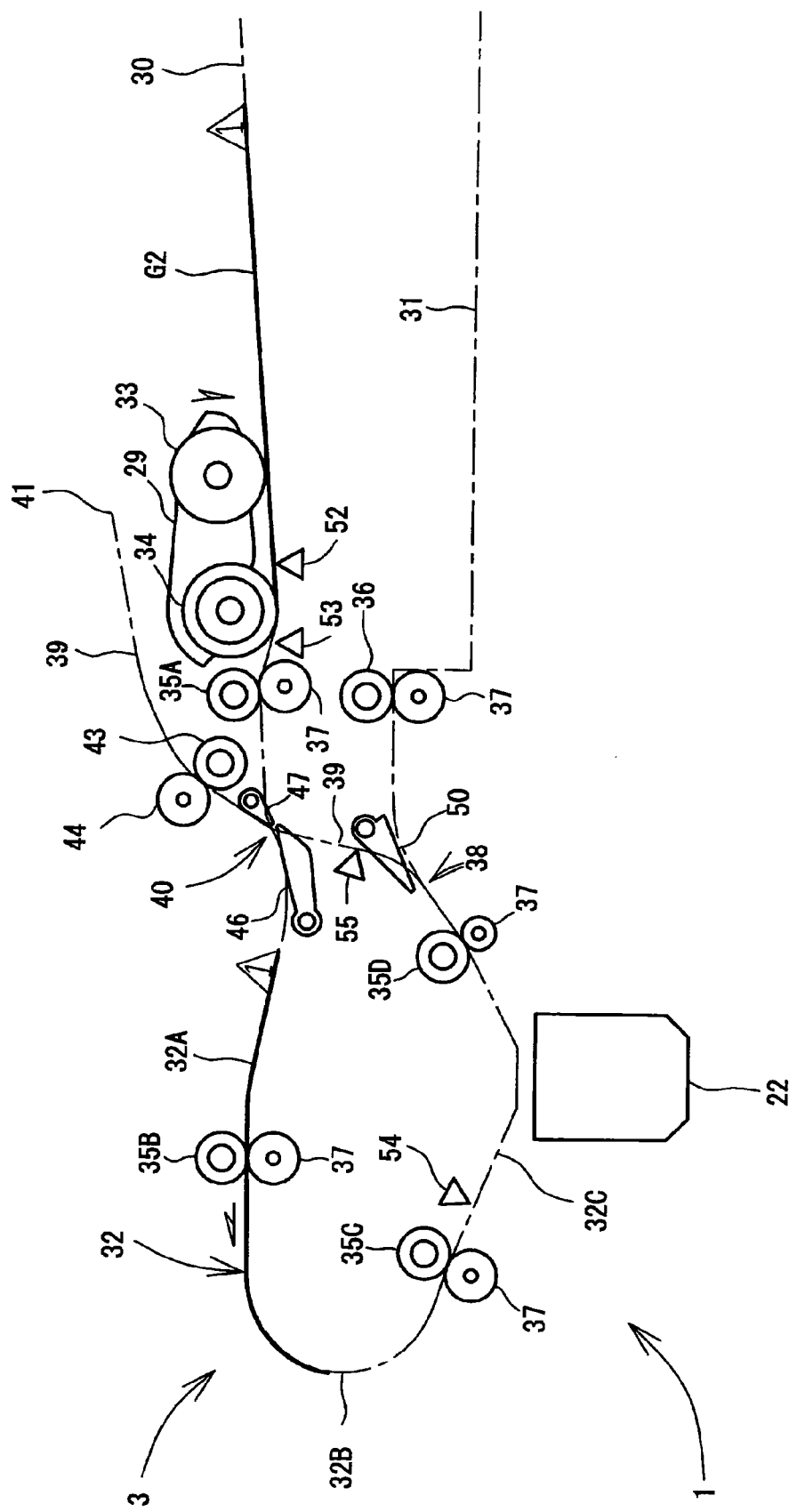

As shown in FIG. 25, the first document G1 separates from the separation roller 34 when it is picked up from the input tray 30 and completely fed into the document feed path 32. This stops the separation roller 34 rotating along with the document G1 from idling. As shown in FIG. 24, as a result of the idle motion of the separation roller 34, the engagement tab 118 of the separation roller 34 advances in the sheet feeding direction as compared with the collar 117 of the shaft 111.

Figure 26:
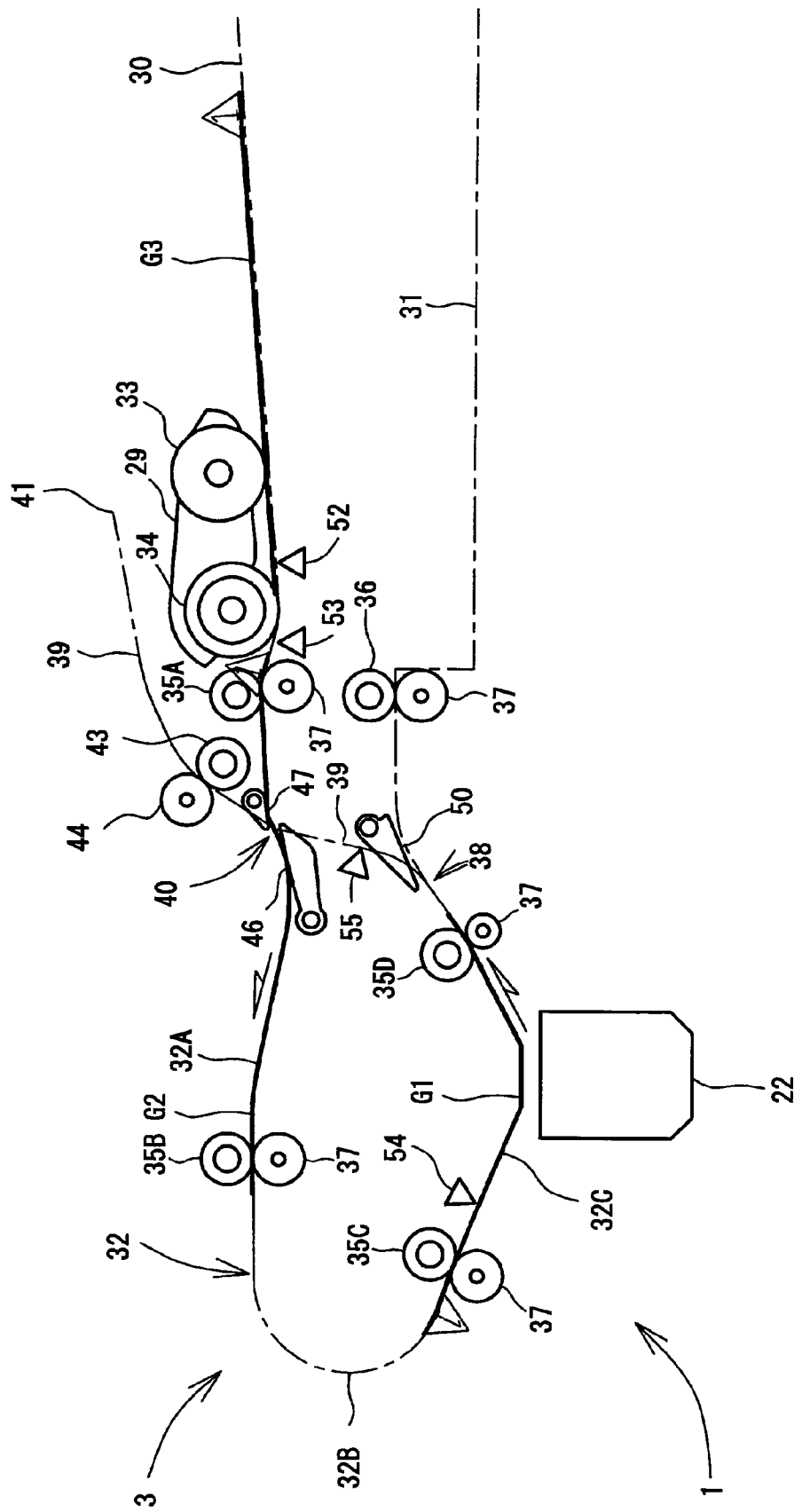

Although power is transmitted from the motor 67 to the shaft 111, the separation roller 34 does not rotate until the collar 117 is rotated in engagement with the engagement tab 118. Thus, the second document G2 being pressed in contact with the separation roller 34 is not fed into the document feed path 32 until the separation roller 34 rotates. On the contrary, the document G1 fed to the document feed path 32 is further fed into the document feed path 32 by rotation of the feed rollers 35A, 35B. Thus, a space between the first document G1 and the second document G2 is provided in the sheet feeding direction, as shown in FIG. 25. If the shaft 111 rotates until the collar 117 engages with the engagement tab 118, the rotation of the shaft 111 is transmitted to the separation roller 34, and the separation roller 34 rotates in the sheet feeding direction. As a result, as shown in FIG. 26, the second document G2 is fed into the document feed path 32. In this way, the documents Gn can be successively picked up and fed into the document feed path 32 at regular intervals and at high speed without the need to drive the pick-up solenoid 88. The second front sensor 53 turns off when the trailing end of the document G1 passes as shown in FIG. 5, and it then turns on when the leading end of the second document G2 passes as shown in FIG. 26.

As shown in FIG. 26, the document G1 being fed is inverted downward at the curved portion 32B, and the rear sensor 54 turns on when it detects the leading end, with respect to the sheet feeding direction, of the document G1. The leading end, with respect to the sheet feeding direction, of the document G1 reaches the reading position when a fixed time passes after being detected by the rear sensor 54. When the leading end, with respect to the sheet feeding direction, of the document G1 reaches the reading position, the controller 60 actuates the image reading unit 22, and performs image reading of the document G1 (S5). The document G1 passes the reading position with the first surface opposing the image reading unit 22, and the image on the first surface of the document G1 is read by the image reading unit 22. The rear sensor 54 turns off when it detects the trailing end, with respect to the sheet feeding direction, of the document G1. The controller 60 ends image reading of the document G1 by the image reading unit 22 when a fixed time passes after the rear sensor 54 turns off.

Figure 27:
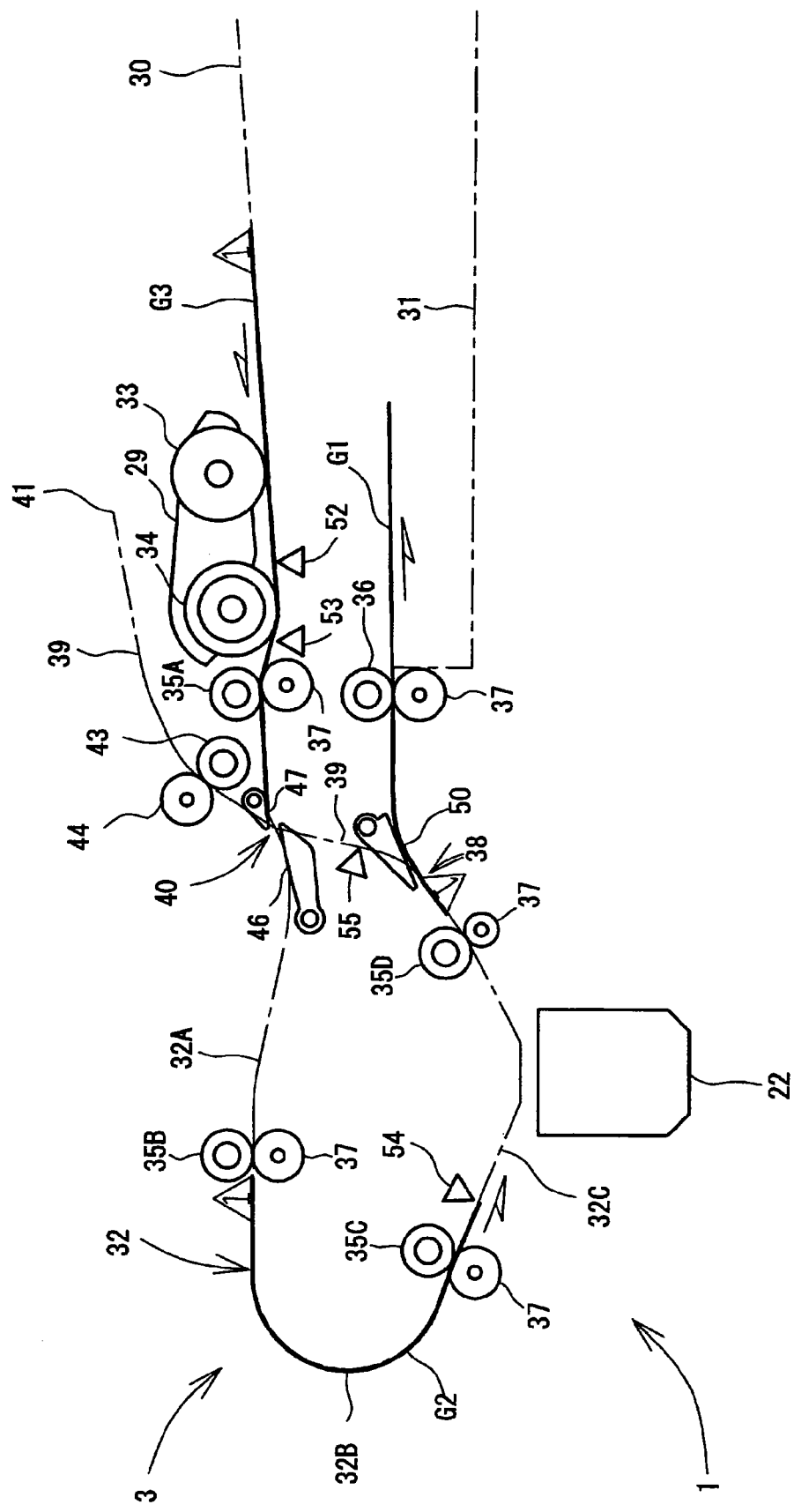

As the motor 67 rotates in the CW direction, as shown in FIG. 27, the guide flap 50 guides the document G1 at the connection position 38 toward the ejection tray 31 of the document feed path 32. The document G1 is nipped between the ejection roller 36 and the pinch roller 37, and it then is ejected from the document feed path 32 to the ejection tray 31 (S6). When the rear sensor 54 detects the leading end, with respect to the sheet feeding direction, of the second document G2 and turns on, the controller 60 actuates the image reading unit 22 after a fixed time passes, and performs image reading of the document G2. After being idled by the document G2, the separation roller 34 stops rotating for a fixed time, and then the third document G3 is picked up and fed into the document feed path 32. By repeating this operation, the ADF 3 sequentially feeds the documents Gn placed on the input tray 30 to the document feed path 32, causes the image reading unit 22 to sequentially read each of the documents Gn, and sequentially ejects the documents Gn, of which image reading is completed, into the ejection tray 31.

As shown in FIG. 20, after the last document Gk placed on the input tray 30 is ejected from the document feed path 32, the controller 60 changes the rotation of the motor 67 from the CW direction to the CCW direction and turns the pick-up solenoid 88 on. A determination as to whether the document Gk placed on the input tray 30 is the last document is made by determining whether the first front sensor 52 is off when the second front sensor 53 detects the trailing end of the document Gk and turns off. When the first front sensor 52 is off, the document Gk is determined to be the last document placed on the input tray 30. When the first front sensor 52 is on, it is determined that there is another document on the input tray 30. When rotation of the motor 67 is changed from the CW direction to the CCW direction to turn the pick-up solenoid 88 on, as shown in FIG. 8, power is transmitted from the planet gear device 75 to the driven gear 95, the driven gear 95 rotates in the CCW direction, and the shaft 111 rotates in the opposite direction as the sheet feeding direction. The rotation of the shaft 111 is transmitted to the arm 29, the arm 29 moves upward, and the sheet supply roller 33 separates from the guide surface of the document feed path 32. As a result, the document Gn to be read next can be inserted, e.g., until it passes the lower portion of the sheet supply roller 33 in contact with the separation roller 34. Then, the controller 60 stops the motor 67 and ends the image reading operation in this single-side reading mode.

The following describes one example double-side reading mode of operation. Before the document Gn is fed, as shown in FIG. 22 in the description of the single-side reading mode, the guide flap 50 is positioned so that document feed path 32 continues from the reading position to the ejection tray 31 at the connection position 38. The guide flap 46 is positioned so that the document feed path 32 continues from the input tray 30 to the reading position at the intersection position 40. The guide flap 47 is positioned so that the feed path at the intersection position 40 continues from the termination 41 of the bidirectional feed path 39 to the reading position of the document feed path 32.

When the reading "start" is inputted into the image reading apparatus 1 (S11: Y), a determination is made as to whether a document Gn is placed on the input tray 30 (S12). When the controller 60 determines that no document Gn is placed on the input tray 30 (S12: N), an error message "no document" appears on the LCD 12 (S13). When a document Gn is placed on the input tray 30 (S12: Y), the controller 60 drives the motor 67 in the CW direction. A command to rotate the motor 67 in the CW direction is stored in the RAM 63 as rotation direction information.

The controller 60 drives the motor 67 in the CW direction and actuates the pick-up solenoid 88. Thus, as shown in FIGS. 4 and 5, the planet gear device 75 in the power transmission mechanism 70 is disengaged from the engagement mechanism 86, the planet gears 79, 80 are allowed to rotate around the sun gear 76 in the CCW direction, and power is transmitted to the transmission gear 94. As a result, the driven gear 95 rotates in the CW direction. When the driven gear 95 rotates in the CW direction, power is transmitted to the arm 29, and the arm 29 moves downward. Thus, the pickup roller 33 is pressed in contact with the document Gn on the input tray 30. In addition, the rotation of the driven gear 95 in the CW direction is transmitted to the pickup roller 33 and the separation roller 34 via the power transmission mechanism 110, the pickup roller 33 and the separation roller 34 rotate in the sheet feeding direction, and the document G1 is fed to the document feed path 32. When a stack of documents Gn is placed on the input tray 30, a document G2, which is placed directly under the uppermost document G1, may be fed together therewith. However, as the document G2 is restrained by the separation pad provided opposing the separation roller 34, the document G1 can be singly picked up from the stack (S14).

In the document feed path 32, power is transmitted from the motor 67 to the feed rollers 35A, 35B, 35C, 35D, and the ejection roller 36 via the power transmission mechanism 120, and each roller rotates in the sheet feeding direction to feed the document Gn from the upstream side of the document feed path 32 to the downstream side. The document G1 picked up from the input tray 30 and fed to the document feed path 32 is nipped between the feed roller 35A and the pinch roller 37 in which the rotational force is transmitted to the document G1, and the document Gi is fed to the intersection position 40 of the document feed path 32. When the document G1 is picked up and fed in the document feed path 32, the second front sensor 53 is turned on.

As the guide flap 47 closes the feed path from the input tray 30 to the intersection position 40 on the document feed path 32, the document G1 being fed to the intersection position 40 comes in contact with the guide flap 47. As shown in FIG. 23 in the description of the single-side reading mode, the guide flap 47 is pushed by the document G1 being fed in the document feed path 32 and pivots upward as shown in the figure. As a result, the document feed path 32 continues from the input tray 30 to the reading position, whereas the path to the termination 41 of the bidirectional feed path 39 is closed. In addition, the feed path to the connection position 38 of the bidirectional feed path 39 is closed by the guide flap 46. As a result, the document G1 that has reached the intersection position 40 from the input tray 30 of the document feed path 32 is guided by the guide flaps 46, 47, and fed to the reading position of the document feed path 32.

As described in the single-side reading mode, the peripheral velocities of the feed rollers 35A, 35B, 35C, 35D, and the ejection roller 36, which rotate by receiving power transmitted from the motor 67 via the power transmission mechanism 120, are set higher than the peripheral velocity of the separation roller 34, which rotates by receiving power transmitted from the motor 67 via the power transmission mechanism 110. Thus, the separation roller 34 is brought to idle by the document G1, which is pressed in contact with the separation roller 34 and nipped between the feed roller 35A and the pinch roller 37. As a result of the idle motion of the separation roller 34, a space between the first document G1 and the second document G2 is provided in the sheet feeding direction. The controller 60 changes the rotation of the motor 67 from the CW direction to the CCW direction at a timing where the document G2 is fed, or before the separation roller 34, which is standing idle, rotates again. The controller 60 can determine a timing to change the rotation of the motor 67, e.g., based on an elapsed time or the number of revolutions of the motor 67 after the second front sensor 53 detects the leading end of the document G1 and turns on or after the second front sensor 53 detects the trailing end of the document G1 and turns off.

When the rotation of the motor 67 is changed from the CW direction to the CCW direction, as shown in FIG. 7, the support arm 78 of the planet gear device 75 is engaged with the engagement mechanism 86 and held in the disengagement position. Then, the power transmission to the driven gear 95 is interrupted and the shaft 111 that supports the separation roller 34 stops.

As shown in FIGS. 10 through 12, the power transmission mechanism 120 transmits power in the sheet feeding direction to the feed rollers 35A, 35B, 35C, 35D and the ejection roller 36, irrespective of the rotational direction of the motor 67. Thus, even after the rotation direction of the motor 67 is changed, the document G1 is fed by the feed roller 35B on the document feed path 32 toward the reading position.

The power transmission mechanism 150 interrupts the power transmission to the driven gear 168 when the rotation of the motor 67 is changed from the CW direction to the CCW direction and the power interruption mechanism 151 holds the planet gear device 153 in the disengaged position. As a result, the bidirectional feed roller 43 stops. The power transmission mechanism 170 switches the guide flap 50 at the connection position 38 so as to guide the document to the bidirectional feed path 39 when the rotation of the motor 67 is changed from the CW direction to the CCW direction. The guide flap 47 returns to the position shown in FIG. 2 when the trailing end of the document G1 passes the intersection position 40.

Figure 28:
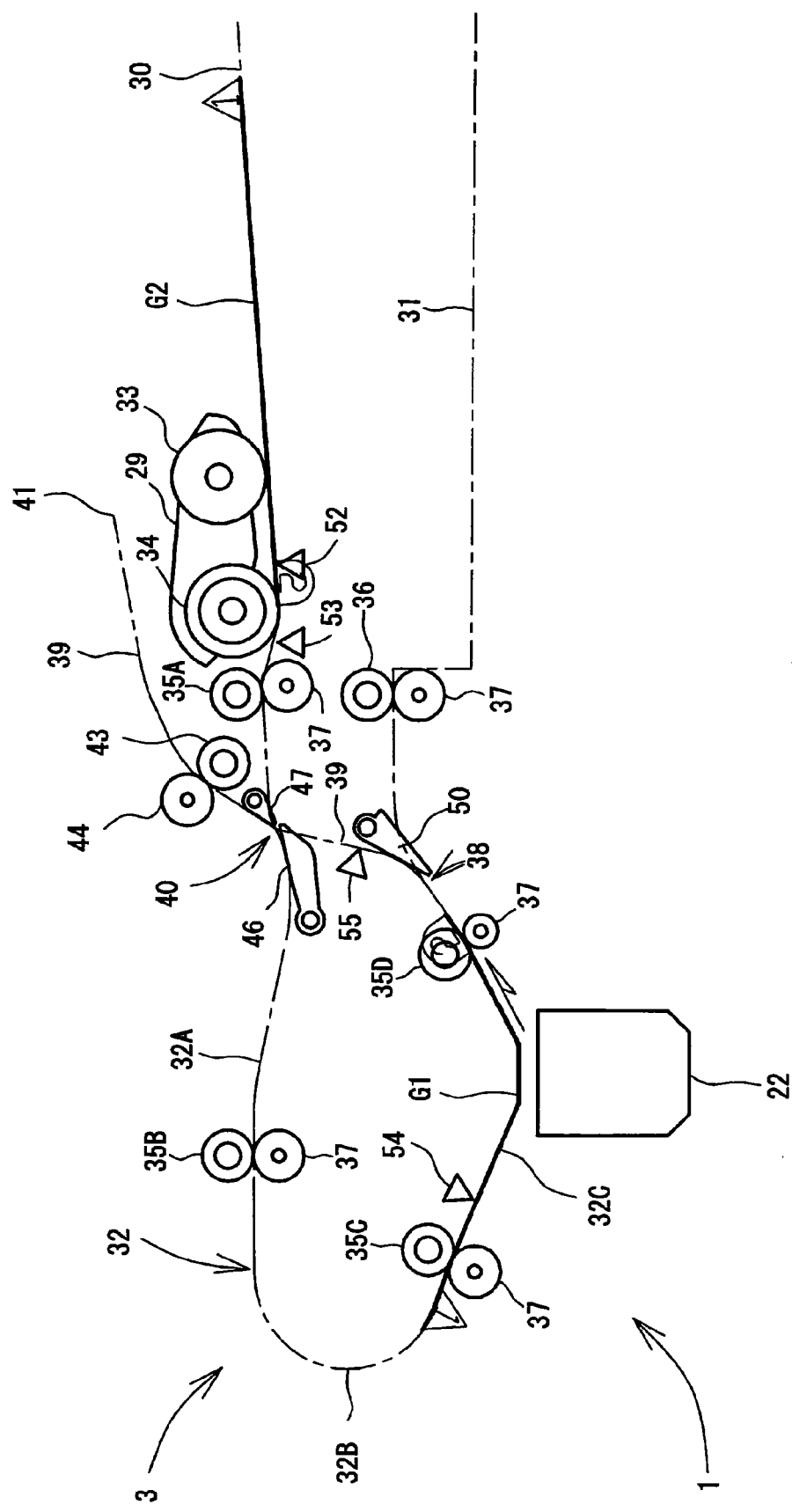
FIGS. 28 through 32 schematically illustrate various image reading operations in one example double-side reading mode operation according to the invention.

As shown in FIG. 28, the document G1 being fed is inverted downward at the curved portion 32B, and the rear sensor 54 turns on when it detects the leading end, with respect to the sheet feeding direction, of the document G1. The leading end, with respect to the sheet feeding direction, of the document G1 reaches the reading position when a fixed time passes after being detected by the rear sensor 54. When the leading end, with respect to the sheet feeding direction, of the document G1 reaches the reading position, the controller 60 actuates the image reading unit 22, and image reading of the document G1 is performed (S15). The document G1 passes the reading position with the first surface facing the image reading unit 22, and the image on the first surface of the document G1 is read by the image reading unit 22. The rear sensor 54 turns off when it detects the trailing end, with respect to the sheet feeding direction, of the document G1. The controller 60 ends image reading of the first surface of the document G1 by the image reading unit 22 when a fixed time passes after the rear sensor 54 turns off. The image data of the first surface of the document G1 read by the image reading unit 22 is stored in an area of the RAM 63.

Figure 29:
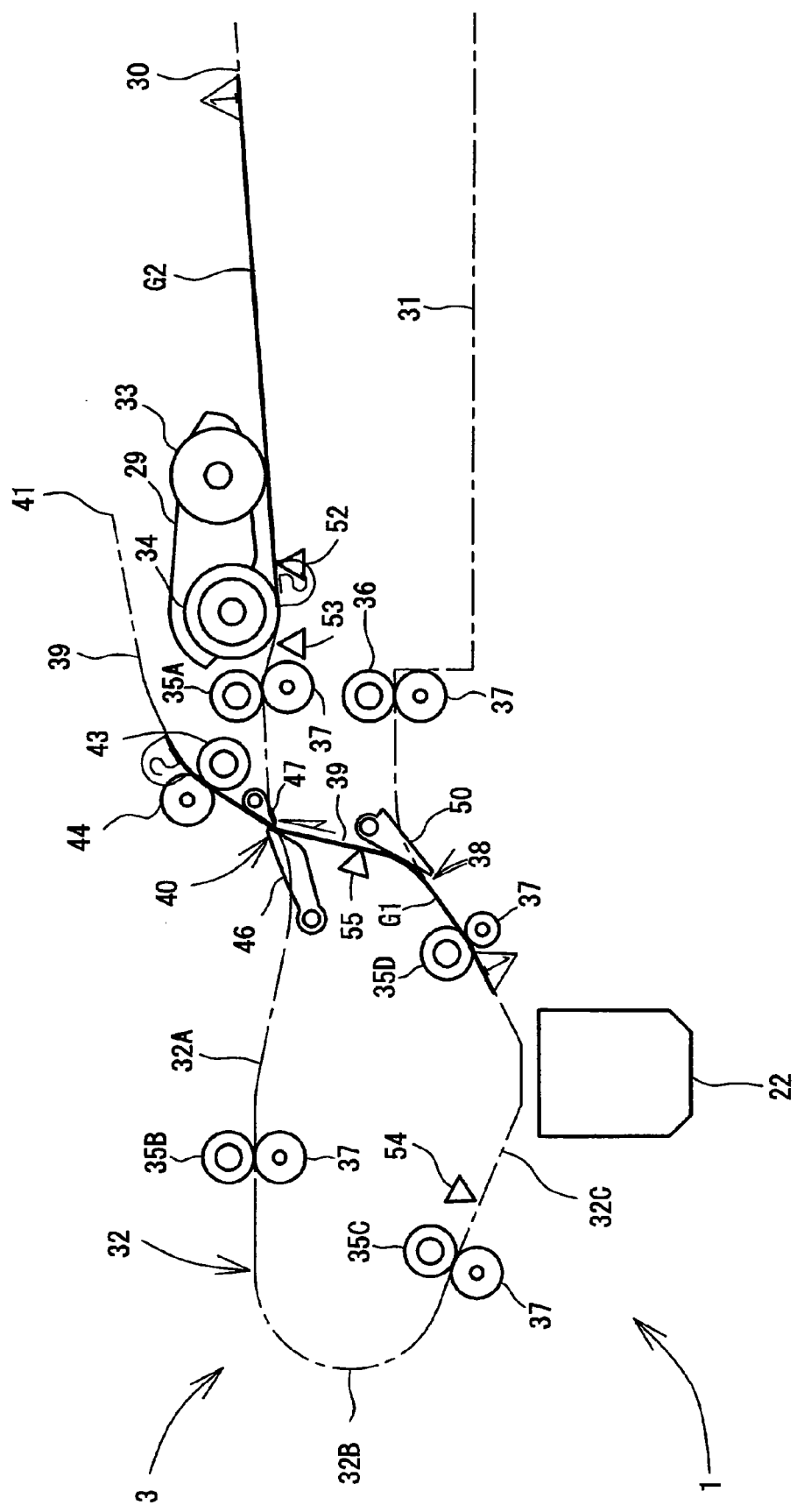

As shown in FIG. 29, the leading end, with respect to the sheet feeding direction, of the document G1 of which the first surface has been read is guided by the guide flap 50, and this document G1 enters the bidirectional feed path 39 from the document feed path 32 at the connection position 38. The bidirectional feed sensor 55 detects the leading end of the document G1 entering the bidirectional feed path 39 and turns on. When the bidirectional feed sensor 55 turns on, the controller 60 actuates the switchback solenoid 161. When the document G1 is drawn into the bidirectional feed path 39, the power interruption mechanism 151 separates from the support arm 156 of the planet gear device 153. As shown in FIG. 15, the planet gear device 153, which receives power in the CCW direction transmitted from the motor 67, transmits the power in the CW direction to the driven gear 168, and the bidirectional feed roller 43 rotates in the draw direction.

As the guide flap 46 closes the feed path from the bidirectional feed path 39 to the intersection position 40, the leading end of the document G1 entering the bidirectional feed path 39 comes in contact with the guide flap 46 when it reaches the intersection position 40. As shown in FIG. 29, the guide flap 46 is pushed by the leading end, with respect to the sheet feeding direction, of the document G1 being fed in the bidirectional feed path 39 and pivots upward in the figure. Thus, the bidirectional feed path 39 continues from the connection position 38 to the termination 41, whereas the path to the reading position of document feed path 32 is closed. In addition, the feed path to the input tray 30 of the document feed path 32 is closed by the guide flap 47. As a result, the leading end, with respect to the sheet feeding direction, of the document G1 that has reached the intersection position 40 from the connection position 38 of the bidirectional feed path 39 is guided by the guide flaps 46, 47, and fed to the bidirectional feed path 39 without going to the document feed path 32. The leading end, with respect to the sheet feeding direction, of the document G1 is nipped between the bidirectional feed roller 43 and the pinch roller 44, and it is fed to the termination 41 on the bidirectional feed path 39 due to the rotation of the bidirectional feed roller 43 in the draw direction.

Figure 30:
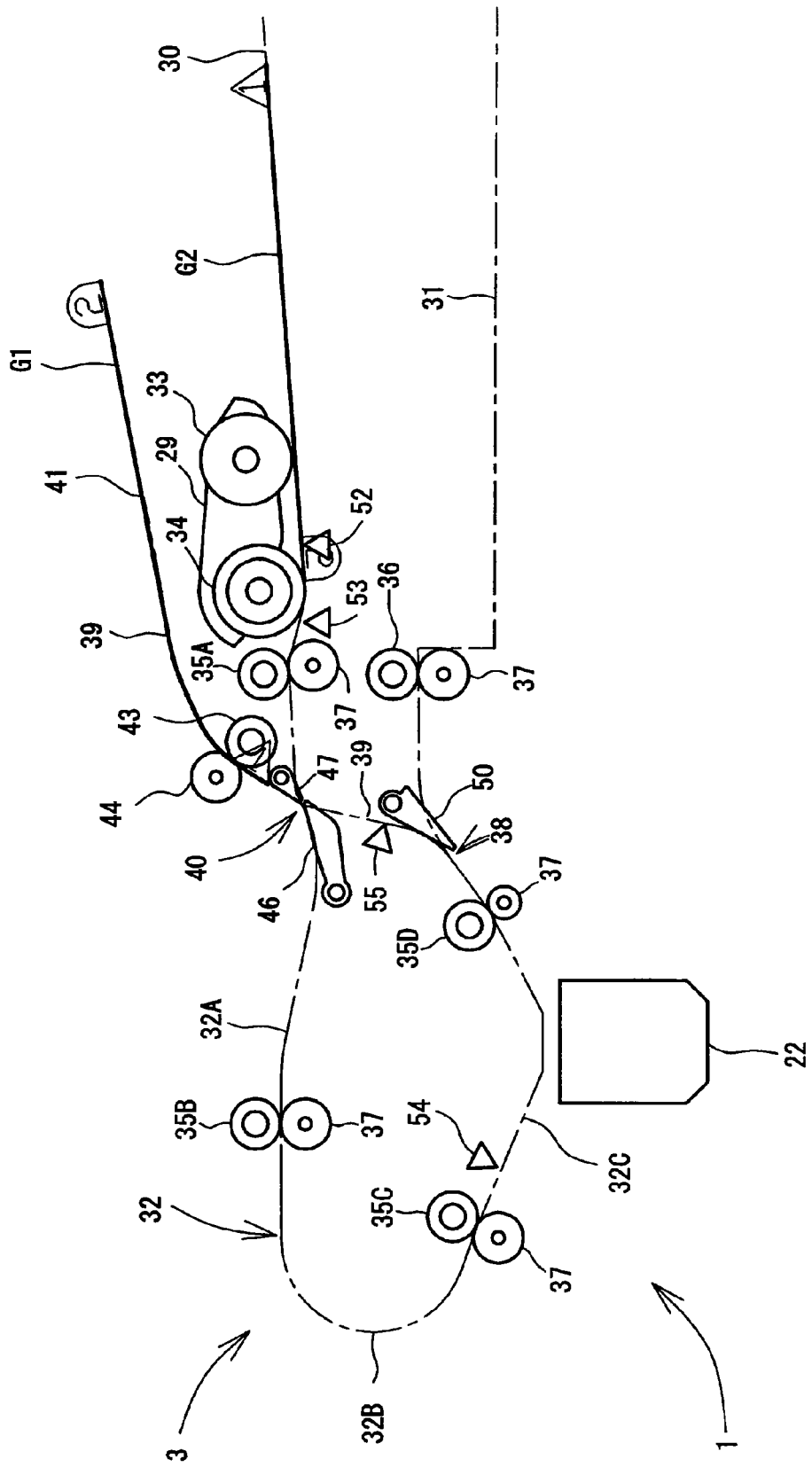

As shown in FIG. 30, after the trailing end, with respect to the sheet feeding direction, of the document G1 passes over the intersection position 40 of the bidirectional feed path 39 and completely goes to the termination 41, the controller 60 switches the rotation of the motor 67 from the CCW direction to the CW direction. The bidirectional feed sensor 55 turns off when it detects the trailing end of the document G1 being fed on the bidirectional feed path 39, and then the trailing end of the document G1 has passed the intersection position 40 after a fixed time passes. Thus, the controller 60 determines that the trailing end, with respect to the sheet feeding direction, of the document G1 has passed over the intersection position 40 of the bidirectional feed path 39 and completely goes to the termination 41, e.g., by counting a detection signal by the bidirectional feed sensor 55, a feeding length or time by the feed roller 35D and the bidirectional feed roller 43, etc. When the rotation of the motor 67 is changed, the document G1 being nipped between the bidirectional feed roller 43 and the pinch roller 44 and projecting from the termination 41 is returned to the intersection position 40.

When a part of the document G1 projects outside of the ADF 3 from the termination 41 of the bidirectional feed path 39, it is supported by the document supporting portion 42. When the document G1 passes the intersection position 40 and separates from the guide flap 46, the guide flap 46 moves downward and returns to the position shown in FIG. 2 (e.g., under its own weight or force of gravity).

When the rotation of the motor 67 is changed from the CCW direction to the CW direction, as shown in FIG. 14, the planet gear device 153 of the power transmission mechanism 150 rotates the support arm 156 in the CW direction to transmit power from the motor 67 to the driven gear 168, and the driven gear 168 rotates in the CCW direction. As a result, the bidirectional feed roller 43 rotates in the return direction. In response to this, the document G1 is fed back to the intersection position 40 on the bidirectional feed path 39 (S16).

As shown in FIGS. 10 through 12, the power transmission mechanism 120 transmits power in the sheet feeding direction to the feed rollers 35A, 35B, 35C, 35D and the ejection roller 36, irrespective of the rotation direction of the motor 67. Thus, even after the rotation direction of the motor 67 is changed, the feed rollers 35A, 35B, 35C, 35D and the ejection roller 36 rotate in the sheet feeding direction.

The power transmission mechanism 70 interrupts the power transmission to the driven gear 95 when the rotation of the motor 67 is changed from the CW direction to the CCW direction and the engagement mechanism 86 holds the planet gear device 75 in the disengaged position. After that, as the pick-up solenoid 88 is not actuated, the planet gear device 75 is held in the disengagement position even when the rotation of the motor 67 is changed to the CW direction. The power transmission mechanism 170 switches the guide flap 50 at the connection position 38 to the position so as to guide the document from the reading position of the document feed path 32 to the ejection tray 31 when the rotation of the motor 67 is changed from the CCW direction to the CW direction.

Figure 31:
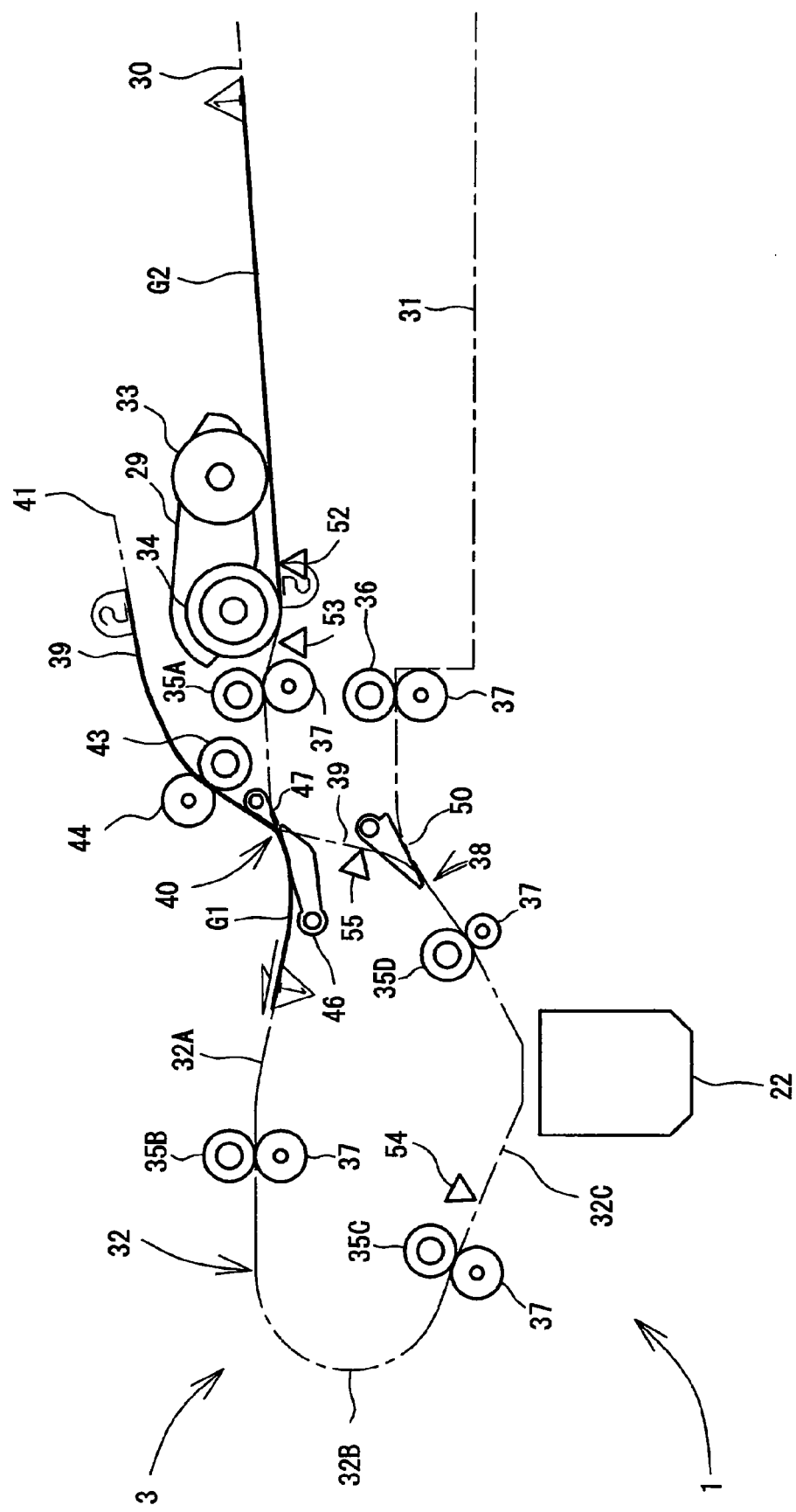

As shown in FIG. 31, the document G1 being returned from the bidirectional feed path 39 comes in contact with the guide flap 46 at the intersection position 40. The guide flap 46 is regulated so as not to move downward from the position shown in the figure. Thus, the feed path continues from the termination 41 of the bidirectional feed path 39 to the reading position of the document feed path 32, whereas the feed path to the connection position 38 of the bidirectional feed path 39 is closed. In addition, the guide flap 47 closes the feed path to the input tray 30 of the document feed path 32. Thus, the document G1 is guided by the guide flaps 46, 47 and fed from the termination 41 of the bidirectional feed path 39 to the reading position of the document feed path 32 without going to the connection position 38 of the bidirectional feed path 39 nor to the input tray 30 of the document feed path 32. As the document G1 is returned from the bidirectional feed path 39 to the upstream side of the reading position of the document feed path 32, it is fed back to the document feed path 32 with its leading end and trailing end reversed as compared with the condition where the document G1 was first fed into the document feed path 32. In this way, the document G1 is fed back. The document G1 is fed into the document feed path 32 with its second surface facing the reading position.

The controller 60 changes the rotational direction of the motor 67 from the CW direction to the CCW direction when the leading end, with respect to the sheet feeding direction, of the document G1 being fed back reaches a position on the upstream side of the reading position of the document feed path 32. The power transmission mechanism 120 transmits power in the sheet feeding direction to the feed rollers 35A, 35B, 35C, 35D and the ejection roller 36 irrespective of the rotation direction of the motor 67. Thus, even after the rotation direction of the motor 67 is changed, the document G1 is fed to the reading position of the document feed path 32 by the feed roller 35B.

In the power transmission mechanism 150, when the rotation of the motor 67 is changed from the CW direction to the CCW direction, the support arm 156 of the planet gear device 153 rotates in the CCW direction in engagement with the power interruption mechanism 151, and it is placed in the disengagement position. Thus, the power transmission from the planet gear device 153 to the driven gear 168 is interrupted, and the bidirectional feed roller 43 stops. As a result, if the rotation of the motor 67 is changed with the condition that the leading end, with respect to the sheet feeding direction, of the document G1 is nipped between the feed roller 35B and the pinch roller 37 and the trailing end is nipped between the bidirectional feed roller 43 and the pinch roller 44, the bidirectional feed roller 43 will not rotate in the draw direction. The bidirectional feed roller 43, to which power transmission from the motor 67 is interrupted, rotates in the return direction along with the document G1 being fed by rotation of the feed roller 35B.

In the power transmission mechanism 70, after the engagement mechanism 86 holds the planet gear device 75 in the disengagement position, the planet gear device 75 is held in the disengagement position even when the motor 67 rotates in the CCW direction because the pick-up solenoid 88 is not actuated. In the power transmission mechanism 170, when the rotation of the motor 67 is changed from the CW direction to the CCW direction, the guide flap 50 is switched at the connection position 38 to the position so as to guide the document from the document feed path 32 to the bidirectional feed path 39.

Figure 32:
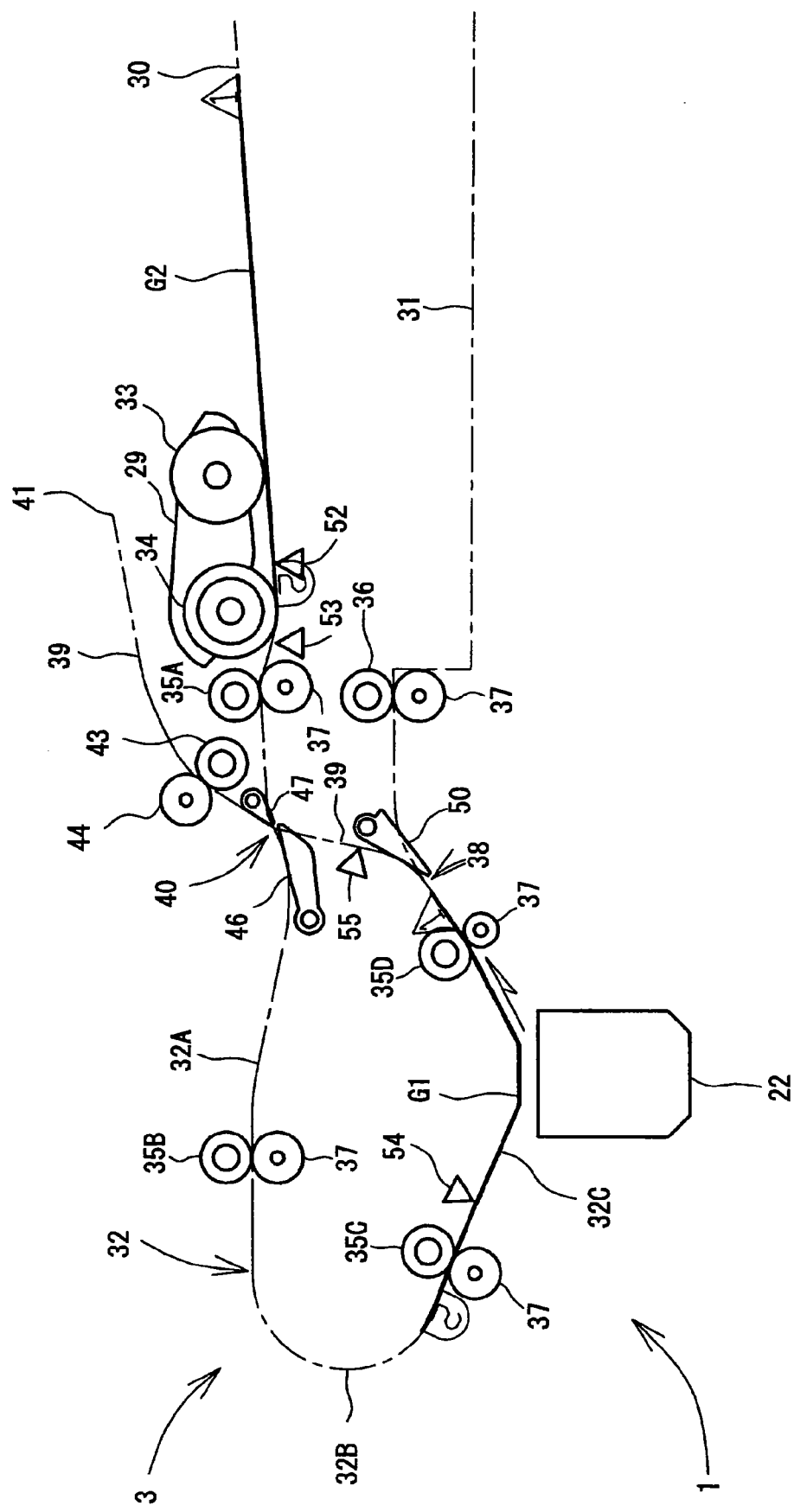
Figure 33:
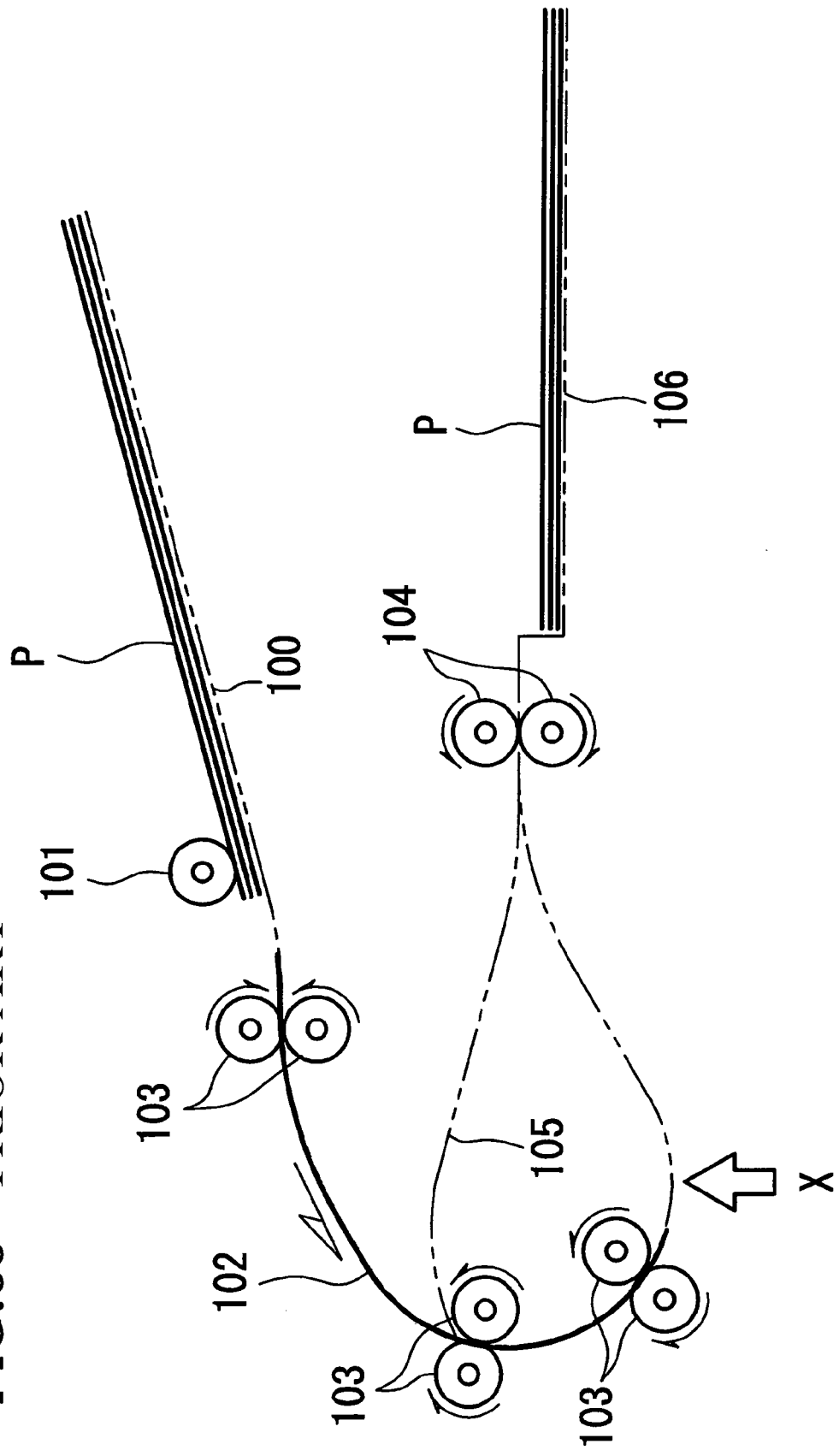
FIGS. 33 and 34 schematically illustrate an existing double-side document reading system.
Figure 34:
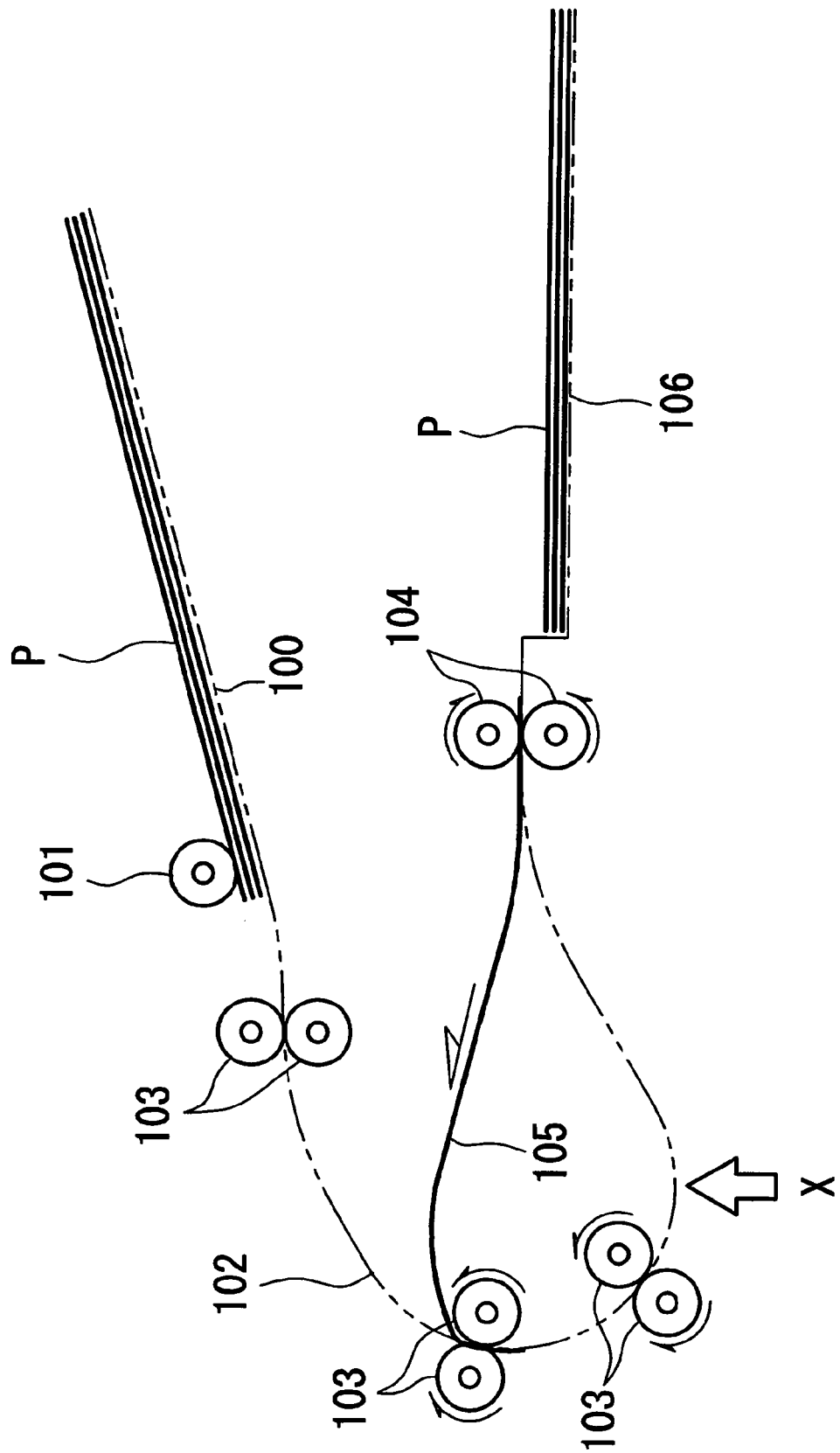

As shown in FIG. 32, when the leading end, with respect to the sheet feeding direction, of the document G1 is detected by the rear sensor 54 and reaches the reading position, the controller 60 causes the image reading unit 22 to read the second surface of the document G1 (S17). The leading end, with respect to the sheet feeding direction, of the document G1 of which the second surface has been read then is guided by the guide flap 50, and it enters the bidirectional feed path 39 from the document feed path 32 at the connection position 38. When the trailing end, with respect to the sheet feeding direction, of the document G1 is detected by the rear sensor 54 and reaches the reading position, the controller 60 ends image reading of the second surface of the document G1 by the image reading unit 22. The image data of the second surface of the document G1 read by the image reading unit 22 is stored in an area of the RAM 63.

When the bidirectional feed sensor 55 turns on after it detects the leading end, with respect to the sheet feeding direction, of the document G1 entering the bidirectional feed path 39, the controller 60 actuates the switchback solenoid 161. As a result, when the document G1 is drawn in the bidirectional feed path 39, the power interruption mechanism 151 separates from the support arm 156 of the planet gear device 153. As shown in FIG. 15, the planet gear device 153, which has received power in the CCW direction from the motor 67, transmits power in the CW direction to the driven gear 168, and the bidirectional feed roller 43 rotates in the draw direction.

The leading end, with respect to the sheet feeding direction, of the document G1 that has reached the intersection position 40 pushes the guide flap 46 upward as is the case with FIG. 29, and the document G1 goes to the termination 41 of the bidirectional path 39 at the intersection position 40. As is the case with FIG. 30, after the trailing end of the document G1 passes the intersection position 40 of the bidirectional feed path 39 and completely goes to the termination 41, the controller 60 changes the rotation of the motor 67 from the CCW direction to the CW direction to rotate the bidirectional feed roller 43 in the return direction, and the document G1 is returned to the intersection position 40. Then, as is the case with FIG. 31, the document G1 being returned from the bidirectional feed path 39 is guided by the guide flaps 46, 47, and fed from the termination 41 of the bidirectional feed path 39 to the reading position of the document feed path 32. As a result, the document G1 is fed again to the document feed path 32 with its leading end and trailing end reversed again, namely, under the condition where the document G1 was first fed into the document feed path 32 (S18).

As the power transmission mechanism 120 transmits power in the sheet feeding direction to the feed rollers 35A, 35B, 35C, 35D and the ejection roller 36, irrespective of the rotation direction of the motor 67, the feed rollers 35A, 35B, 35C, 35D and the ejection roller 36 rotate in the sheet feeding direction. The power transmission mechanism 70 interrupts power transmission to the driven gear 95 because the engagement mechanism 86 holds the planet gear device 75 in the disengagement position. The power transmission mechanism 170 switches the guide flap 50 at the connection position 38 to the position so as to guide the document from the reading position of the document feed path 32 to the ejection tray 31 when the rotation of the motor 67 is changed from the CCW direction to the CW direction.

After that, the document G1 passes the reading position with its first surface facing it, is guided to the ejection tray 31 at the connection position 38 by the guide flap 50, and is ejected to the ejection tray 31 (S19) by the ejection roller 36 with its first surface face down. When the following document G2 is set on the input tray 30 (S20: Y), that is, when the first front sensor 52 is on in this example arrangement, the controller 60 then actuates the pick-up solenoid 88, releases the engagement of the engagement mechanism 86 with the support arm 78 of the planet gear device 75, which causes the power transmission mechanism 70 to transmit power from the motor 67 to the driven gear 95, and rotates the separation roller 34 in the sheet supply direction. Thus, the document G2 placed on the input tray 30 is fed to the document feed path 32, and image reading of both sides of the document G2 is performed in the same manner described above.

As is the case with the single-side reading mode, after the last document Gk placed on the input tray 30 is ejected from the document feed path 32 to the ejection tray 31, the controller 60 changes the rotation of the motor 67 from the CW direction to the CCW direction and actuates the pick-up solenoid 88. Thus, as shown in FIG. 8, power is transmitted from the planet gear device 75 to the driven gear 95, the driven gear 95 rotates in the CCW direction, and the shaft 111 rotates in a direction opposite to the sheet feeding direction. The rotation of the shaft 111 is transmitted to the arm 29, the arm 29 moves upward and the separation roller 33 separates from the guide surface of the document feed path 32. As a result, the ADF 3 returns to its initial state where the document Gn to be read next can be inserted until it passes the lower portion of the sheet supply roller 33 in contact with the separation roller 34. Then, the controller 60 stops the motor 67, and image reading in the double-side reading mode is concluded.

In these example structures and methods, double-side reading by the image reading apparatus 1 has been described based on the assumption that the user desires the documents Gn placed on the input tray 30 to be ejected to the ejection tray 31 in an orderly sequence. However, if there is no need to match the sequence of the documents Gn placed on the input tray 30 to the sequence of the documents Gn ejected to the ejection tray 31, the documents Gn may be fed to the reading position with their second surface facing the reading position and then not fed to the bidirectional feed path 39, but rather to the ejection tray 31. With this structure and arrangement, whereas the sequence of the documents Gn is not maintained at the ejection tray 31, the last operation, feeding back the documents for the second inversion process, can be eliminated, and the time taken for double-side reading of the documents Gn can be reduced.

According to the image reading apparatus 1, the power transmission mechanisms 70, 120, 150, 170 share the drive gear 69, which is provided on the driving output shaft of the single motor 67, and the transmission gear 71, which is engaged with the drive gear 69. The power transmission mechanisms 120, 150 transmit power to the feed rollers 35A to 35D and to the bidirectional feed roller 43, respectively, via the respective gear trains branched from the transmission gear 71, whereas the power transmission mechanisms 70, 170 transmit power to the separation roller 34 and to the guide flap 50, respectively, via the respective gear trains branched from the transmission gears 72, 73, which are disposed downstream from the transmission gear 71 with respect to the power transmission direction. Thus, in the power transmission mechanisms 120, 150, power transmission with little backlash can be achieved. In addition, as the power transmission mechanisms 70, 170 are branched from the power transmission mechanism 150, fluctuations in load generated in the separation roller 34 or the guide flap 50 are controlled so as not to influence on the rotation speed of the feed rollers 35A to 35D. As a result, document feeding accuracy by the feed rollers 35A to 35D can be improved.

In the power transmission mechanisms 70, 120, 150, 170, power transmission paths where power is transmitted from the transmission gears 71, 72, 73 to the separation roller 34, the feed rollers 35A to 35D, the guide flap 50, and the bidirectional feed roller 43 are composed of gear trains each comprised of plural gears. However, the power transmission paths are not limited to the gear trains. As another example, the power transmission paths may be comprised of a single gear.

In the image reading apparatus 1, the bidirectional feed path 39 for feeding the document Gn back to the document feed path 32 is formed so that it extends from the connection position 38 on the downstream side of the reading position of the document feed path 32 and intersects at the intersection position 40 on the upstream side of the reading position. However, this bidirectional feed path 39 is an exemplary feed path, and the document feed path 32 and the bidirectional feed path 39 are not limited to the examples shown and described herein. Thus, the guide flaps 46, 47 may be changed or additional guides may be provided, e.g., based on the desired bidirectional feed path. In addition, instead of the guide flaps 46, 47, elastically deformable films or other devices may be used as guide members.

While the various aspects of the invention have been described in conjunction with the example structures and methods described above, various alternatives, modifications, variations, improvements and/or substantial equivalents, whether known or that are or may be presently unforeseen, may become apparent to those having at least ordinary skill in the art. Accordingly, the example structures and methods, as set forth above, are intended to be illustrative of the invention, not limiting it. Various changes may be made without departing from the spirit and scope of the invention. Therefore, the invention is intended to embrace all known or later developed alternatives, modifications, variations, improvements and/or substantial equivalents.

What is claimed is:

1. A feeder for documents or other sheet materials, comprising:
   an inlet;
   an outlet;
   a feed path extending between the inlet and outlet;
   a bidirectional feed path section extending from a portion of the feed path;
   a feed system including at least a first roller configured to move a document or other sheet material as the document or other sheet material is present in the feed path to the outlet;
   a secondary system including at least a second roller configured to affect the movement of the document or other sheet material in the feeder, wherein the secondary system includes a supply system configured to move the document or other sheet material from or through the inlet to the feed path and a bidirectional drive system configured to move the document or other sheet material along the bidirectional feed path section; and
   a drive system configured to drive the feed system and the secondary system, wherein the drive system controls the feed system, the supply system, and the bidirectional drive system to operate in at least a first instance where the operation of the feed system is independent of operation of the supply system and the bidirectional drive system,
   wherein the drive system includes a single motor configured to drive the feed system, the supply system, and the bidirectional drive system via a transmission system.

2. A feeder according to claim 1, wherein the drive system includes the motor configured to rotate feed rollers included in the feed system in a first direction irrespective of a rotational direction of the motor.

3. A feeder according to claim 1, wherein the drive system includes a power transmission system that is convertible between configurations such that, when the feeder is in a double side scanning mode, the transmission system operates the feed system to move the document or other sheet material in a discontinuous manner, and when the feeder is in a single side scanning mode, the transmission system operates the feed system to move the document or other sheet material in a continuous, non-stop manner.

4. A feeder according to claim 1, wherein the drive system includes a power transmission system that is convertible between configurations such that, when the feeder is in a single side scanning mode, the transmission system operates the feed system to move the document or other sheet material in a continuous, non-stop manner.

5. A feeder according to claim 1, further including:
a bidirectional feed path access control system configured to control access to the bidirectional feed path section.

6. A feeder according to claim 5, wherein the drive system is further configured to control the bidirectional feed path access control system, such that, in at least one mode, operation of the feed system is independent of operation of the bidirectional feed path access control system.

7. A feeder according to claim 1, wherein the transmission system includes planetary gears.

8. A feeder according to claim 1, wherein the secondary system includes the supply system for moving a document or other sheet material from the inlet to the feed path, wherein the drive system controls the feed system and the supply system such that, in at least some instances, operation of the feed system is independent of operation of the supply system.

9. A feeder according to claim 8, wherein the transmission system that is convertible between configurations such that feed rollers included in the feed system are rotated in a first direction irrespective of a rotational direction of the motor.

10. A feeder according to claim 8, wherein the transmission system that is convertible between configurations such that, when the feeder is in a double side scanning mode, the transmission system operates the feed system to move the document or other sheet material in a discontinuous manner, and when the feeder is in a single side scanning mode, the transmission system operates the feed system to move the document or other sheet material in a continuous, non-stop manner.

11. A feeder according to claim 8, wherein the transmission system that is convertible between configurations such that, when the feeder is in a single side scanning mode, the transmission system operates the feed system to move the document or other sheet material in a continuous, non-stop manner.

12. A feeder according to claim 1,
wherein the secondary system includes the bidirectional drive system for moving a document or other sheet material along the bidirectional feed path section, and wherein the drive system controls the feed system and the bidirectional drive system such that, in at least some instances, operation of the feed system is independent of operation of the bidirectional drive system.

13. A feeder according to claim 12, wherein the transmission system is convertible between configurations such that feed rollers included in the feed system are rotated in a first direction irrespective of a rotational direction of the motor.

14. A feeder according to claim 12, wherein the transmission system is convertible between configurations such that, when the feeder is in a double side scanning mode, the transmission system operates the feed system to move the document or other sheet material in a discontinuous manner, and when the feeder is in a single side scanning mode, the transmission system operates the feed system to move the document or other sheet material in a continuous, non-stop manner.

15. A feeder according to claim 12, wherein the transmission system is convertible between configurations such that, when the feeder is in a single side scanning mode, the transmission system operates the feed system to move the document or other sheet material in a continuous, non-stop manner.

16. A feeder according to claim 12, wherein the secondary system further includes a bidirectional feed path access control system for controlling access to the bidirectional feed path section.

17. A feeder according to claim 16, wherein the drive system further controls the bidirectional feed path access control system, such that, in at least some instances, operation of the feed system is independent of operation of the bidirectional feed path access control system.

18. A feeder according to claim 1,
wherein the secondary system includes a bidirectional feed path access control system for controlling access to the bidirectional feed path section, and wherein the drive system controls the feed system and the bidirectional feed path access control system such that, in at least some instances, operation of the feed system is independent of operation of the bidirectional feed path access control system.

19. A feeder according to claim 18, wherein the transmission system is convertible between configurations such that feed rollers included in the feed system are rotated in a first direction irrespective of a rotational direction of the motor.

20. A feeder according to claim 18, wherein the transmission system is convertible between configurations such that, when the feeder is in a double side scanning mode, the transmission system operates the feed system to move the document or other sheet material in a discontinuous manner, and when the feeder is in a single side scanning mode, the transmission system operates the feed system to move the document or other sheet material in a continuous, non-stop manner.

21. A feeder according to claim 18, wherein the transmission system is convertible between configurations such that, when the feeder is in a single side scanning mode, the transmission system operates the feed system to move the document or other sheet material in a continuous, non-stop manner.

* * * * *